US010398010B2

(12) United States Patent
Oliver et al.

(10) Patent No.: US 10,398,010 B2
(45) Date of Patent: Aug. 27, 2019

(54) POWER LOSS DETECTION FOR A LIGHTING CONTROL SYSTEM

(71) Applicant: RAB Lighting Inc., Northvale, NJ (US)

(72) Inventors: Jason Oliver, Northvale, NJ (US); Michael Theodore Case-Hayes, Northvale, NJ (US)

(73) Assignee: RAB Lighting Inc., Northvale, NJ (US)

( * ) Notice: Subject to any disclaimer, the term of this patent is extended or adjusted under 35 U.S.C. 154(b) by 0 days.

(21) Appl. No.: 16/218,123

(22) Filed: Dec. 12, 2018

(65) Prior Publication Data

US 2019/0116652 A1 Apr. 18, 2019

Related U.S. Application Data

(63) Continuation of application No. 15/621,536, filed on Jun. 13, 2017, now Pat. No. 10,219,356, and a
(Continued)

(51) Int. Cl.
*H01J 1/60* (2006.01)
*H01J 7/42* (2006.01)
*H05B 37/02* (2006.01)
*H05B 33/08* (2006.01)
*H04L 12/28* (2006.01)
(Continued)

(52) U.S. Cl.
CPC ..... *H05B 37/0272* (2013.01); *H04L 12/2829* (2013.01); *H04L 12/4625* (2013.01); *H04L 67/125* (2013.01); *H04W 24/08* (2013.01); *H05B 33/0845* (2013.01); *H05B 33/0854* (2013.01); *H05B 37/0218* (2013.01); *H05B 37/0227* (2013.01); *H04L 63/0227* (2013.01); *H04W 12/06* (2013.01); *H04W 12/08* (2013.01);
(Continued)

(58) Field of Classification Search
None
See application file for complete search history.

(56) References Cited

U.S. PATENT DOCUMENTS

2009/0167547 A1* 7/2009 Gilbert ............... G01D 4/02
340/662
2011/0288658 A1* 11/2011 Walters ............... G06Q 30/04
700/12
(Continued)

*Primary Examiner* — Anh Q Tran
(74) *Attorney, Agent, or Firm* — Frost Brown Todd LLC; Dennis S. Schell; Kevin C. Oschman

(57) ABSTRACT

Wireless lighting control systems and methods for controlling the illumination of one or more light fixtures are disclosed, including power loss detection of hardware. Embodiments include a zero-cross detection circuit including a timer, the timer reset by a zero-cross detection, and the zero-cross detection circuit detecting a loss of power of the AC supply upon the timer reaching a preset time without resetting. Embodiments further include a first voltage regulator having an input coupled to the AC supply and an output providing a first DC supply. Embodiments still further include a wireless transmitter having a power input, the wireless transmitter for communicating with at least one other component of the wireless device control system. The first capacitor provides energy storage sufficient to power the wireless transmitter for a duration long enough to transmit one message upon detecting the loss of power of the AC supply.

6 Claims, 55 Drawing Sheets

Related U.S. Application Data continuation of application No. 15/492,373, filed on Apr. 20, 2017, said application No. 15/621,536 is a continuation of application No. 15/357,900, filed on Nov. 21, 2016, now Pat. No. 10,085,328, said application No. 15/492,373 is a continuation-in-part of application No. 15/357,900, filed on Nov. 21, 2016, now Pat. No. 10,085,328, which is a continuation-in-part of application No. 14/823,560, filed on Aug. 11, 2015, now Pat. No. 9,883,567.

(60) Provisional application No. 62/257,908, filed on Nov. 20, 2015, provisional application No. 62/035,558, filed on Aug. 11, 2014.

(51) Int. Cl.
*H04L 12/46* (2006.01)
*H04W 24/08* (2009.01)
*H04L 29/08* (2006.01)
*H04W 88/16* (2009.01)
*H04W 12/06* (2009.01)
*H04W 84/18* (2009.01)
*H04L 29/06* (2006.01)
*H04W 12/08* (2009.01)

(52) U.S. Cl.
CPC ............ *H04W 84/18* (2013.01); *H04W 88/16* (2013.01); *Y02B 20/445* (2013.01); *Y02B 20/46* (2013.01)

(56) References Cited

U.S. PATENT DOCUMENTS

| | | | |
|---|---|---|---|
| 2012/0013257 A1* | 1/2012 | Sibert | H05B 37/0245 315/152 |
| 2014/0055030 A1* | 2/2014 | Kuang | H05B 33/0803 315/77 |

* cited by examiner

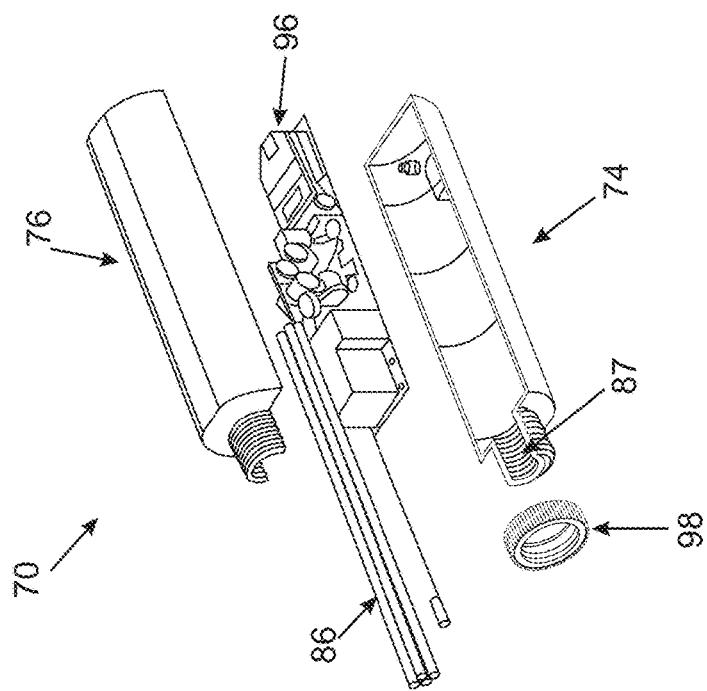
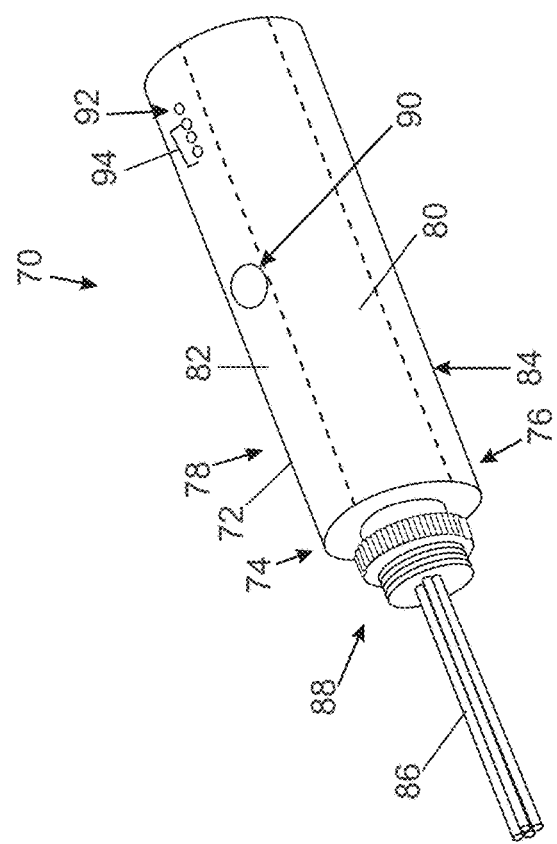
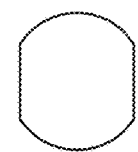
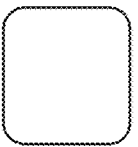
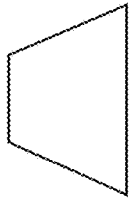

POWER LOSS DETECTION FOR A LIGHTING CONTROL SYSTEM

CROSS-REFERENCE TO RELATED APPLICATIONS

This application is a continuation of U.S. application Ser. No. 15/621,536, filed Jun. 13, 2017; which is a continuation of U.S. application Ser. No. 15/357,900, filed Nov. 21, 2016; which is a continuation-in-part of U.S. application Ser. No. 14/823,560, filed Aug. 11, 2015, which claims the benefit of U.S. Provisional Application No. 62/035,558, filed Aug. 11, 2014, and also claims the benefit of U.S. Provisional Application No. 62/257,908, filed Nov. 20, 2015, and this application is also a continuation of U.S. application Ser. No. 15/492,373, filed Apr. 20, 2017; which is a continuation-in-part of U.S. application Ser. No. 15/357,900, filed Nov. 21, 2016, the entireties of which are hereby incorporated herein by reference. Any disclaimer that may have occurred during the prosecution of the above-referenced application(s) is hereby expressly rescinded.

COPYRIGHT NOTICE

A portion of the disclosure of this patent document contains material which is subject to copyright protection. The copyright owner has no objection to the facsimile reproduction by anyone of the patent disclosure, as it appears in the United States Patent and Trademark Office patent files or records, but otherwise reserves all copyright rights whatsoever.

FIELD

The present disclosure relates generally to lighting control systems, and more particularly to detecting hardware power loss in wireless lighting control systems.

BACKGROUND

Various systems are known for remotely monitoring, wirelessly controlling or automating operation of electrical devices. For example, home or building automation systems may facilitate automated control of various electrical devices, such as lighting fixtures. That is, various electrical devices may be configured to operate according to predetermined schedules or events, such as in response to time or other user preferences. Remote monitoring or wireless control of certain electrical devices is also offered, including the monitoring or controlling of electrical devices over a network using a mobile device. As the automation and control, including wireless control, of electrical devices becomes more popular and as the desired control becomes more complex, there is a need for robust device control systems that are relatively straightforward to install, configure, and use. Although some relatively sophisticated systems are available, they typically require extensive wiring and other installation steps by technicians specially trained in such systems and are expensive and complex to install and maintain. Further, security is increasingly a concern as wireless control and remote monitoring of electrical devices is provided over the Internet, providing an avenue for nefarious intrusion not only to the lighting control system, but possibly to other data and systems residing on a local area network with the device control system.

The present disclosure is directed to one or more of the problems or issues set forth above.

SUMMARY

In one aspect, the present disclosure can include a wireless lighting control system. The wireless lighting control system can include a cloud-based or other remote server system connected to a wide area network and can have control software for configuring, monitoring, and controlling lighting fixtures at an organization's installation site. The wireless lighting control system also can include a wireless gateway located at the site and configured to initiate communication with the remote server via cellular communication. Wireless devices can initiate wireless communication with the gateway upon power-up via a wireless mesh network, and at least some of the wireless devices can be configured to control one or more of the lighting fixtures. A mobile or other user computer device can be connected to the wide area network and can have a user interface enabling a user to access the server control software and control and configure the lighting fixtures associated with wireless devices at the site according to the user's granted permissions. Control instructions entered on the server through the user interface can be communicated from the server to the wireless gateway and then from the wireless gateway to the wireless devices.

Installation, commissioning, and configuration of a wireless gateway and wireless devices at the system installation site can be completed by a qualified electrical contractor without requiring training specific to the wireless lighting control system. The site wireless devices can include occupancy/vacancy and other condition sensors, daylight harvesting sensors, wall dimmers, touchscreens, and controllers. A controller may include an actuator and can be configured to switch power on and off, dim, and monitor power and other conditions of a lighting fixture and other lighting devices, for example, a motorized window shade. A controller can also be configured as a trigger that will monitor a non-system device or third-party sensor which is not part of the mesh network and relay data from the device or sensor to the lighting control system. Controllers and certain other wireless devices can also act as a mesh network repeater to extend the area encompassed by the installation site.

In one embodiment, once hardware of the site system (e.g., a gateway and/or any device) is mounted or positioned in the appropriate location and powered on, the hardware can self-commission by automatically initiating communications. The gateway can initiate communication and identify itself to server system. When the devices are powered on, they can identify themselves to the gateway and the gateway can inform the server system of the devices.

Once commissioned, the system can enable easy configuration and control of sensing, dimming, automations, schedules, scenes, and monitoring of the site's lighting fixtures and associated devices. One or more light fixtures that will all behave in a like manner can form a "zone" and are associated with a single or a common wireless device. An "area" can be formed by a grouping of zones which are configured to respond together to a single event or command, for example, a schedule. A "scene" can provide a collection of state change requests, for example, preset saved illumination levels for a zone or area. Monitoring can include real-time and/or archived measurement of status and power consumption reported from wireless devices to the remote server. Control, monitoring, and configuration changes can be easily made by users via a user interface accessible using a touchscreen control devices coupled to the wireless mesh network or a user computer device, for example, a mobile device, in communication with the remote server via a wide area network (WAN) such as the internet.

Embodiments of the present disclosure provide improved cloud-based wireless lighting control systems and methods.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

FIG. 2A is a perspective view of an exemplary embodiment of a controller for use with the wireless device control system of FIG. 1;

FIG. 2B depicts an alternative cross-sectional shape that may be substituted for the controller shape shown in FIG. 2A;

FIG. 2C depicts another alternative cross-sectional shape that may be substituted for the controller shape shown in FIG. 2A;

FIG. 2D depicts the cross-sectional shape of the controller shown in FIG. 2A;

FIG. 3 is an exploded view of the controller of FIG. 2A;

FIG. 19A is an exemplary screen capture illustrating site gateway commissioning from a back-end user interface application according to the present disclosure;

Figure 26A:
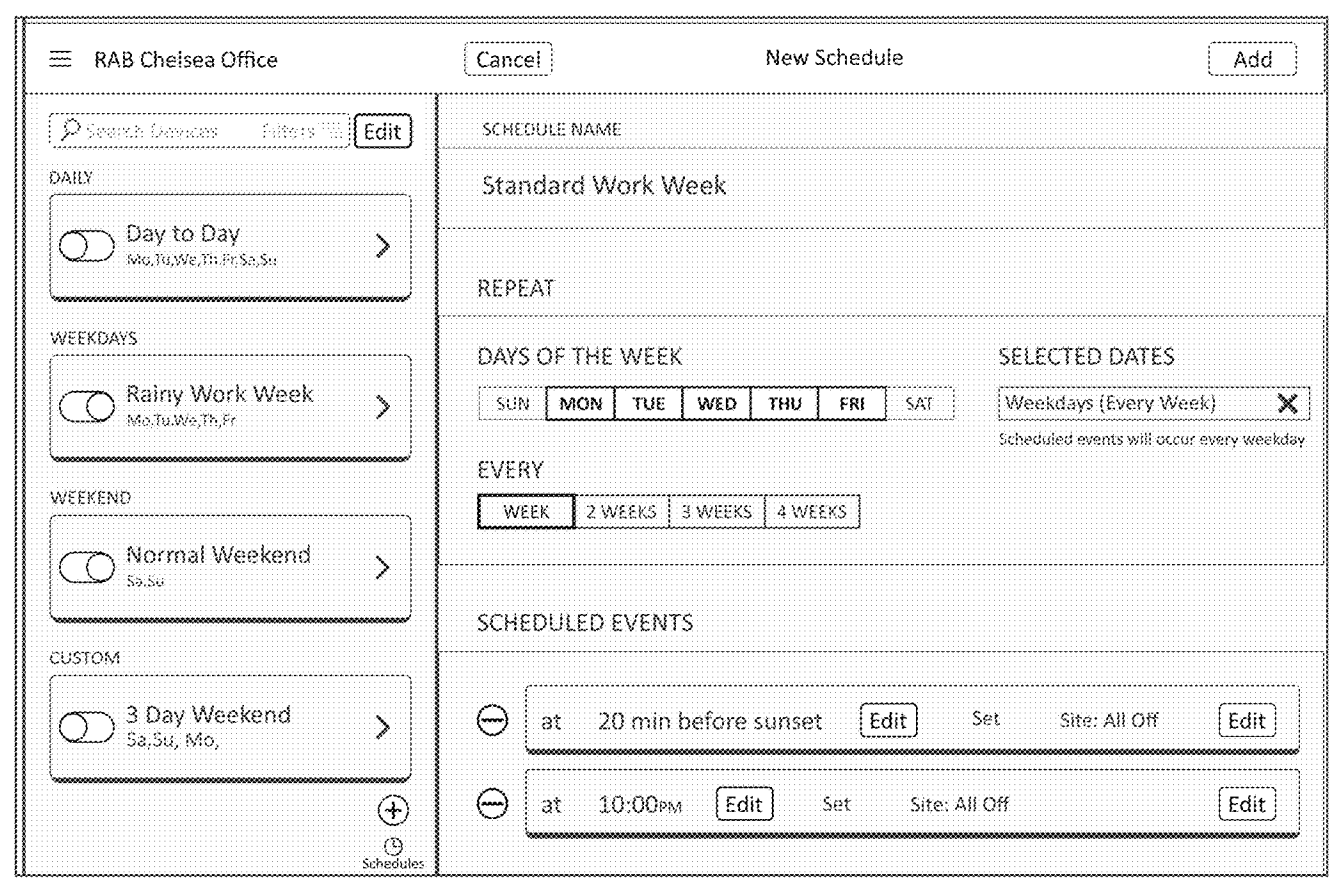

FIG. 26A is an exemplary screen capture illustrating adding a new global schedule from a front-end user interface application according to the present disclosure;

DETAILED DESCRIPTION OF THE ILLUSTRATED EMBODIMENTS

Figure 1:
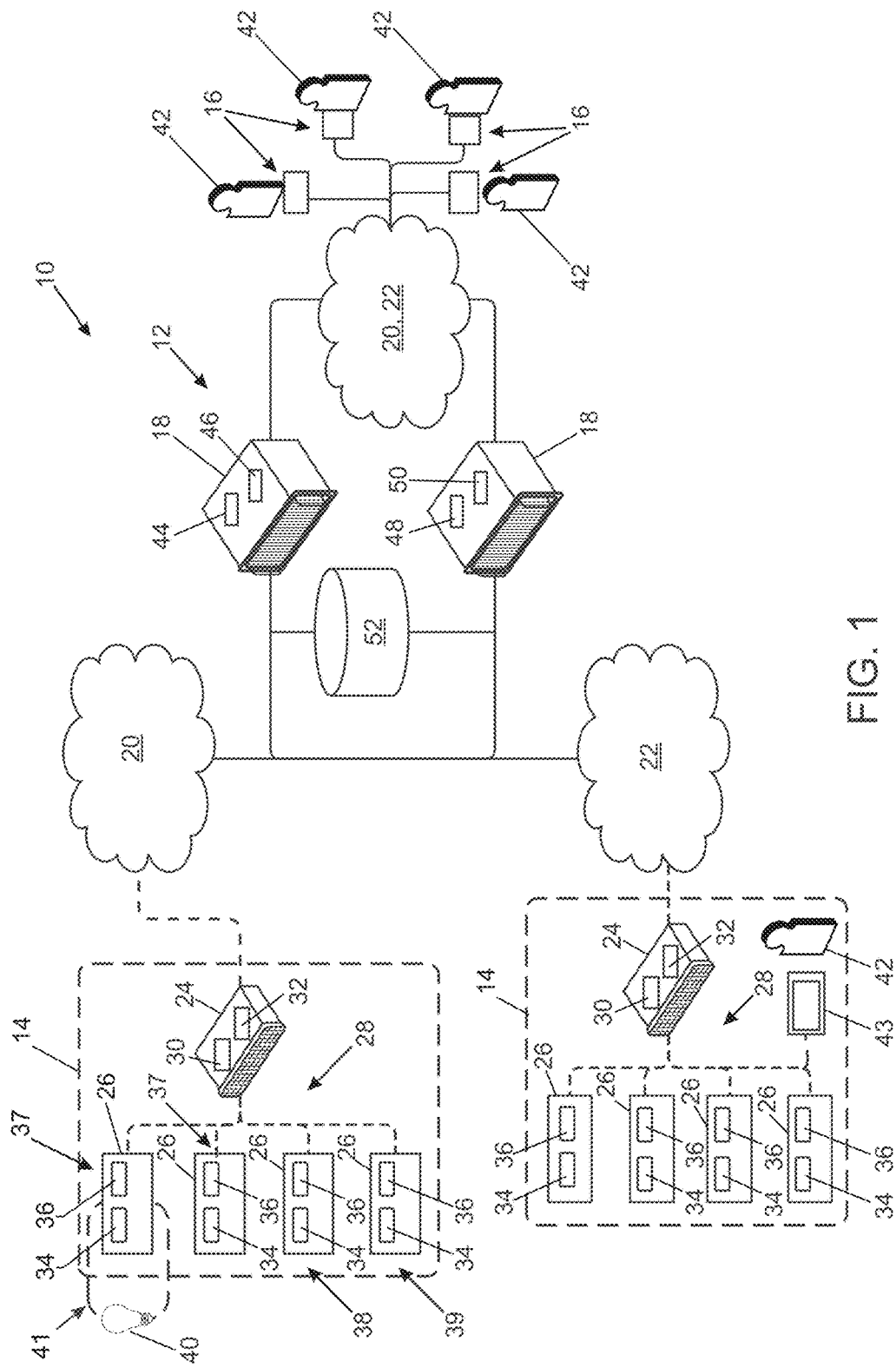
FIG. 1 illustrates an exemplary wireless device control system, according to the present disclosure.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, power, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

System

FIG. 1 illustrates an exemplary wireless device control system 10, according to the present disclosure. Although a wireless lighting control system will be described, it should be appreciated that the systems and methods described herein are applicable to the automation, monitoring, and/or control of a variety of devices or components in a variety of environments. The exemplary system 10 generally includes a server, or backend, system 12, one or more site systems 14, and various clients, also referred to throughout as user computer devices, 16. Exemplary site systems 14 may include all or portions, including indoor and/or outdoor portions, of a home, business, parking garage, street, worksite, or other location that include a predefined set of components, such as electrical devices or circuits, including, for example, light fixtures, to be monitored or controlled.

The server system 12 may include one or more servers, or computers, 18 including typical computer components, such as a processor, memory, storage, display, network interface, and input/output device, for example. The processor, or processors, may execute unique sets of instructions, which may be implemented as computer readable program code, stored in memory or storage, such that the server system 12 is configured as a special purpose system. In particular, hardware, software, and particular sets of instructions may transform the server system 12, or portions thereof, into a lighting control server system, as described herein. As should be appreciated by those skilled in the art, the server system 12 may also include any combination of computer hardware and software that facilitates communication with the site systems 14 and user computer devices 16, and performance of the functions described herein.

According to a specific implementation, all or portions of the server system 12 may be cloud-based virtual servers, including a virtual private cloud-based service. That is, for example, the one or more servers 18 of the server system 12 may reside on the Internet, for example, rather than on a local computer. To be clear, the server system 12 may be remote from the site systems 14 and/or the user computer devices 16. For example, Digi® Device Cloud, offered by Digi® International, Inc., is a public cloud platform for device network management that may be used for all or portions of the server system 12. The server system 12 may communicate with the site systems 14 and the user computer devices 16 over a wide area network (WAN), such as the Internet 20 or a cellular network 22, and/or via a local area network (LAN), for example. Some embodiments in particular use cellular communication. Cellular communication may be quicker to set-up, more secure and/or more reliable than other available communications means, such as an installation site's broadband internet connection. By using a cellular network, embodiments of the present disclosure are able to keep out of the organization's corporate network, which can assist in mitigating accidental creation of back doors through firewalls and into the user's corporate network that could potentially be used to create a security breach in the organization's corporate network.

Each site system 14 may generally include at least one gateway, or base station, 24, and one or more wireless devices 26, or device nodes, which are configured to communicate over a mesh network 28, or other similar local wireless network.

The gateway 24 may include a communications module 30 that facilitates communication between the mesh network 28, or other wireless network, and the WAN network 20 or 22. As such, the gateway 24 can facilitate communication between the devices 26 of the site system 14 and the server system 12. The gateway 24 may also include an operations module 32 for processing and/or communicating instructions (e.g., to devices 26) received from the server system 12, as will be described in greater detail below. The operations module 32 may also receive and/or process information from the devices 26. That is, the gateway 24 may run applications locally while also interfacing across the mesh network 28 for WAN connectivity to the server system 12. An exemplary gateway device may be, for example, the XBee® Zigbee® Gateway provided by Digi® International, Inc.

Each device 26 may include a communications module 34, facilitating communication between the device 26 and the gateway 24 over a local wireless network, such as the mesh network 28. For example, the devices 26 may each include a radio transceiver, such as a XBee® radio module for communicating using the ZigBee® protocol, which is related to IEEE standards, including 802.15.4. The devices 26 may also include at least one control module 36 for facilitating interaction between the device 26 and an associated electrical component, such as, for example, an electrical circuit. Devices 26 may also each be configured to act as a repeater, or router, such that it can also forward messages to other devices 26 and/or the gateway 24.

Each site 14 may include a variety of different devices 26 managed by the gateway 24 and connected to the mesh network 28. For example, according to one implementation, a site 14 may include controllers 37, sensors, such as occupancy sensors, 38, daylight harvesters 39, and user site devices, such as touchscreens and wall dimmers, 43. Controllers 37, which will be discussed in greater detail below, may include an actuator providing dimming and/or ON/OFF control for light fixtures 40, such as LED and/or fluorescent lights, on a common electrical circuit 41. Controllers 37 may additionally or alternatively provide a power usage measurement, as will be described below. Further, controllers 37 may be configured to act an event trigger by detecting voltage and/or current to determine the state of a device, such as, for example, a room light switch or a light fixture having its own motion sensor, or other sensor, to activate it. Sensors 38 that are part of the system 10 may be configured to detect and report the state of motion sensors, for example occupancy/vacancy sensors, while daylight harvesters 39 may include a light sensing circuit for measuring light and reporting measurements and other data to the system 10.

Each of the user computer devices, or clients, 16 may include a computing device, such as, for example, a personal computer, laptop computer, netbook computer, tablet device, mobile device, portable electronic device (PED), smart device, or cell phone configured to communicate with the server system 12 via WAN 20 or 22, or possibly with the gateway 24, to permit a user 42 to configure, monitor, and/or control devices 26 for a particular site system 14. That is, a user 42 may access a control program, or control logic, on the server system 12 through an appropriate user interface using user computer device 16, which may have web-browsing abilities or may have a control application installed thereon. For example, upon requesting a Uniform Resource Locator (URL) address corresponding to a website hosted by the server system 12, a web page may be loaded in a web browser of one of the client devices 16. That is, one of the servers 18 may be or may include a web server for delivering web content to the user 42 through one of the user computer devices 16 described above. Thereafter, the user 42 may be provided with an option of registering for or accessing an account.

The system 10 or, more specifically, the server system 12 may include a plurality of modules useful in carrying out the control and other strategies disclosed herein. For example, the server system 12 may include or utilize functionality expressed with reference to an organization account registration module 44, a user manager module 46, a device manager module 48, and a communications module 50, to name a few. It should be appreciated that the term "modules," as used herein, is for ease of explanation, rather than limitation, and is intended to represent certain related aspects or functionality of the wireless device control system 10. Each of the modules may represent a set of computer instructions, or computer readable program code, representing processes for performing specific tasks of the wireless device control system 10. The tasks may be performed using a processor, or processors, and may require the access or manipulation of data stored in a data repository 52.

The account registration module 44, which will be discussed in greater detail below, may facilitate the creation of accounts for organizations and/or users, such as users 42, within the system 10. For example, the registration module 44 may be used to collect data input by users 42 and/or authorized administrators and/or customer service representatives accessing the wireless device control system 10 through one of various user computer devices 16. According to some embodiments, the various user computer devices 16 may include any suitable electronic communication devices and/or workstations, such as, for example, personal computers, laptop computers, netbook computers, tablet devices, mobile devices, PEDs, smart devices, and cell phones, as mentioned above. The account registration module 44 may be used to collect various information, including, for example, personally identifiable information, such as, for example, name, address, and phone number.

The user manager module 46 may include and/or implement rules pertaining to the various users 42, or user types, of the system 10. For example, when one of the users 42 is registered, a user profile including user credentials, such as a username and password, may be created for the user 42 and stored in the data repository 52. The user manager module 46 may be configured to ensure that each user 42, as identified using the unique credentials, is provided with appropriate access and/or capabilities with regard to the system 10, as will be discussed in greater detail below. For example, the user manager module 46 may include an association of each user 42 to one or more sites, and may define appropriate permissions for each user 42 relative to respective organization and/or respective site systems 14.

The wireless device control system 10 or, more specifically, the server system 12 may include a database management system including one or more databases, such as data repository 52. The data repository 52 may store data, including the account and user data described above, useful in carrying out the strategies disclosed herein. Although the data repository 52 is illustrated as a component within the server system 12, it should be appreciated that the server system 12 may include any number of separate components or systems, including separate database(s), configured to communicate with one another in a manner consistent with the teachings disclosed herein.

The device manager module 48 may provide the main functionality of the server system 12. For example, after account registration is completed and appropriate organizations and/or users are established in the system 10, the device manager module 48 may be programmed and/or configured to permit users 42 to remotely control and manage specific associated site systems 14. The device manager module 48 may also monitor and process data from the data repository 52, and/or acquired data, to facilitate configuration, monitoring, and control of the site systems 14, as will be described below. According to a specific example, the device manager module 48 may receive control information from users 42 via user computer devices 16, store the information in the data repository 52, and mirror the information to the appropriate gateway 24 for implementation. According to some embodiments, the data repository 52 may be initially populated with at least some default control data.

Devices

As stated above, devices 26 of the wireless control system 10 and associated site lighting fixtures 40 may be controlled, monitored, and managed by users 42, via user computer devices 16 and user site devices 43. Generally speaking, devices 26 can act as actuators, causing changes in the environment (e.g., turning lights on or off), and/or sensors, detecting and/or responding to some input from the environment, such as movement or light, at the respective sites. Although not an exhaustive list, some exemplary devices 26 are described further below and can include occupancy/vacancy and other condition sensors, daylight harvesting sensors, wall dimmers, touchscreens, and controllers. Standard color coating of wires is used in some embodiments to facilitate ease of installation by electrical technicians.

Controller

Turning now to FIG. 2A, an exemplary controller 70, which may be similar to controller 37 introduced above, may switch mains power to circuits, such as, for example, circuit 41 of FIG. 1, as well as provide a dimming interface for dimmable drivers and ballasts. As an example, the controller 70 may provide a 0-10V dimming interface. The remotely controlled controller device 70 may, thus, provide ON/OFF control, as well as dimming, for light fixtures installed on the same circuit. As used herein, "mains power" broadly refers to power delivered to a site or location, such as a house or building, from a utility company, and power distributed throughout the site or location, such as from a circuit breaker to a number of branch circuits, for example, 120 VAC power.

Figure 9:
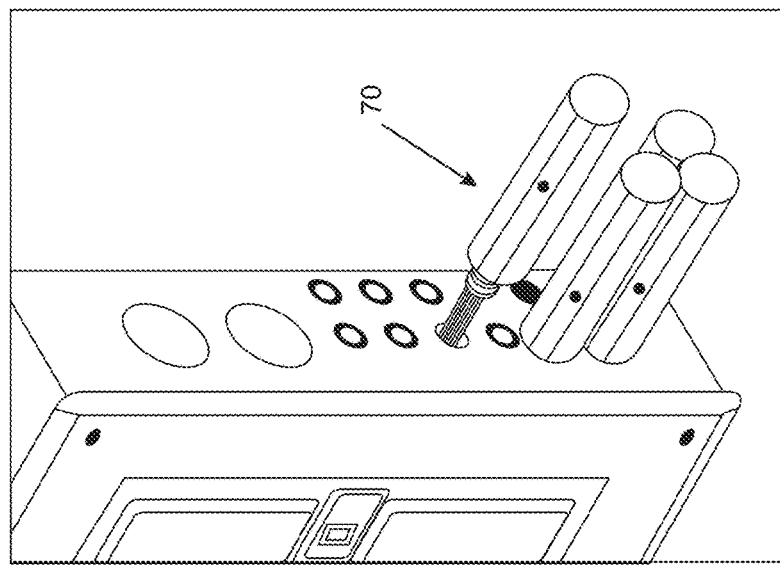
FIG. 9 is a perspective view illustrating installation of a set of controller with an electrical panel.
Figure 8:
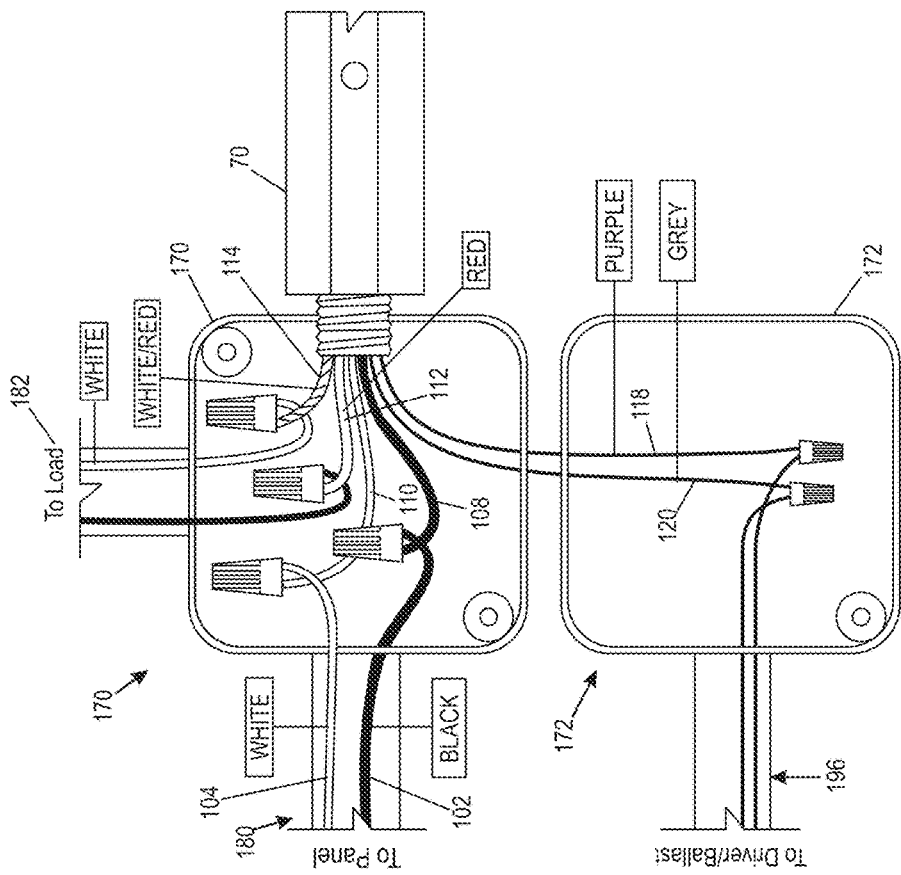
FIG. 8 is a diagram illustrating installation of a controller with electrical junction boxes.

As will be described in greater detail below, controllers 70 may be installed at a junction box, as shown in FIG. 8, or directly in a breaker box or lighting panel, as shown in FIG. 9. As such, the controller 70 is provided with a uniquely shaped housing 72 to house necessary components and facilitate installation. In particular, the housing 72 includes two halves 74, 76 secured together to define an elongate cylindrical shape, rounded on the sides 78, 80 and flattened on the top 82 and bottom 84 (as shown in FIG. 2D). As a result, the controller 70 can be easily grasped, inserted, and rotated in the typically small amount of space that exists at the sides of electrical boxes. In particular, these boxes are typically installed on a wall, or other flat surface, and have relatively minimal depth. Embodiments of controllers 70 having the shape disclosed herein and having a maximum diameter of 1.5 inches or less, can be rotated for threaded installation in the side of electrical boxes without encountering interference from the wall upon which the box is installed. Although a generally cylindrical cross-sectional shape is shown, it should be appreciated that alternative cross-sectional shapes, such as triangular (as shown in FIG. 2B), square (as shown in FIG. 2C), pentagonal, hexagonal, octagonal, etc., cross-sectional shapes, may be used instead.

Wiring 86, for connecting the controller 70 to a mains power supply, extends through a sealing material 87, for example, potting material, within the interior of a threaded installation end 88 of the controller 70, and will typically be color coded using standard electrical wiring conventions to simplify installation for electrical technicians. For example, a black wire can be connected to the AC supply/hot line, a white wire can be connected to the AC neutral line, a red wire can be connected to a neutral line of a load to be switched, a red/white wire can be connected to a neutral line of a load to be power monitored or sensor to be triggered on, and a purple wire and a grey wire can be connected to a 0-10 VDC dimmer input of a light fixture.

The housing 72 may also include a device identification button 90. According to exemplary functionality, pressing the device identification button 90 once within a predetermined period of time may highlight the controller device 70 in an application user interface for the device control system 10, which can be referred to as providing a "here I am" indication to system 10, which will be discussed in greater detail below. The button 90 may also be configured to perform various different functions depending on the length and/or number of times button 90 is depressed. For example, the button 90 may be pressed twice within a predetermined period of time to toggle the connected circuit ON/OFF. As another example, pressing the button 90 twice and holding the button 90 in the actuated position may permit manual selection of a dim level for the circuit, assuming dimming functionality is available. As still another example, holding the device identification button 90 in the actuated position for 10 seconds may remove the controller device 70 from the network, such as, for example, the mesh network 28 of FIG. 1. As a further example, the device identification button 90, which is a separate power indicator for some devices, may be illuminated when the controller device 70 is powered on, and may blink for a predetermined period of time when the controller device 70 is indicated from an application user interface for the system 10. As yet another example, pressing and holding the button 90 can result in the light fixture illumination changing, for example, ramping up and down, to enable easy identification of the fixture being controlled by the controller, which can be particularly helpful in situations where the controller is installed at a location remote to the location of the light fixture. These features and others may be common throughout all hardware on the system 10.

A status indicator 92, which may be a single LED (such as a multi-color LED, e.g., a Red/Green/Blue LED), may also be provided on the housing 72. According to one implementation, the status indicator 92 may be green when connected to a network, and may be blinking red when attempting to connect to a network. Status indicator 92 can also be configured to alternate between two colors (e.g., green and red) when connection to the gateway and/or the mesh network is lost. Embodiments of the present disclosure can also have the lights under control of the controller either turn on, turn off, or blink when the signal to the mesh network is lost.

A plurality of LEDs may be provided to function as a signal strength indicator 94, providing a visual indication of signal strength to, for example, the nearest device in the network. For example, three blue illuminated LEDs may represent good signal strength, two illuminated LEDs may represent acceptable signal strength, and one illuminated LED may represent unacceptable signal strength. It should be appreciated that the particular means for accomplishing this manual functionality and the particular visual indications described are for exemplary purposes only; variations may be implemented without deviating from the scope of the present disclosure.

As shown in FIG. 3, the two halves 74, 76 of the controller 70 may be secured together around a printed circuit board assembly 96. In particular, the housing 72 may be formed by joining the halves 74, 76 using ultrasonic welding. A locknut 98 may be threaded around the threaded installation end 88 of the controller 70. The main components of the printed circuit board assembly 96 providing the functionality for the controller 70 are shown in a circuit schematic block diagram 210 of FIG. 4A. As shown, the printed circuit board assembly 96 may generally include a radio module 212 (which may also be referred to as a transceiver, for example, part number XXB24-CZ7PIT-004, a Zigbee-Pro RF radio module available from Digi International of Minnetonka, Minn.), a power supply unit 214, a main processor 216 (which may be a microcontroller), a dimmer module 218, a power monitoring module 220, and an output module 222, programmed by conventional standards to perform conventional functionality and/or functionality described herein. One or more of the modules 212, 214, 216, 218, 220, and 222 may be provided as a daughter board coupled with a main portion of printed circuit board assembly 96. Certain embodiments of controller 70 include a circuit board assembly 96 with a design layout that distributes the heat signature during operation to minimize and/or prevent hot spots and heat buildup, making the controller compatible with operation in confined spaces (which may be referred to a plenum compatibility). In some embodiments, the controller is also outdoor rated, e.g., it is designed to be compatible with various outdoor ratings, such as IP 66. As described above, the controller 70 may provide ON/OFF control and/or dimming. As such, the controller 70 may include a switchable relay (On/Off) and/or one zone of 0-10V dimming output (0-100% at 16-bit resolution). As is customary with devices operating on mesh networks, the controller 70 may also be capable of functioning as a repeater.

The controllers 70 may also be configured to automatically perform a predetermined action in response to the detection of an emergency event. For example, all actuators may be programmed to switch power to corresponding circuits to a desired state in response to the occurrence of a certain event(s). In the context of a lighting system, for example, the controllers 70, or other lighting actuators, may be configured to turn the lights ON if it is determined that communication between the controllers 70 and the gateway 24 is lost. In some embodiments, the controllers 70 may be set up to verify communication with the gateway 24 at a predetermined frequency, referred to as a 'heartbeat' check. If verification is not received, the controllers 70 may be programmed to operate in "emergency mode," performing the action described above. It should be appreciated that alternative "emergencies" may be detected or indicated, and alternative responses may be configured.

Figure 23A:
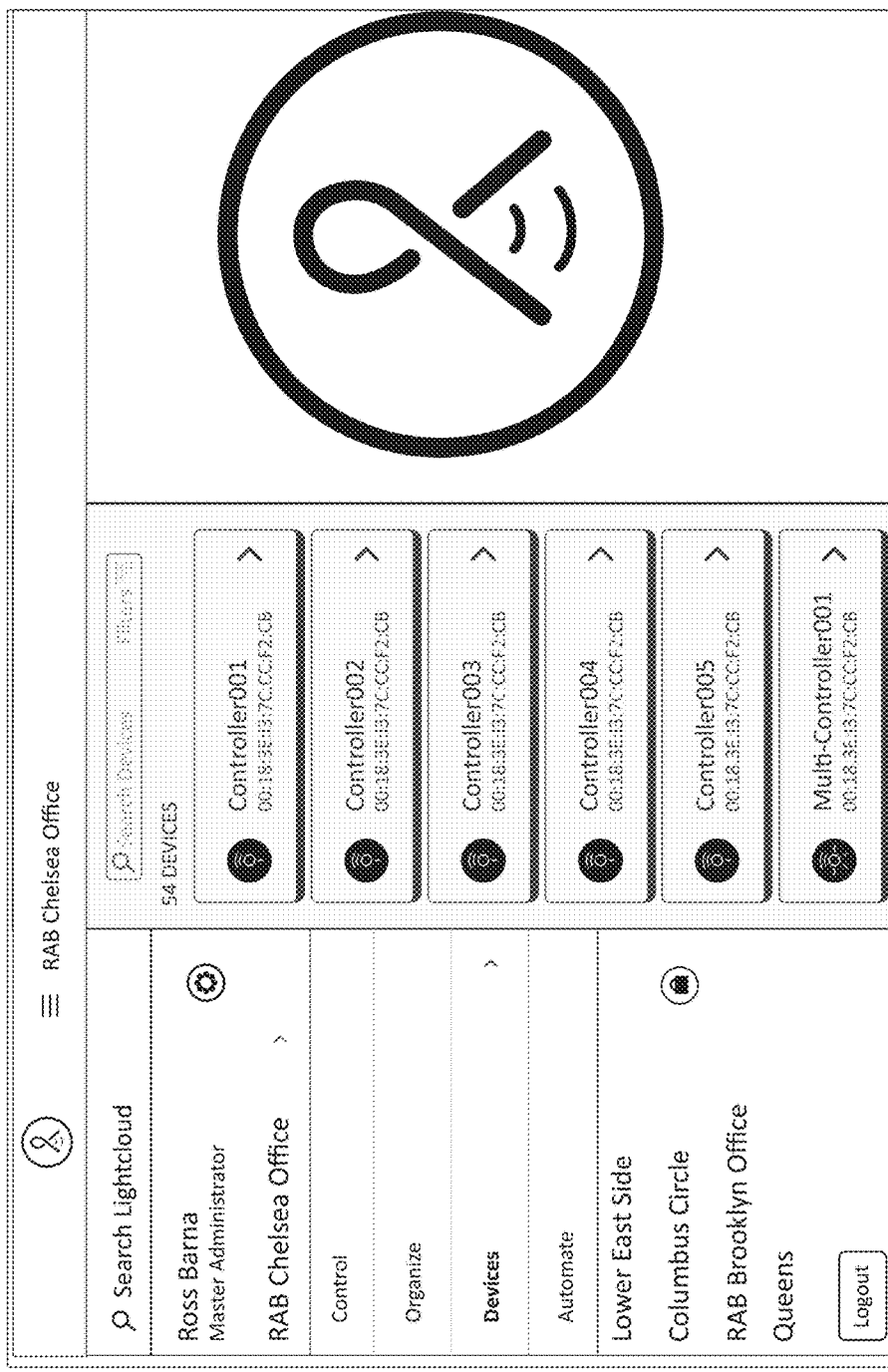
FIG. 23A is an exemplary screen capture illustrating a device view from a front-end user interface application according to the present disclosure.
Figure 23B:
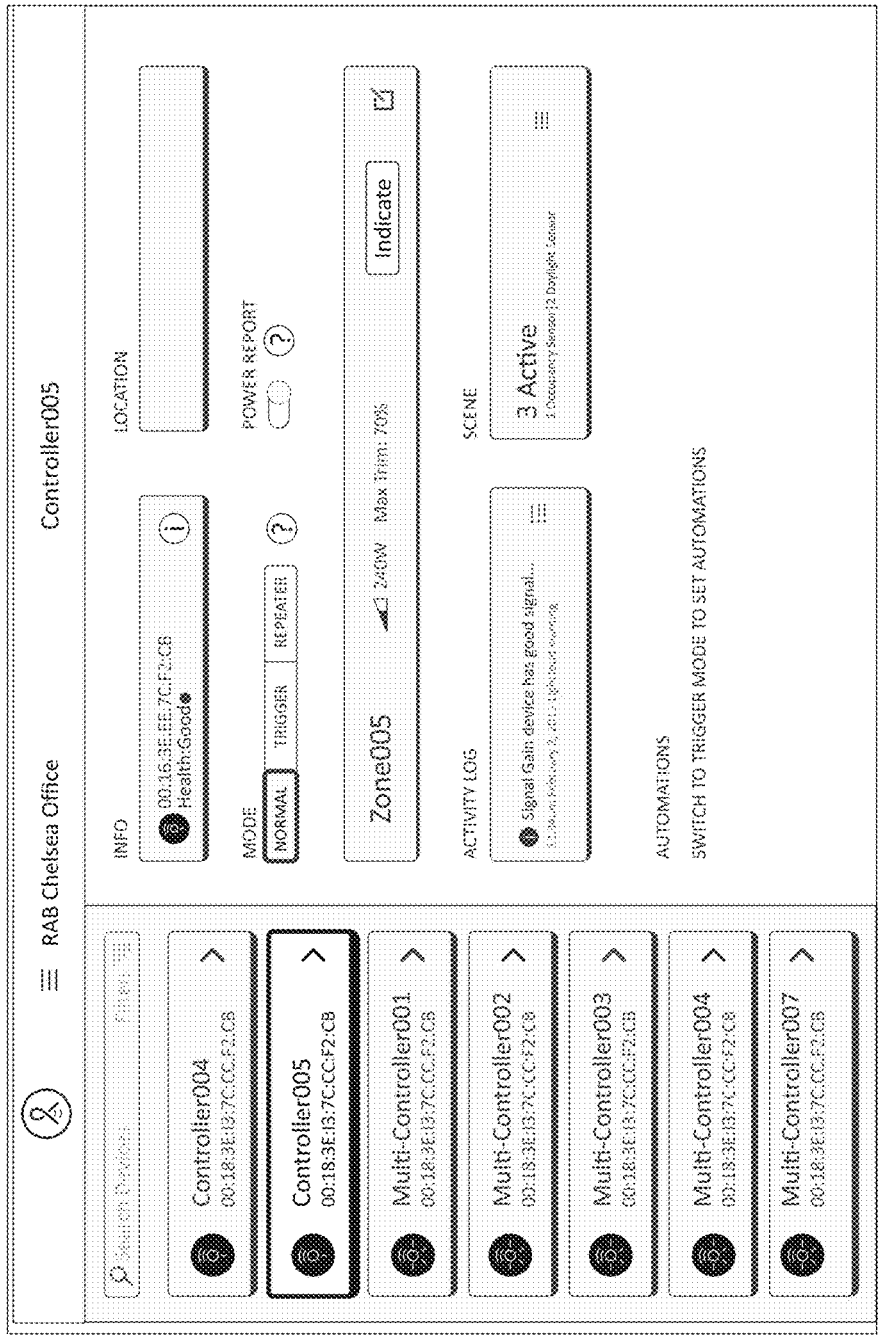
FIG. 23B is an exemplary screen capture illustrating a controller device configuration view from a front-end user interface application according to the present disclosure.
Figure 23C:
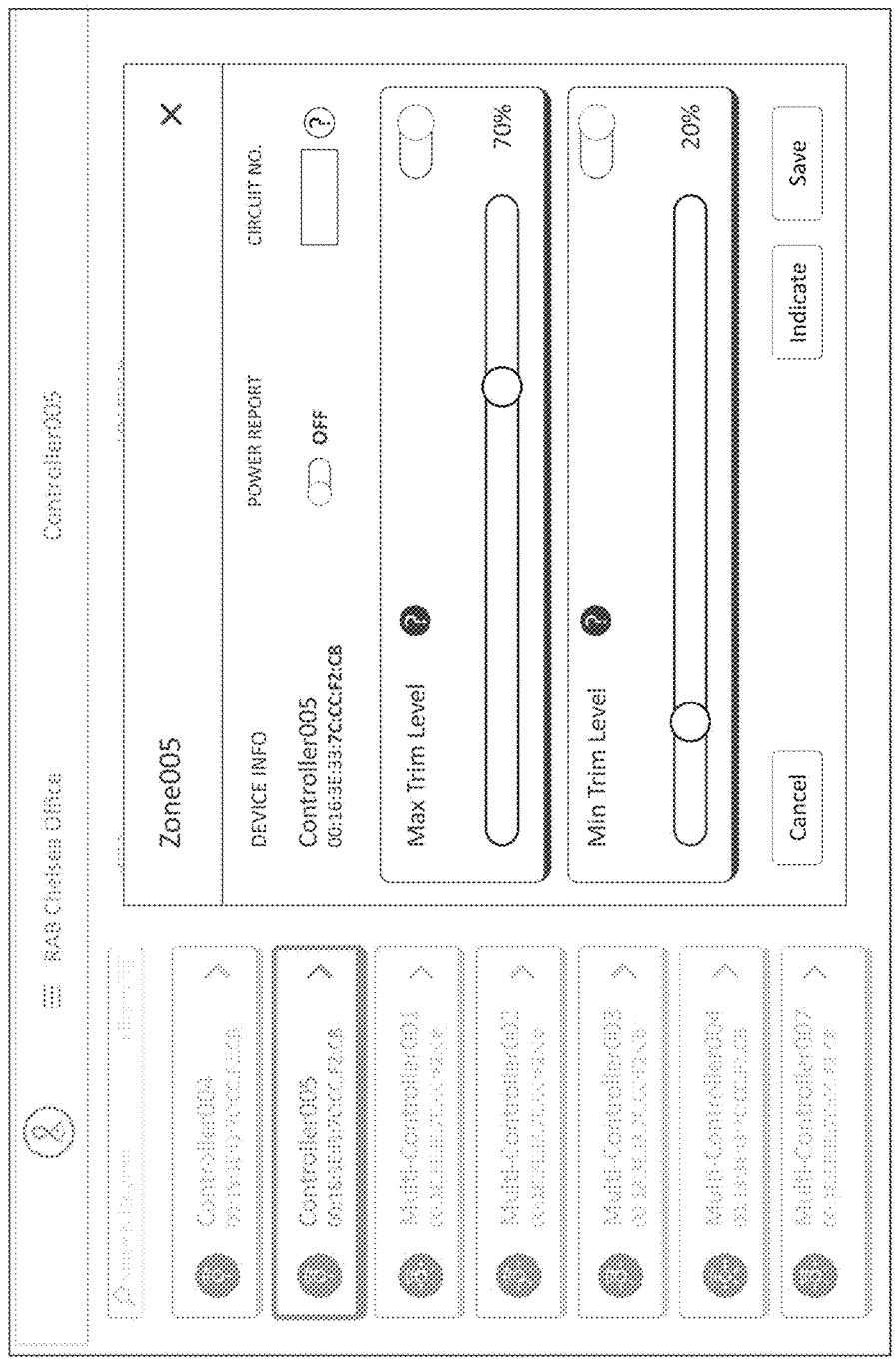
FIG. 23C is an exemplary screen capture illustrating a controller zone configuration view from a front-end user interface application according to the present disclosure.
Figure 23D:
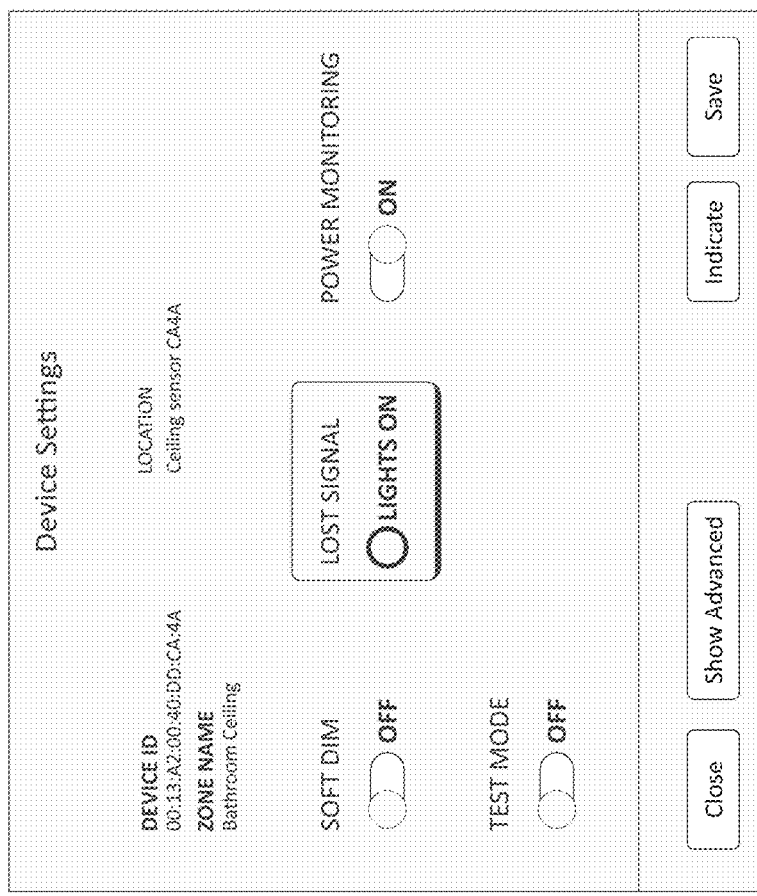
FIG. 23D is an exemplary screen capture illustrating a controller lost signal configuration view from a front-end user interface application according to the present disclosure.

For example, referring to FIG. 23D, a controller device configuration view of a user interface application provides a selection for the action to be taken in the event communication is lost with the gateway 24. In the illustrative example shown, the controller 70 is configured to turn the lights on if it is determined that communication is lost between the controller 70 and the gateway 24.

Figure 17:
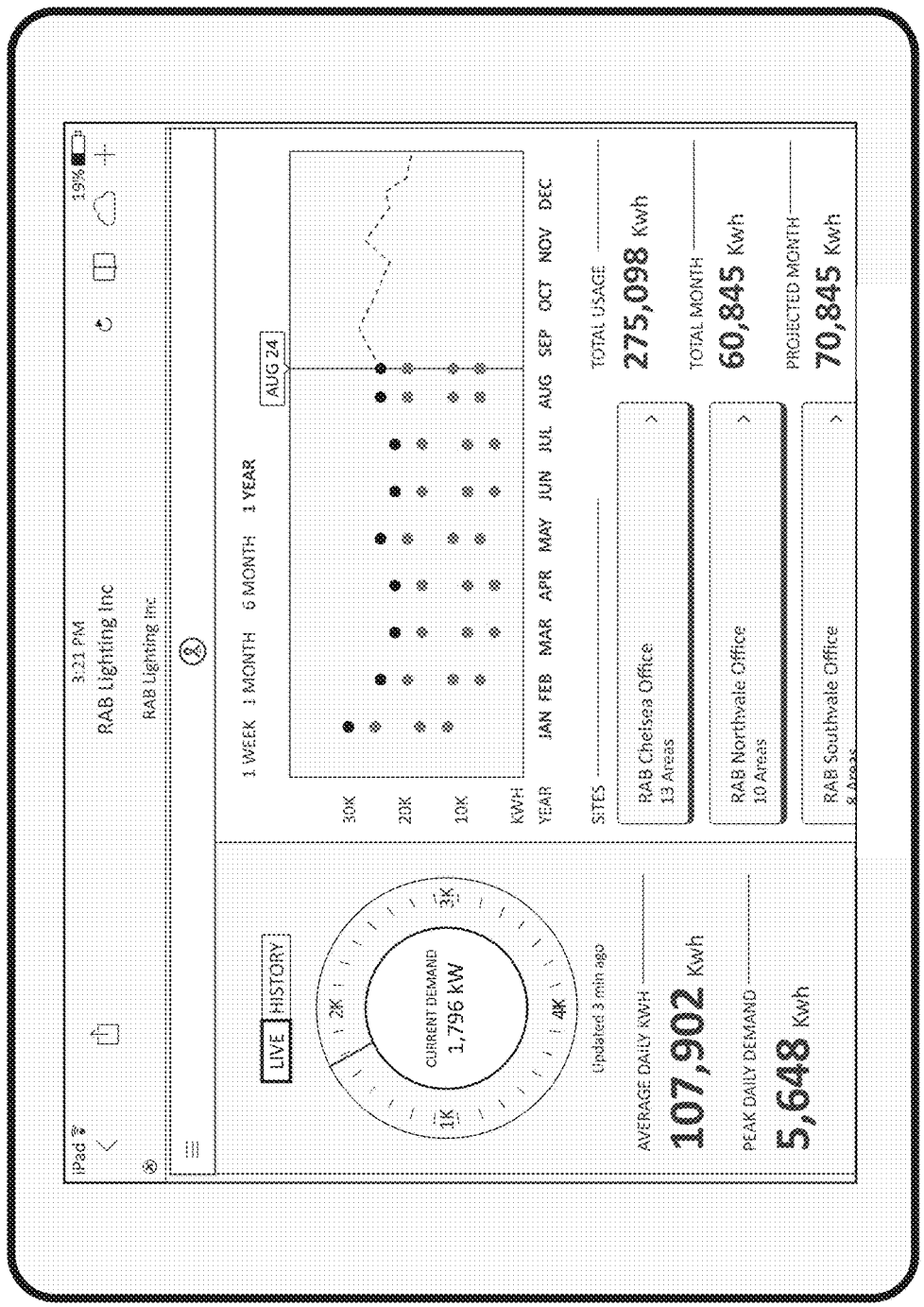
FIG. 17 is an exemplary screen capture illustrating site power usage and demand view from a front-end user interface application according to the present disclosure.

In addition, the controller 70 may be capable of power usage measurements, via the power monitoring module 220, measuring power usage over a period of time or detecting a power event. In particular, the controller 70 may be capable of measuring power supplied through the controller 70 to a load. The power measurements may be used for energy monitoring and/or to initiate some event. That is, the controller 70 may function as a trigger, triggering some event to occur, based on the power measurements. According to some embodiments, a processor 216 (such as part number MSP43012041TRHBT, a microcontroller available from Texas Instruments of Dallas, Tex.) provide the power measuring capability, having AC voltage and current input pins coupled to conditioning and/or protection circuits provided by power monitoring module 220. Monitoring measured power consumption of the attached load and reporting to the remote server 18 provides historical power consumption data that is available for viewing and downloading via the user interface, for example, as shown in FIG. 17, which illustrates an exemplary power usage and demand view of a user interface application for user device 16 or 43. Displayed site systems 14 can be selected to provide live and historic power usage and demand for areas and for zones. Additionally, reports of the displayed and/or additional power usage and demand data and analysis can be printed.

Fault detection allows any power-measuring device 26, such as a controller 70 or occupancy sensor 130, to infer an electrical fault in the device's switched circuit, such as a light fixture 40. This system is distinct from the device heartbeat check discussed above that can determine if a controller 24 has loss communication with the gateway 24 or is otherwise offline. The inference is computed by the server 18 by comparing historic power usage and current or most recent power measurement data. Similarly, once a zone is flagged as faulted, the system compares new reports to the pre-fault statistics in order to determine if the cause of a fault, for example, a burned out lamp or other problem with a light fixture 40, was repaired.

The fault detection works by comparing a current non-instantaneous power report with historical non-instantaneous power reports (to detect failure) or with recorded statistics on the historical reports (to detect repair). Because the power usage changes with the brightness (dim level) of a light fixture 40, comparisons are only valid between power reports collected under identical dimming settings.

Power report comparison begins when a new power report arrives at the device manager module 48 of server 18, including for example, data repository 52. If the zone is configured for reporting and if the light fixture 40 isn't already flagged as faulted, then the testing code is invoked against the new report. If test determines there is an issue, an appropriate flag for the zone is set so that follow-on actions can occur. Notification of the fault for the zone can be provided to a user computer devices 16 and/or user site devices 43, for example as shown.

The testing to verify a flagged fault, includes a database 52 query for historical, non-instantaneous power reports from the same zone. The historical reports are filtered so that reports that correspond to different brightness settings or to indicate events are removed. If there are enough comparable reports after the filtering to establish a baseline, then the mean of the historical power levels is determined. For example, once this baseline is established, a zone's light fixture can be considered faulty if the power draw in the current report differs by more than a predetermined threshold, for example, ten percent.

If a zone is flagged as faulted, then the statistics on the preceding reports that were used for the inference are stored so that they can be used to determine if a light fixture 40 is repaired. From this point on, new reports that are determined to be comparable are examined, and if the power usage is consistent with the pre-fault conditions, the fault status is automatically removed. Also, if it is determined that a fixture 40 was repaired, a timestamp is recorded so that any of the low-power reports that were used to find the primary fault are not factored in to future calculations.

In the case that a zone is flagged as having a potential fixture fault, various follow on events and/or notifications will alert the user. For example, in the control view shown in FIG. 16, a mark is displayed along a top of the view and with the zone or area listing along the left, indicating the fault. The user can click the mark to view and/or dismiss the event.

In addition to the marks displayed in the control view an email or other electronic notification can be used to alert users and/or administrators when a fault has occurred.

According to some embodiments, devices 26, including controllers 70 and ceiling occupancy sensor 130, may be configured to provide a power loss message/notification. For example, the controller 70 is configured to, upon detection of the loss of mains power, send a packet to the gateway 24 indicating such. To do so, a capacitive circuit of the controller 70 maintains sufficient power to send this last message to the gateway 24, indicating power loss. If the gateway 24 does NOT receive this message, it can be presumed that any loss of communication from the device 70 is due to a loss of reception rather than a loss of power.

Figure 4A:
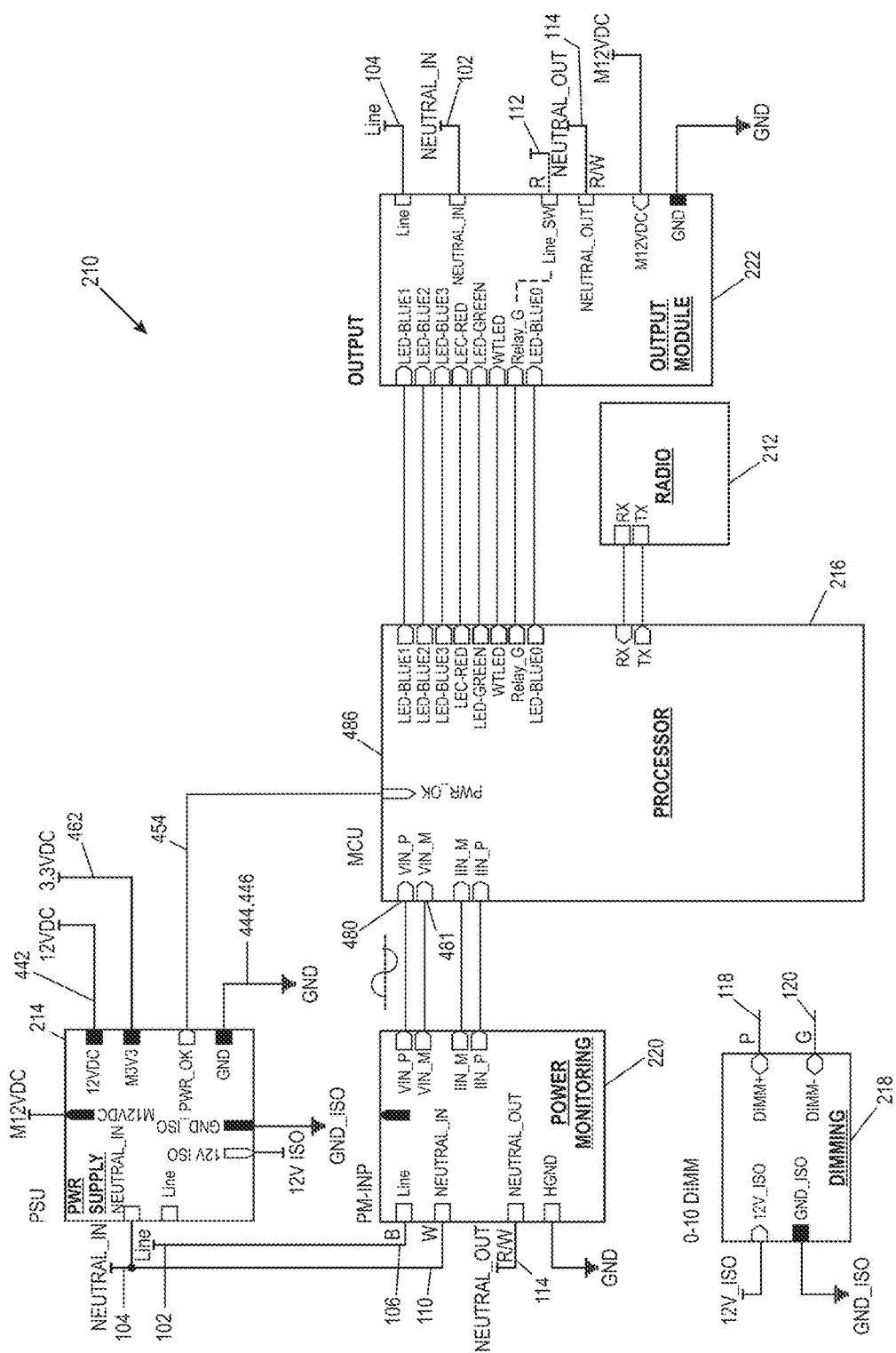
FIG. 4A is a schematic block diagram of the exemplary controller of FIGS. 2A and 3.
Figure 4B:
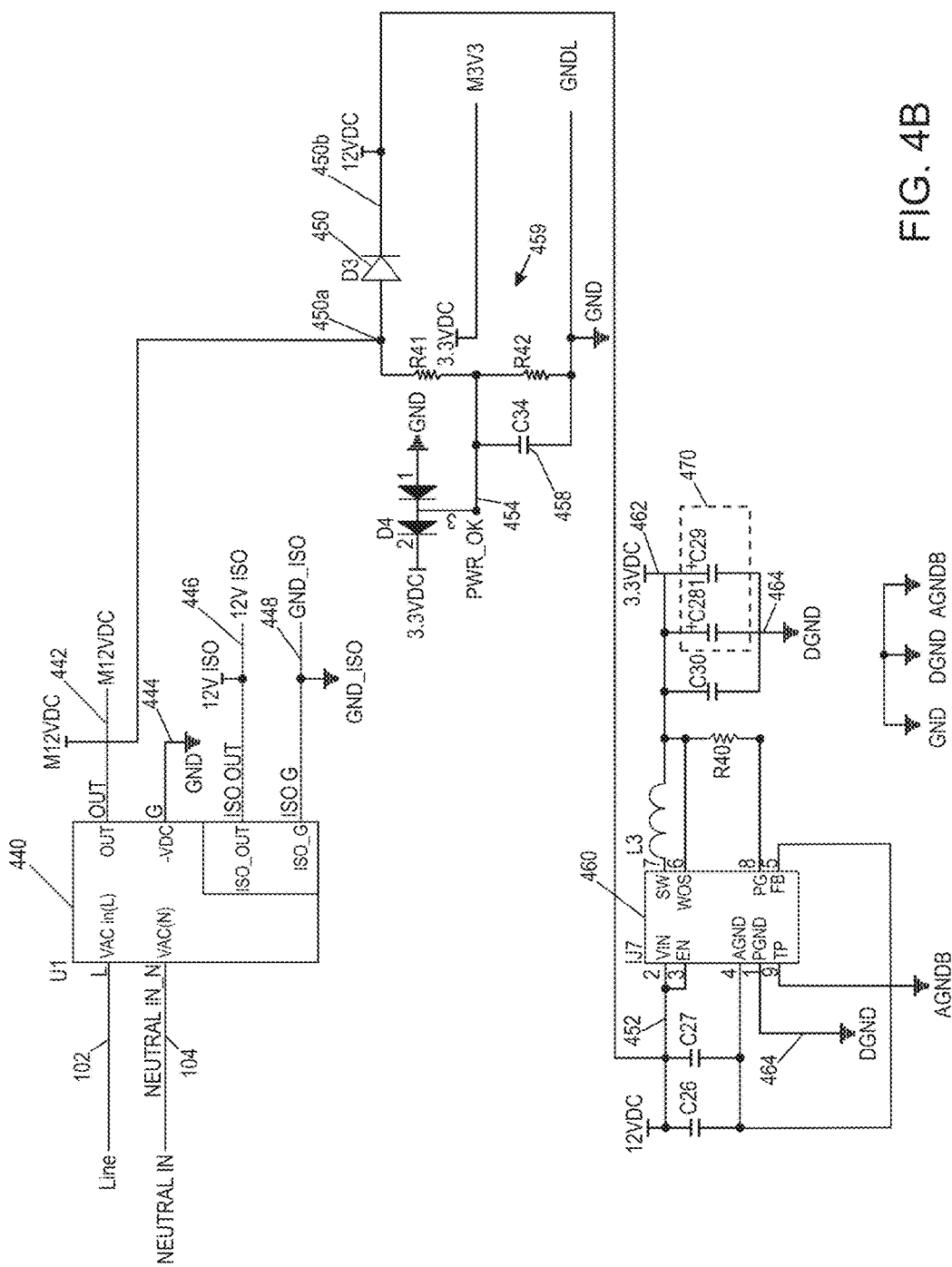
FIG. 4B is a power supply and power loss detection portion of the schematic block diagram of FIG. 4A.

Referring to FIGS. 4A and 4B, the AC/DC power supply 214 of the controller 70 can include two voltage regulators 440 and 460. A first stage voltage regulator 440 rectifies the AC power 102 and 104 to DC and provides a first DC voltage output 442 and ground 444 of, for example, about 12 VDC, and additionally or alternatively an isolated DC voltage output 446 and isolated ground 448 of, for example, about 12 VDC, for the 0-12 VDC dimming module 218. A second stage voltage regulator 460 provides a second DC voltage output 462, for example, about 3.3 VDC, and ground 464. The second DC voltage output 462 is coupled to a capacitive storage circuit 470 to continue to provide the second DC voltage output level for a period of time after AC power is lost. The radio module 212 and processor 216 are power by the second DC voltage output 462. A diode 450 is coupled between the two voltage regulators 440 and 460 with the anode 450*a* coupled to the output 442 of the first stage voltage regulator 440, and the cathode 450*b* is coupled to an input 452 of the second stage voltage regulator 460. The diode prevents the capacitive storage circuit 470 from discharging toward the first DC voltage output 442 upon loss of the AC power 102.

AC power loss is detected in two ways. First, AC power loss is detected by monitoring zero voltage crossing of the AC supply power 102. The processor 216 receives the AC power line 102 and 104 signals through power monitor 220 at AC input pins 480 and 481, which enable the processor to measure instantaneous AC voltage. Upon the processor 216 triggers AC power loss upon an absence of zero crossings detected over a specified period of time, for example, two or more zero voltage crossings during the period of time expected for 60 Hz AC power, for example about 20 msec.

The second way AC power loss is detected, or confirmed is by determining that DC voltage at the first DC voltage output 442 is lost. The processor 216 has an input/output port 486 coupled to the first DC voltage output 442 to monitor whether the voltage level at a junction between the first DC stage 440 and the second DC stage 460 reflects that AC power is provided (if the first DC voltage level is detected) or if AC power is lost (if a lower and/or declining DC voltage level is detected). To aid the detection of power loss at first DC voltage output 442, a capacitor 458 is coupled across the node between the output 442 and the anode of diode 450 and ground 448. Upon loss of AC power, the capacitor 458 will discharge through associated resistive voltage divider 459, which also provide a voltage detection level across the capacitor 458 that is scaled appropriately for port 486 of the processor 216. To aid the speed with which power loss can be detected by the process 416 via port 486, it has been found advantageous to set port 486 as an output port, set the output low, for example, for a few msecs., the set the port to input in order to catch the rising side of the port threshold rapidly if the voltage across capacitor 458 is already low. In contrast, if port 486 is always an output and capacitor 458 is discharging, it can take about 100 msecs. longer to detect a low voltage state at the descending side of the port threshold.

An additional feature is an optional power supply split of the controller circuitry powered by the second DC stage 460 so that upon detection of power loss, power can be disconnected from part of the controller circuit 210 and power from the capacitive supply 470 can continue to power only the portion of the control circuitry needed to transmit a power loss data message.

Figure 4C:
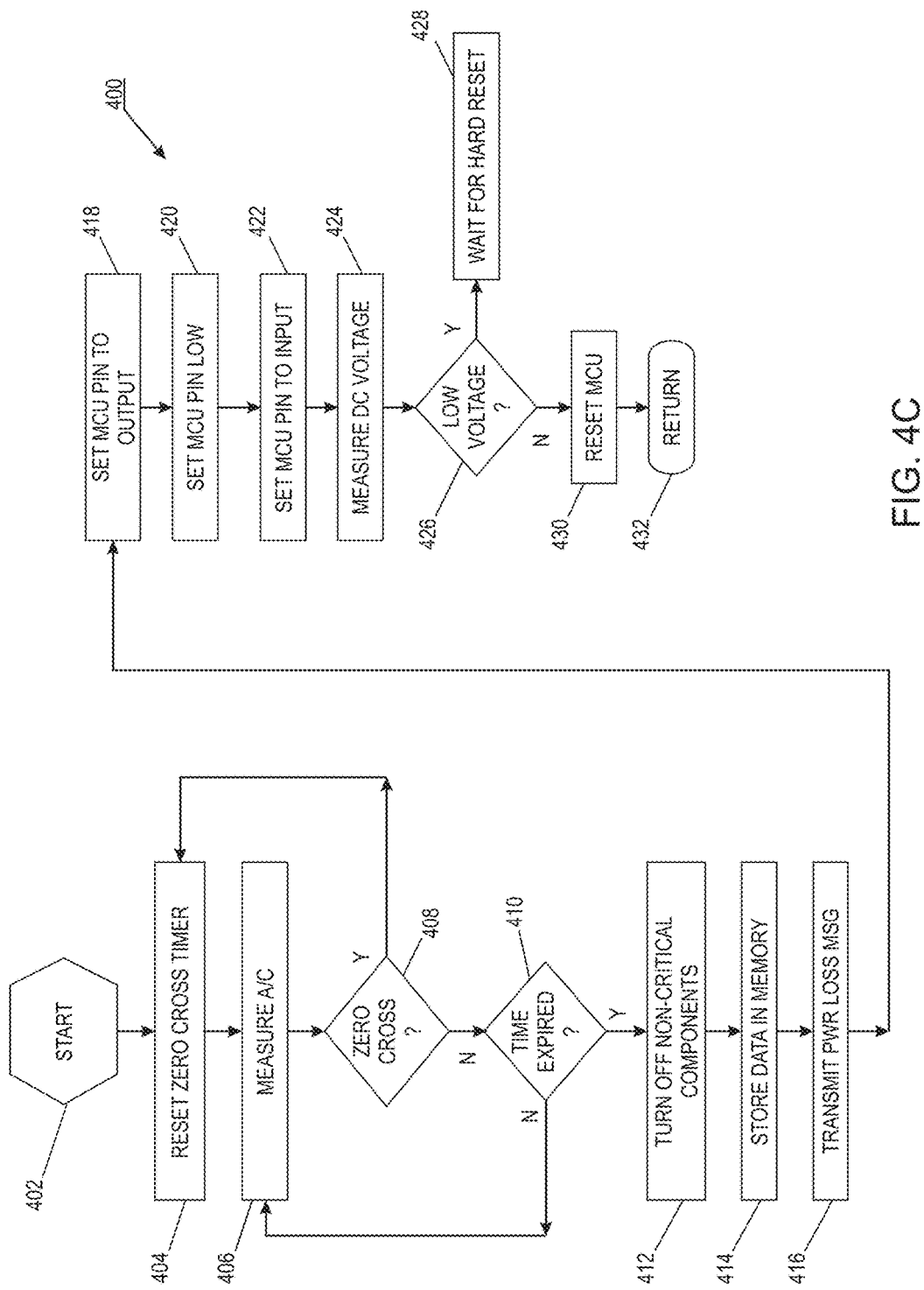
FIG. 4C is a flowchart representing an exemplary method of detecting and handling power loss for a device of the wireless control device control system of FIG. 1.

Referring to FIG. 4C, an exemplary method 400 of detecting power loss is illustrated. The method 400 can be provided by processor 216 of controller 70 and by the respective processors of other devices, including occupancy sensor 130. The method 400 begins in step 402. In step 404, the zero cross timer is reset. In step 406, the voltage of the AC power signal is measured. In step 408, it is determined whether the AC power is transiting zero volts, either ascending or descending. If a zero crossing is detected, method 400 continues at step 404. If zero crossing is not detecting, method 400 continues at step 410. In step 410, the processor 216 determines if the zero cross timer is expired, for example, 20 msecs. has elapsed. If the timer is not expired, method 400 continues at step 406, else method 400 continues at step 412. In step 412, the processor 216 can optionally turn off noncritical components of the controller 70 to limit the drain of power from the capacitive power supply 470. In step 414, the processor 216 stores configuration and other data in solid-state storage, for example, in a flash memory device that retains data after power loss and is associated with processor 216. In step 416, the processor 216 provides a power loss message to radio module 212 to transmit to gateway 24 via mesh network 28.

In step 418, the processor begins to verify AC power has been lost by checking the first DC voltage output 442 from first stage voltage regulator 440, for example, across capacitor 458, by setting port 486 to output. In step 420, the processor 216 port 486 is pushed to a low state, for example, for one or a few msecs. In step 422, the port 486 is set to input. In step 424, the processor 216 reads the state of port 486, which will reflect whether the first DC voltage output 442 is still above or below the port 486 state threshold, as scaled by resistors 459. In step 426, if the state of port 486 reflects a low voltage, AC power has been lost and the method 400 continues at step 428, else the method continues at step 430. In step 428, the processor 216 waits for loss of power and a hard power up reset. If power was not lost, in step 430, the processor 216 performs a soft reset in order to continue the normal functioning of controller 70. In step 432, the method 400 is complete.

Figure 10A:
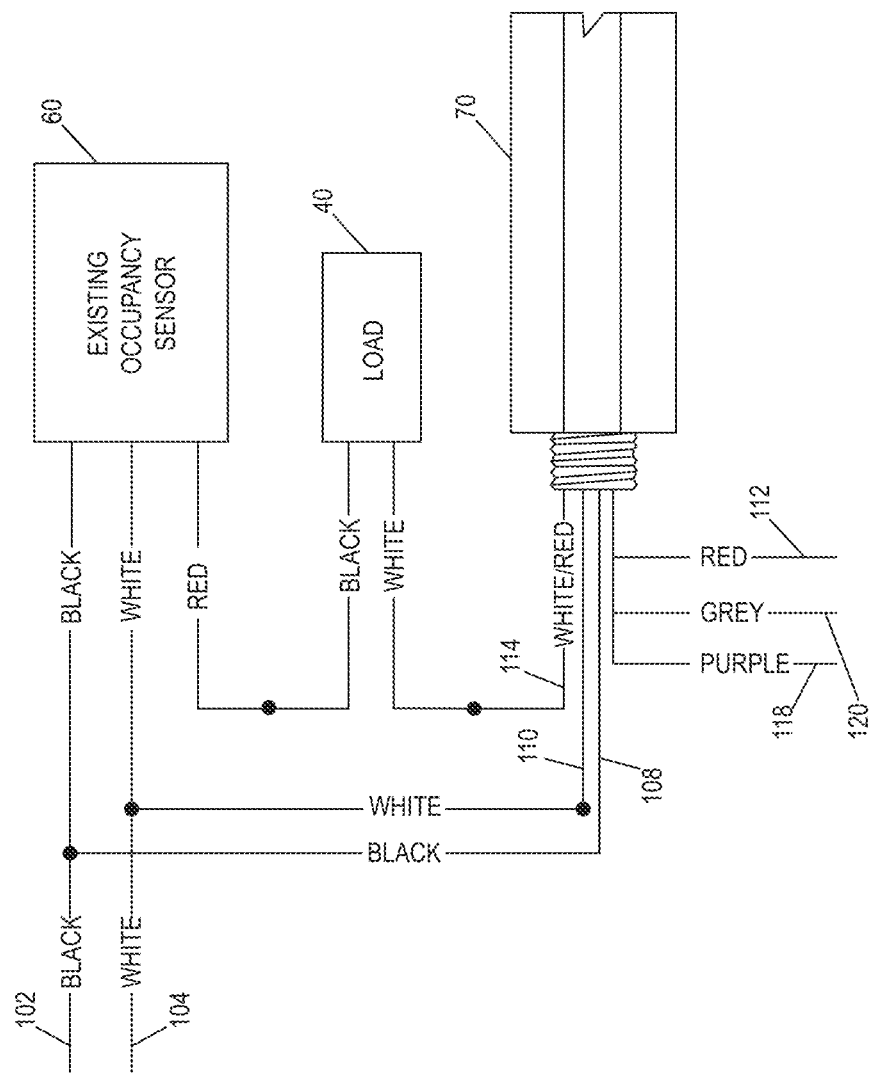
FIG. 10A is a simplified diagram illustrating installation of a controller having a first controller configuration.
Figure 10B:
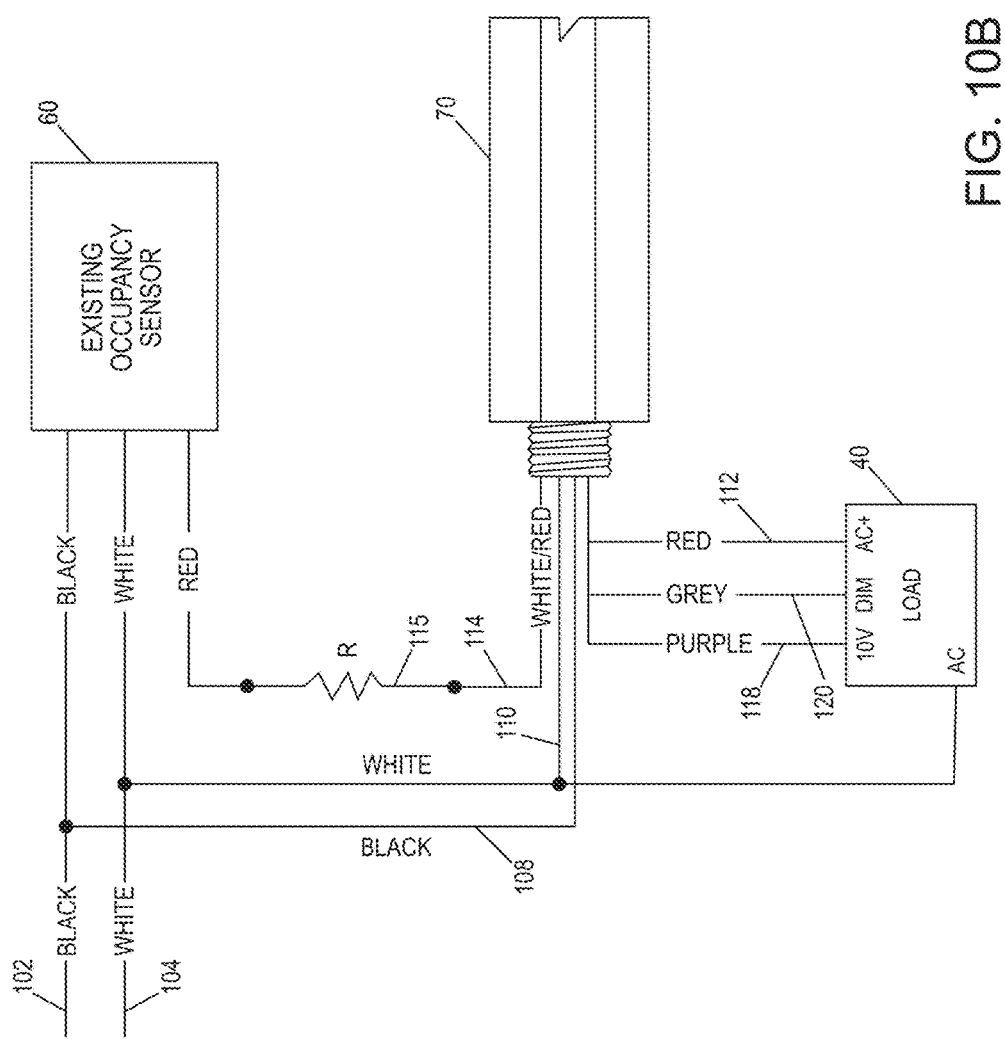
FIG. 10B is a simplified diagram illustrating installation of a controller having a first controller configuration.

FIG. 10A illustrates a first configuration of a controller 70 and load/light fixture 40 in which a third party device 60, for example an existing occupancy sensor, selective switches the AC supply line for the light fixture 40 and controller 70 provides an AC neutral line 114 for measure the power used by load 40 and indicating when the light fixture 40 is switched on and off by the third-party device 60. FIG. 10B illustrates a second configuration of a controller 70 and load/light fixture 40 in which the state of a third party device 60 is sensed by the power sensing module of controller 70, using a resistor R coupled between the switch line of the third party devices 60 and the sensed neutral line 114 of the controller 70, thus configuring controller 70 as a trigger. Advantageously, a load/light fixture 40 can be switched and dimmed by the same controller 70 by connecting the load to the switch AC supply output 112 of the controller 70, and the 0-10 VDC dimming output 118 and 120, if desired. Additionally, if desired, as with the occupancy sensor 130, the sensing of controller 70 can be related to the selection to power light fixture 40, or the sensing and output of the controller 70 can be independent and each relate to other devices or events in the site system 14.

Occupancy Sensor

Figure 5A:
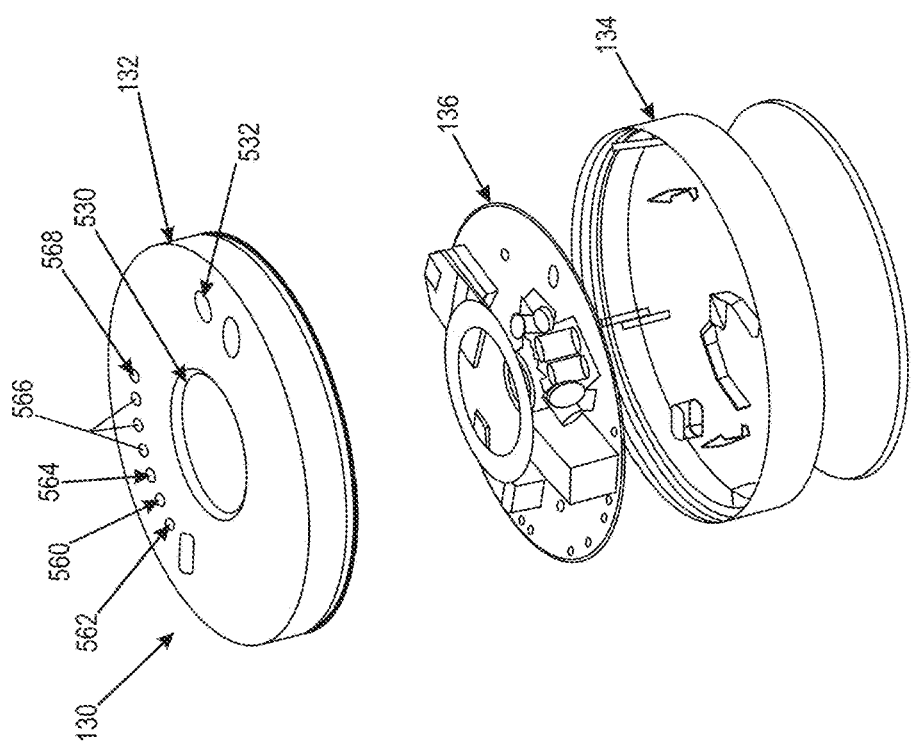
FIG. 5A is an exploded view of an exemplary embodiment of an occupancy sensor for use with the wireless device control system of FIG. 1.

Turning now to FIG. 5A, another type of system device 26 is an occupancy sensor 130, which may be similar to the sensor 38 introduced above. The occupancy sensor 130 may include top and bottom halves 132, 134 defining a generally cylindrical body enclosing a printed circuit board 136. The occupancy sensor 130 may be designed and configured for installation on or within an octagonal junction box in a ceiling; however, is not limited to ceiling installations. According to some embodiments, the sensor in occupancy sensor 130 may be a passive infrared (PIR) sensor (which will typically have an associated sensor lens, and which may be used to detect motion, such as a motion sensor 530), a light sensor 532 (which may detect ambient light), a microphone 534 or other sound sensor (which may detect audible sound as well as sound above or below the spectrum detectable by humans), a power sensor (capable of measuring AC voltage and current) and/or an ambient temperature sensor 540, including A/D converter 542. The occupancy sensor 130 is connected to a site network, such as the mesh network 28 of FIG. 1. The sensor may be used both for occupancy and vacancy sensing. That is, the occupancy sensor 130 may be configured to detect at least two events: when motion is sensed when the state was previously OFF, and when the stay-on period of time has lapsed after the last motion was sensed. As such, the occupancy sensor 130 may also be referred to as an occupancy sensor or a vacancy sensor.

Figure 5B:
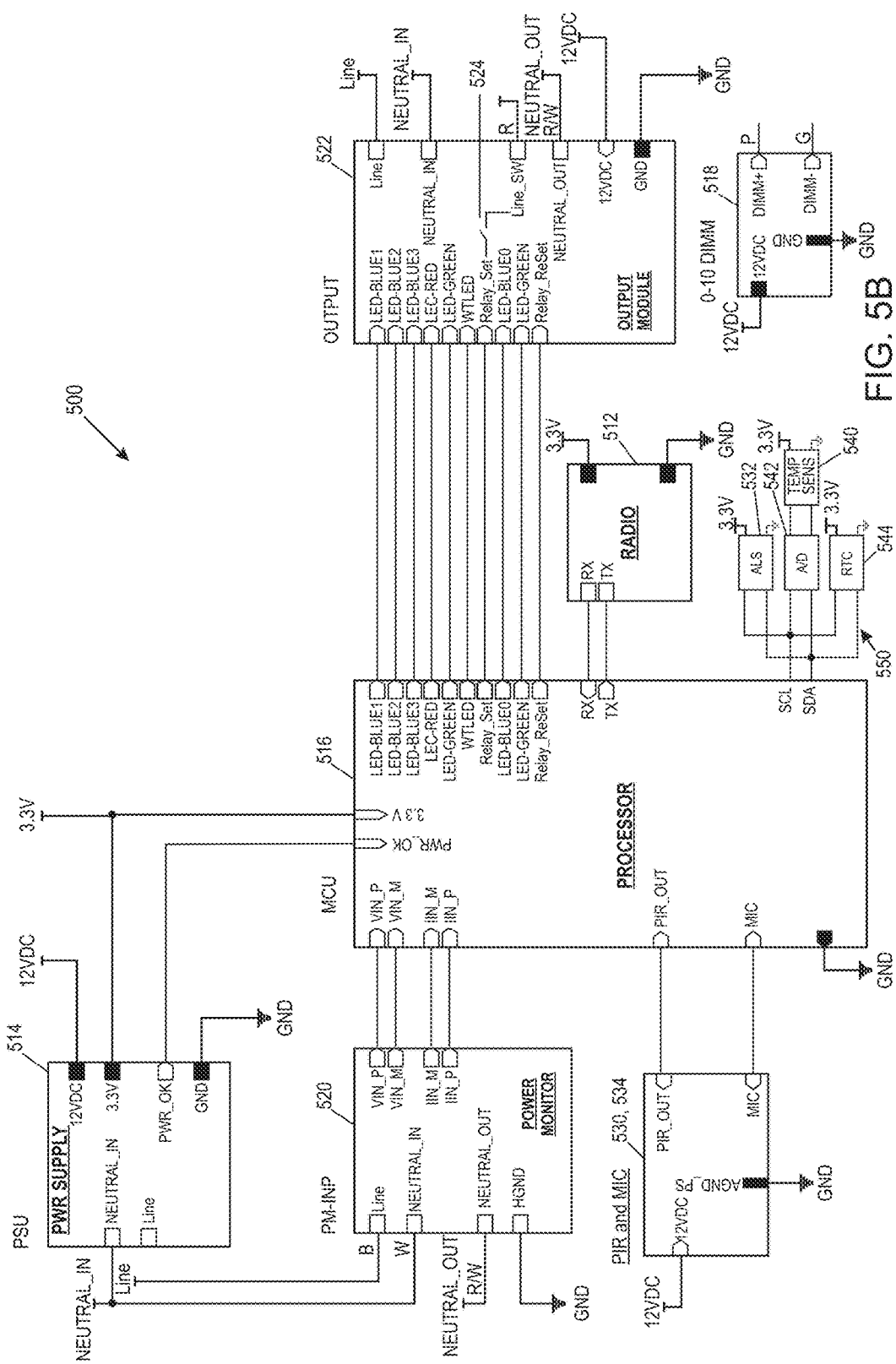
FIG. 5B is a schematic block diagram of the exemplary occupancy sensor of FIG. 5A.

In addition to the basic functionality, the occupancy sensor 130 of the present disclosure may include similar modules, and functionality, as the controller 70 described above. In particular, referring to the schematic block diagram 500 of FIG. 5B, and in addition to a power supply module 514, a processor 516 (e.g., a microcontroller), and an output module 522, the occupancy sensor 130 may also include a radio module 512 (such as a transceiver), such as an XBee® radio module for communicating using the Zig-Bee® protocol, a power monitoring module 520, and, according to some embodiments, a dimmer module 518. These modules may function as described above with respect to the controller 70.

Some of the modules and/or sensors of occupancy sensor 130 may be connected via an IC2 bus 550 or other communication protocol to communication with processor 516, for example, as shown for the light sensor 532, temperature sensor 540, and real-time clock 544 of block diagram 500.

The occupancy sensor 130 may include a relay 524 (such as a solid state or electro-mechanical relay) configured to switch mains power, as well as provide a dimming interface for dimmable drivers and ballasts, for fixtures installed on the same circuit. In addition, the occupancy sensor 130 may be capable of power usage measurements, measuring power usage over a period of time, or detecting a power event. Also, the occupancy sensor 130 may be configured to send a power loss message similar to that described above with respect to the controller 70. Further, the sensor and actuation mechanisms may be separately addressable and, thus, independently controlled, if desired, through the application user interface for the device control system 10.

Embodiments of the occupancy sensor 130 advantageously include a sensor module, including the motion sensor 530, light sensor 532, microphone 534, and temperature 540, and an output module, including relay 524 and dimming module 518, that are independently programmable devices selectively programmed according to one or more specific behaviors. The behaviors for the sensor module and output module can be programed to act or can be programed to have completely unrelated, independent functions. For example, one such programmed behavior can be that the dimmer or relay only changes state if the sensor module detects a condition in combination with some other separately detected condition, such as the sensor module detecting the presence of a person and a separate condition, such as the position of a wall switch or the time of day being within a specific period. Another such programed behavior can be the relay has no relationship to the sensor, i.e., the dimmer or relay is programmed to change state based on a separate condition, such as the position of a wall switch, the time of day, or a sensor separate from the device and its housing (and possibly located away from the device).

In some embodiments, a user may select the light fixture being affected/controlled by the sensor module. For example, the user may select whether the light fixture to which the device is attached and/or one or more remote light fixtures to which the device is not attached illuminate when the sensor module detects a person. In one example, the light fixture to which the device is attached can be operated according to the occupancy function (or the vacancy function) as described below based on the output of the sensor module. In a second example, a remote light fixture to which the device is not attached can be operated according to the occupancy function (or the vacancy function) as described below based on the output of the sensor module.

In some embodiments, the wireless lighting system in which the occupancy sensor operates includes a system controller (gateway 24 and/or remote server 18) storing the programmable behaviors.

One of the programmable behaviors is optionally an occupancy function, which may be referred to as auto-on and auto-off control. Here, the processor sends a data message to the relay to illuminate at least one light fixture when the sensor detects a triggering event (e.g., a person entering the room in which the sensor is located), and wherein the processor sends a data message to the relay to extinguish the at least one light fixture when the sensor detects a second triggering event (e.g., a person no longer being in the room). In some embodiments, a timeout for the occupancy function can be specified, such as in minutes, by the user. The occupancy timeout specifies the time after the last detection of occupancy before the space is considered unoccupied. When the space is unoccupied the auto-off selection can set a user-configurable illumination level of 0-100%.

One of the programmable behaviors is optionally a vacancy function, which may be referred to as manual-on and auto-off control. Here, the processor ignores the device's sensor (e.g., the processor will not send a data message to the relay when the sensor detects a triggering event such as a person entering a room) until receiving additional data, such as data from the wireless transceiver. In at least one embodiment, the processor sends a data message to the relay to illuminate at least one light fixture when the processor receives data from the wireless transceiver (i.e., the transceiver indicates to the processor that a remote switch (e.g., a standard-type wall-mounted light switch) has been actuated to turn the lights on), and sends a data message to the relay to extinguish the at least one light fixture when the sensor detects a triggering event (e.g., a person no longer being in the room).

In some embodiments, the vacancy function is similar to the occupancy function, except the processor will not send commands to illuminate one or more light fixtures when the sensor module detects a person in the room, but the programmer will instead send output commands to illuminate one or more light fixtures when a user actuates a remote switch (which may be wired or wirelessly connected to the device). When the sensor no longer detects a person in the room, the programmer will output a command to turn off the one or more light fixtures either immediately or after a preset delay. Moreover, if the sensor does not detect a person, then subsequently detects a person again within a user-selectable time (e.g., 2 minutes) the system automatically turns the lights back on without requiring the user to actuate the external switch. As an example, when a person enters a room with one of these devices, the person must actuate a light switch to turn the lights on even though the sensor "sees" the person. And, the lights automatically turn off (either immediately or after a preset time) after the person exits the room. Then, if the person re-enters the room within a pre-set time (e.g., within 2 minutes), the system will automatically turn the lights back on without requiring the user to actuate the light switch. However, if the person re-enters the room after the pre-set time (e.g., after 2 minutes), the system will not automatically turn the lights back on and will require the user to actuate the light switch.

The occupancy function, the vacancy function, and their parameters can be selectable configurations from a user interface. Additionally, in occupancy mode, the microphone 534 sensing occupancy can turn the light fixture on. Additionally, in vacancy mode, for a preset period of time after the last motion sensor 530 activation, the microphone 534 sensing occupancy will also turn the lights back on.

The functionality of a device 26 may be changed at different times of the day. For example, an occupancy sensor mounted at the entrance to an office space can turn on the lights in the entrance area when the sensor detects a person during office hours, but after hours the sensor can turn on all the lights in the office area when the sensor detects a person.

Similar to the controller 70 (and devices 26 in general), embodiment of the occupancy sensor are optionally capable of power monitoring, e.g., power usage measurements of the current flowing through the occupancy sensor and to the lights being controlled by the occupancy sensor, measuring power usage over a period of time, and/or detecting a power event. The device may also be configured to send a power loss message when the device detects a power loss.

The time interval used by the occupancy sensor to report to the gateway (e.g., power consumption) can also be adjusted/set The occupancy sensor 130 may also include user interface features and functionality similar to that of the controller device 70. In particular, the occupancy sensor 130 may include a device identification button 560, motion indicator 562 (such as a color-coded light, e.g., green, used to indicate when the sensor has detected a threshold level of motion, sound, light, temperature, etc.), power indicator 564, signal strength indicator 566, and status indicator 568, which may function as described above with respect to the controller 70. Further, it should be appreciated that functionality normally controlled at the device level for conventional occupancy sensors may be controlled through the application user interface for the device control system 10, discussed below in greater detail. For example, on-time or stay-on period, sensitivity, and photosensitivity are some parameters that may be controlled through the interface, according to the present disclosure. The occupancy sensor 130 may also including power consumption monitoring like controller 70.

Daylight Harvester

Figure 6A:
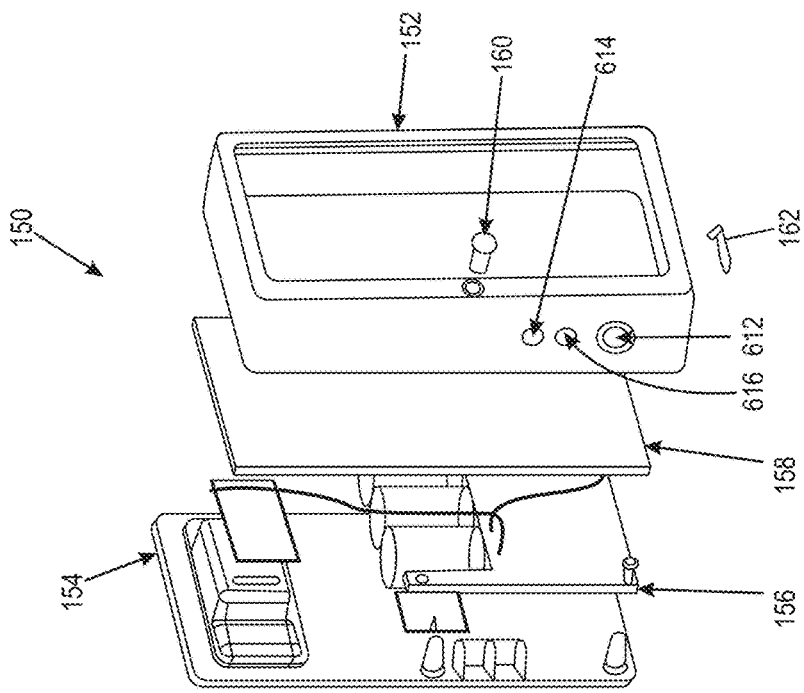
FIG. 6A is an exploded view of an exemplary embodiment of a daylight harvester for use with the wireless device control system of FIG. 1.
Figure 6B:
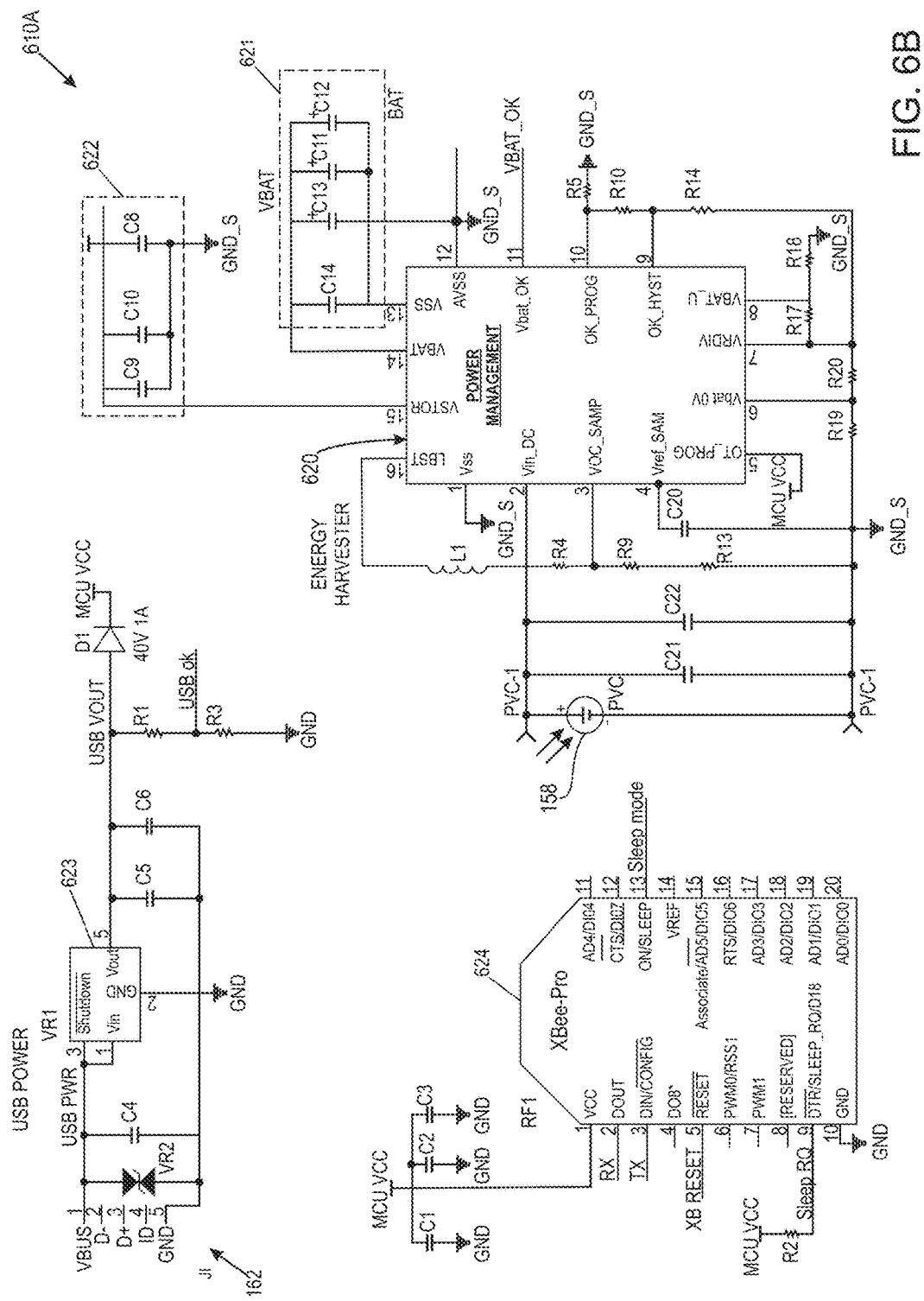
FIG. 6B is a first portion of a schematic block diagram of the exemplary daylight harvester of FIG. 6A.
Figure 6C:
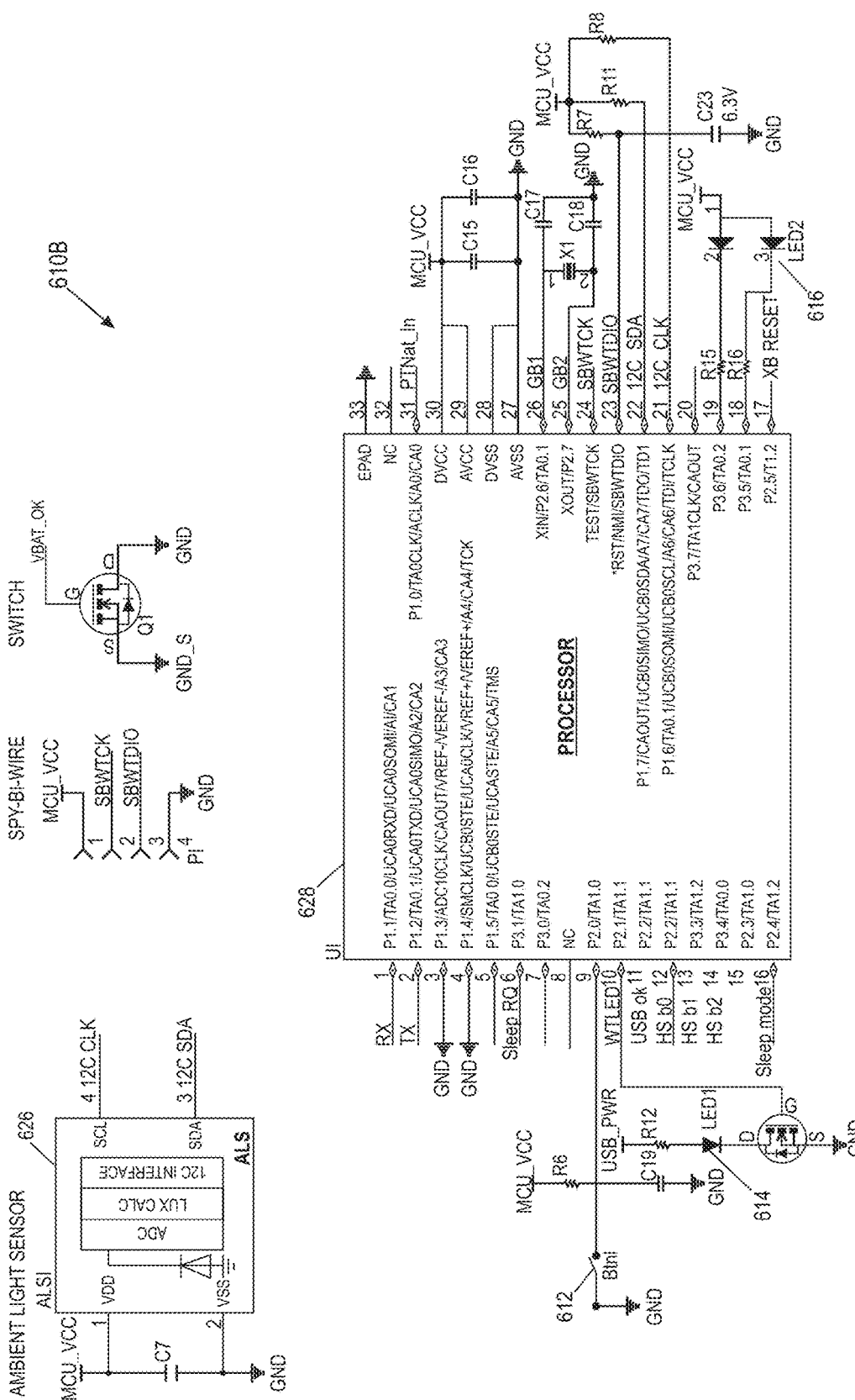
FIG. 6C is a second portion of a schematic block diagram of the exemplary daylight harvester of FIG. 6A.

Another exemplary system device 26 is a daylight harvester 150, shown in FIG. 6, which may be similar to the daylight harvester 39 introduced above. The system 14 can be configured to dim or switch light fixtures in response to light level measure by daylight harvester 150. More specifically, the daylight harvester is operated using open-loop control and it reacts to different sunlight levels, e.g., in a first mode the lights are illuminated and extinguished when the light sensor detects ambient light above/below a predetermined level. In another open-loop control mode, multiple thresholds are set and the lights are illuminated, dimmed, and extinguished depending on the ambient light sensed relative to the various thresholds. An ambient light sensor module 626 does not distinguish between daylight and room light; therefore, it is important to position and angle the daylight harvester where it will maximize receipt of daylight for both powering the device and controlling the light fixtures based on ambient light.

The daylight harvester 150 may generally include top and bottom halves 152, 154 defining a generally rectangular body enclosing a printed circuit board 156. The daylight harvester 150 may be wireless, operating off of solar power. In particular, the daylight harvester 150 may include a solar cell 158 (e.g., a photovoltaic (PV) cell) that converts energy from light into electricity for storage and for powering the device 150. A typical position for location of the daylight harvester 150 during operation is in a location where it receives direct sunlight, such as being positioned on a window ledge.

As with the occupancy sensor 130 the daylight harvester 150 may include similar modules and functionality as, for example, the controller 70; however, to conserve power, the daylight harvester can provide single-direction information to the gateway 24, and end device, and may not function as a repeater in the mesh network 28.

The daylight harvester 150 may also include a light pipe 160 for transporting or directing ambient light to an ambient light sensor module 626 of the printed circuit board 156. The light sensor module 626 may be a digital light sensor module and may be used for measuring ambient light entering into a space through a window or skylight, as is known to those skilled in the art. The light sensor module 626 may take light readings at predetermined intervals and may, in turn, transmit light levels to the system 10, or more particularly the gateway 24 of the system 10, at predetermined intervals. For example, the daylight harvester 150 may take light readings at one minute intervals and may transmit light levels at five minute intervals. Additional information may be gathered, stored, and/or transmitted. For example, the daylight harvester 150 may be configured to transmit a run-time average, an average since the last transmission, and/or the most recent peak light level. Actuation of a button 612 provides instantaneous light level readings and transmission on demand.

The daylight harvester 150 can have at least two different power modes for operation. According to a first example mode, the daylight harvester 150 may be solar powered, as described above, operating solely off of solar power. As such, the daylight harvester 150 may be configured to enter a sleep mode, to conserve power, when the device 150 is not measuring and/or transmitting. Further, the daylight harvester 150 may completely cease operating at night, and begin to operate again when solar power is available by re-commissioning itself and reentering the wireless mesh network. Yet further, the daylight harvester 150 may be configured to monitor the charge on the voltage bus and make decisions regarding whether or not to transmit data based on detected power levels. For example, if the power level is low and insufficient to transmit data, the daylight harvester 150 may delay the transmission of data for a predetermined delay period or until the power increases beyond a predetermined limit. An advantage realized by embodiments of the daylight harvester that conserve power is the ability to use higher power communication devices (e.g., transceivers) to communicate with the mesh network and the gateway.

According to a second example mode of operation, the daylight harvester 150 may receive power through a USB or micro-USB plug 162. When in the USB powered mode, the daylight harvester may remain on and connected to the network, such as mesh network 28. The second mode can be used to commission the daylight harvester 150 upon initial installation.

A third mode of operation may include a hybrid power mode, including the use of solar power and USB power.

In at least one embodiment, which may be referred to as a single-trigger embodiment, room lighting will be turned off (or to a dimmed state) when the sensor measures light levels above a first predetermined threshold, and room lighting will be turned on when the light sensor detects light levels below a second predetermined threshold (which may be equal to or different than the first predetermined threshold).

In another embodiment, which may be referred to as a multi-trigger embodiment, multiple light level thresholds may be used as triggering events for adjusting room lighting. For example, when sensed light levels exceed a first threshold, room lighting is dimmed, and when sensed light levels exceed a second/higher level, room lights are turned off. Similarly, when light levels fall below a third and/or fourth threshold, which may or may not be equal to either the first or second thresholds, room lighting is increased.

Embodiments of the daylight harvester may optionally be operated using open-loop control. For example, the daylight harvester will react to different sunlight levels, e.g., the lights are illuminated/extinguished/dimmed when the light sensor detects ambient light above/below a predetermined level.

Some embodiments of the daylight harvester may optionally be operated using closed-loop control logic. For example, when using an example closed-loop control scheme the lights are continually adjusted to maintain a particular light level in the room, e.g., a feedback loop is used to increase or decrease room lighting to achieve a preset level. When operating a daylight harvester using closed-loop control, the daylight harvester can be positioned away from the window and within the room to sense the light level where the ambient light will most be used by a person in the room (e.g., on or near a work surface). In this mode of operation, it may be advantageous to have the daylight harvester connected to a power source such as USB power if the combination of room light and ambient light may not be sufficient to power the daylight harvester.

Since the daylight harvester is usable within a network with multiple light fixtures, the daylight harvester may be used to affect the illumination of multiple lights in multiple locations.

Referring to FIGS. 6A and 6B, a first and second portion of block schematic diagram 610A and 610B are shown. The exemplary embodiment of daylight harvester 150 includes a power management module 620 coupled to the solar cell 158, battery 621, and capacitor storage 622. For example, the power management module 620 efficiently acquires and manages energy and may include a single chip power management device such as part number bq25504 available from Texas Instruments of Dallas, Tex. Radio module 624 for communication with mesh network 28 may be, for example, part number XXB24-Z7PIT-004, a Zigbee-Pro RF radio module available from Digi International of Minnetonka, Minn.). The USB power input couples to a voltage regulator 623, for example, part number AP2127K-3.3TRG1, available from Diodes Inc., of Plano, Tex. A processor 628 (such as part number MSP430G2553IRHB32R, a microcontroller available from Texas Instruments of Dallas, Tex.), provides overall control of the various other modules and provides input/output ports for indicators 614 and 616 and button 612. The ambient light sensor 626 can be, for example, part number TSL45315CL available from AMS-TAOS USA, Inc., of Plano Tex.

Gateway

At least one gateway, such as gateway 24 above, is installed to communicate with devices 26 at a site 14. With continued reference to the system 10 of FIG. 1, the gateway 24 manages the mesh network 28 and communicates with the server system 12. As will be described below, the gateway 24 ultimately controls the devices 26, with control information mirrored from the server system 12, with which users 42 and user computer devices 16 directly interact. According to at least one embodiment of the present disclosure, the gateway 24 communicates with the server system 12 via cellular or, in some particular embodiments, machine-to-machine cellular. As such, the gateway 24 may be provided with a subscriber identity module (SIM) card for facilitating communication over a cellular network, for example, private, encrypted 3G cellular connection independent of any site networks. This connection may be maintained while the gateway 24 is powered on, and, by avoiding the use of an Ethernet, WiFi, or other shared internet connection, may be more secure than alternative communications means.

Embodiments for packet routing through mesh network 28 include ad hoc network routing where the shortest path from a device 26 to the gateway 24 is continually updated and used for communications. Still other embodiments utilize source routing where a routing path from a device 26 to the gateway is initially set and remains unchanged until the routing path is updated at a later (typically predetermined) time. Still other embodiments will utilize ad hoc rooting when there are a particular number of nodes in the mesh network 28 (e.g., 40 or less) and will utilize source routing when there are a different number of nodes in the mesh network (e.g., >40 nodes).

Illumination Protocols

Figure 11:
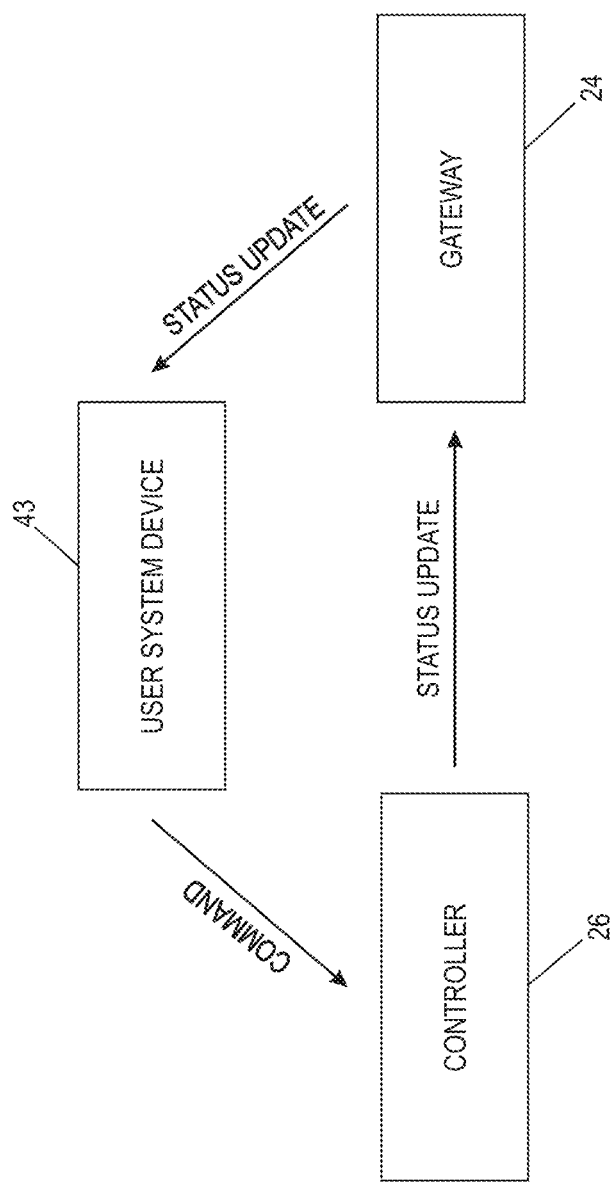
FIG. 11 is an exemplary communication flow for device-to-device control in the site system of the wireless device control system of the present disclosure.

Referring to FIG. 11, other embodiments of the present disclosure can address illumination latency issues using a point-to-point (device-to-device) control scheme in which packets containing commands are sent directly from one device 26 to another device 26, rather than having to route through the gateway 24. For example, a local user system interface 43 (e.g., a tablet device) associated with mesh network 28 provides instructions to the controller 70 for the light fixture 40. The user system device 43 will send the command (e.g., on, off and/or dim) packet directly to the controllers 70 for the light fixtures, i.e., bypassing the gateway 24, then each controller 70 can send a response to the gateway 24 to inform the gateway that the command was received and/or a change in status of the controller (or light fixture) had occurred. Other devices such as occupancy sensors 130 and controllers 70 that are configured in site system 14 to control another device 26 can similarly employ point-to-point packet routing and control.

Deployment Plan

According to some embodiments, it may be desirable to test or validate device installation locations at site 14 before installing. In embodiments where the gateway 24 communicates via a cellular network, the gateway 24 is typically installed at a location having a good cellular signal. The devices 26 are also typically installed such that they communicate with the gateway 24, either directly or indirectly (such as through other devices 26 of the wireless mesh network 28). With the devices 26 powered on, the installer can ensure that the devices have a "good" signal indication to ensure good communication with gateway 24. If the signal is unacceptable, the devices 26 may be relocated or additional devices may be added between the particular device 26 and the gateway 24.

Installation

The installation of a site system 14 may be based on a deployment plan, if one exists, and can begin with the locating and powering on of the gateway 24. Once the gateway 24 is powered on, it can be recognized by system 12 (either by the user taking action, such as by pressing a button on the gateway, or automatically without the need for user input) and associated with a user organization account. Devices 26 may then be mounted and powered. In alternate embodiments, devices 26 can be mounted and/or powered before creating a user organization account, powering on the gateway 24, or associating gateway 24 with a user organization account. Devices 26 that are mains powered (AC power supply) are typically designed to be inserted into a junction box or other similar enclosure. As shown in FIG. 8, a controller 70 may be mounted with switched mains power connected in a high voltage area 170 and dimming control connected in a low voltage area 172. A controller 70 having dimming and current sensing capabilities may be mounted and connected to mains power 180 and a load/electrical device 182. Alternative wiring installations are shown in FIGS. 10A and 10B.

A key aspect to the positioning of devices 26 is that adequate signal strength the gateway 24 or other device 26 of mesh network is provided as indicated by the mesh network signal strength indicators 94, as previously discussed. In some cases, one or more additional devices 26 may need to be installed to act simply as mesh network 28 repeaters, only serving to relay packet traffic between devices 26 of the mesh network that otherwise would lack adequate signal strength for reliable communication.

Other devices 26, such as an occupancy sensor 130 (see, e.g., FIG. 5A) and daylight harvester 150 (see, e.g., FIG. 6A) may be mounted as per a deployment plan and powered on. For example, the occupancy sensor 130 may be connected to mains power in a manner similar to that shown above with respect to the controller 70. Some embodiments of the daylight harvester 150 do not require mains power and may be powered using the USB port 162 or using solar power for initial installation, as described above.

Address numbers or identification numbers may be provided for the gateway 24 and the devices 26. Recording these numbers and, in particular, the association of the device numbers and the mounting locations, such as circuit, physical position or location, etc., may be useful during the commissioning process.

Commissioning

Once the hardware has been mounted and powered on, it may be commissioned, during which the device enters the network and is identified by the server system 12. In at least one embodiment, the devices being mounted and powered on will self-commission, greatly simplifying installation. For example, in at least one example embodiment, the gateway 24 self-commissions by automatically identifying itself to the device control system 10 and with a user organization account.

Once one or more items of hardware of site system 14 (e.g., gateway 24 and/or any device 26) is mounted (or positioned) in the appropriate location and powered on, the hardware (e.g., gateway 24 and/or the device 26) will self-commission by automatically initiating communications with server system 12 (which for a device 26 will typically occur by communicating to system 12 via gateway 24) and identifying itself to server system 12, which may occur over a cellular telephone network as previously described.

When the devices 26 are powered on, they can wirelessly and automatically attempt to communicate with the gateway 24 via the mesh network 28. In particular, the devices 26 can identify themselves to the gateway 24 and the gateway 24 can inform the server system 12 of the devices 26. See, e.g., step 714 of FIG. 7. According to some embodiments, a proprietary link key may be used to secure communications between the gateway 24 and devices 26, even during initial commissioning, for example, according to method 1200 shown in FIG. 12A, discussed further below. When device 26 is powered on an encrypted identity package may be repeatedly transmitted in order to seek to join mesh network 28. The identity package may be encrypted by the proprietary link key and may include an identification key unique to each individual device 26. The gateway 24 may receive and decrypt the identity package for a particular device 26. Of course, alternative methods of encryption and/or authentication may be used.

If identity package meets preset criteria in gateway 24, which may be updated by server 18, the gateway 24 may perform the following: (1) allow device 26 to join mesh network 28 and transmit single acknowledgement message to device 26; (2) transmit updated status information to notify server 18 that the specific device 26 has joined. If device 26 receives the acknowledgment message, (3) device 26 will stop transmitting the encrypted identity package. However, if the identity package does not meet preset criteria in gateway 24, gateway 24 will not execute either step (1) or (2) above.

The acknowledgment message typically includes a specific device 26 unique identification key, so only the specific device 26 that has been recognized by the gateway 24 and mesh network 28 is identified. The device 26 may be reset so that the device begins repeatedly transmitting an encrypted identity package, and manually reinitiate steps 2-3 above when a user 42 actuates physical switch 85 on device 26, for example, controller 70, which may include actuating and holding switch 85 in actuated position for a predetermined period of time, such as, for example, at least 10 seconds.

Once the hardware of site system 14 has been installed, the hardware can be associated with a user organization account for the device control system 10, which may be accomplished automatically, such as if an account has already been established, or by an administrator of server system 12.

Embodiments including hardware that self-commission greatly enhances the usability of these systems. The user need only power on the hardware (typically after mounting and wiring with light fixtures 40) to have the hardware communicate with server system 12 and have server system 12 identify which specific device self-commissioned. As such, no special training may be required, other than potentially having an electricians certification depending on local laws, to have one or more devices fully integrated into the network and into an operational system. In situations where the user does not have a user organization account, the self-commissioning process speeds the installation process. In some embodiments, a user without an organization account can have an account established and have the device (e.g., a controller) fully integrated into the network within minutes (e.g., less than 1 minute in some embodiments, and less than 5 minutes in other embodiments).

If registration has not yet occurred, it can occur at this point in the process. To reiterate, the gateway 24 may be associated with an account, such as, for example, by a user or administrator accessing or creating an account over the Internet. Alternatively, a user may call a customer service representative to assist in establishing a user account and/or the commissioning process. Yet alternatively, an interactive voice response system may be integrated with the device control system 10 to assist in the registration and/or commissioning process. Ultimately, as shown in a user interface 1900 of FIG. 19A, a gateway identification code 1906 for the gateway 24 is typically associated with a particular organization account and site, such as site system 14.

Figure 7:
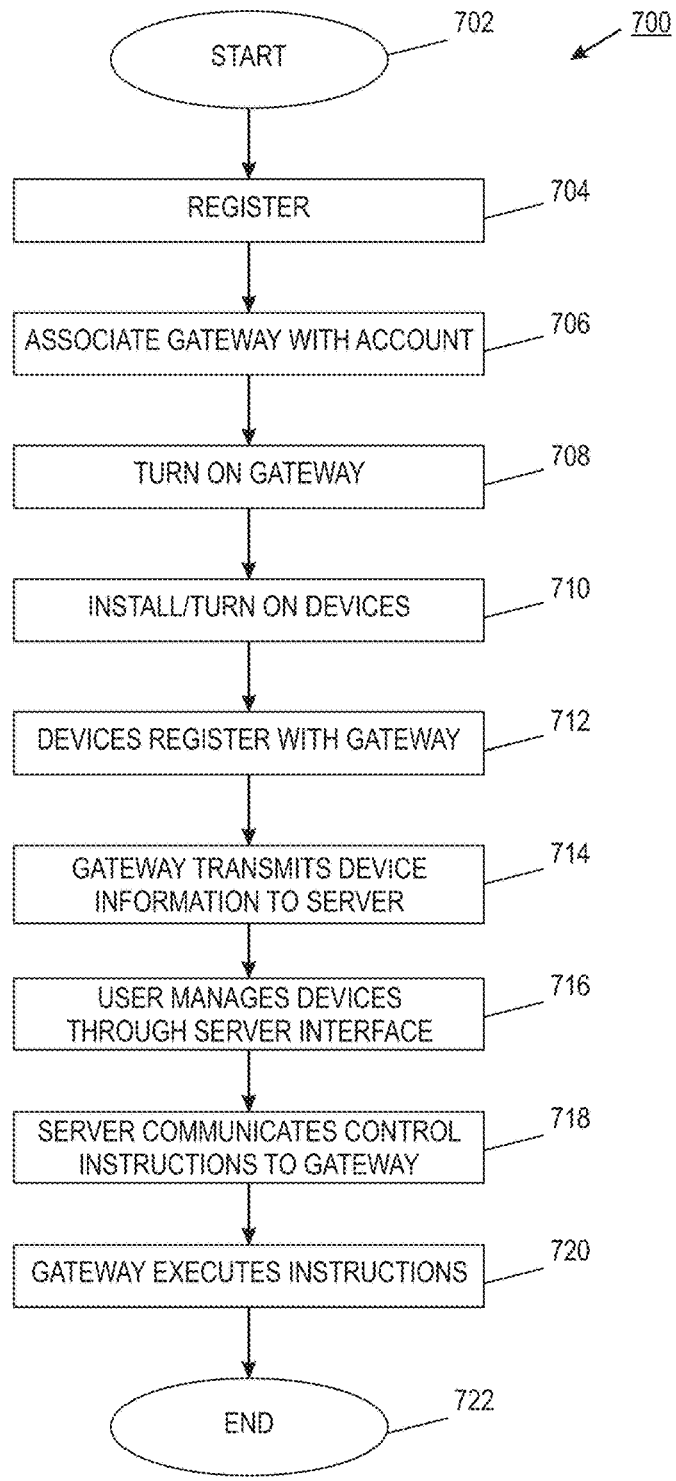
FIG. 7 is a flowchart representing an exemplary method for commissioning a site system of the exemplary wireless device control system of FIG. 1.

A flowchart 700 representing an exemplary method of commissioning and/or configuring a site, such as site system 14, is shown in FIG. 7. The method begins at a START, step 702, and proceeds to a first step, shown at step 704, in which registration occurs. In particular, a user, such as one of users 42, may access the server system 12 using an appropriate interface, such as a web-based or native application, to register and/or create an organization account and add users and/or administrators. Alternatively, an administrator may register users 42 and create user accounts. After registration, a gateway, such as gateway 24, may be associated with an organization account, at step 706. This may be accomplished by entering a unique gateway identification number through the application, or other appropriate interface, or the gateway 24 may be pre-configured with an association to an existing account.

With the association in place, when the gateway 24 is powered on, at step 708, the gateway 24 may appear on a user interface of the user device, such as one of the user computer devices 16. Devices 26 may be designed such that upon power up they automatically attempt to register with the gateway 24 after they are powered on, at steps 710 and 712. That is, when a device 26 is powered on, it wirelessly and automatically attempts to communicate with the gateway 24. In particular, the device 26 identifies itself to the gateway 24 and the gateway 24 informs the server system 12 of the device 26, at step 714. In some embodiments, and as described below for methods 1200 and 1250, the gateway 24 may prevent new devices 26 from using the proprietary link key to join the mesh network 28 unless a customer service representative and/or organization administrator has set the site system 14 and gateway 24 to allow new devices to join. For example, referring to FIG. 19B, by selecting an add devices mode 1906 on the user interface.

After devices 26 have joined the mesh network and registered with gateway 24 and server system 12, the user 42 may then be able to manage devices 16 through the user interface, at step 716, as will be discussed below. Users 42 may have various levels of access and control with regard to a particular site and/or particular device 26. After configuration, the server system 12 communicates control instructions to the gateway 24, at step 718, and the gateway 24 may execute the instructions, at step 720. Updates provided by the user 42 may be forwarded from the server system 12 to the gateway 24. In addition, the gateway 24 may receive various information from the device 26, and may send, or relay, various updates to the server system 12. Ultimately, the method proceeds to an END, at step 722.

Figure 20:
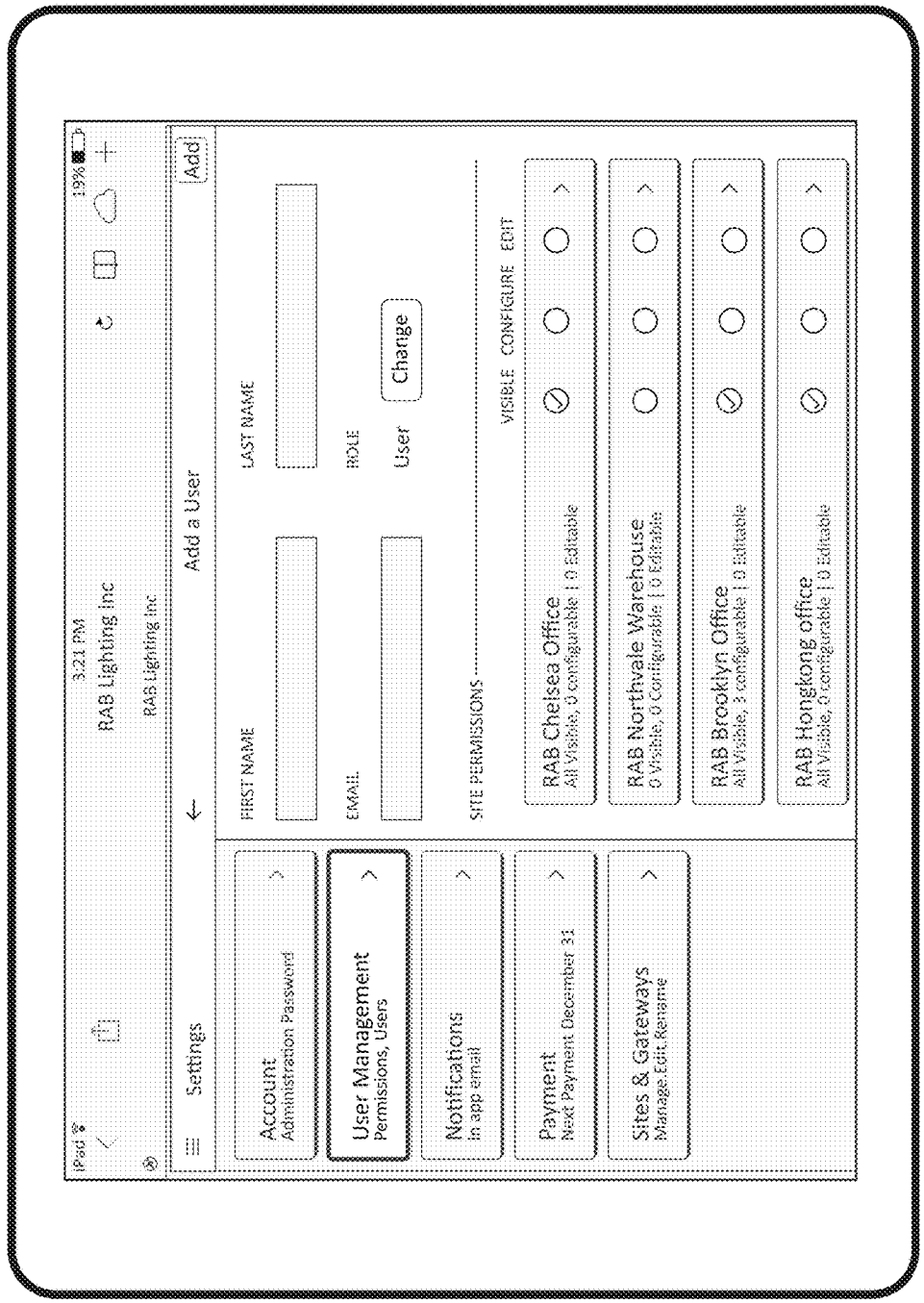
FIG. 20 is an exemplary screen capture illustrating adding a user from a front-end user interface application according to the present disclosure.

After the device 26 communicates with the gateway 24 and the gateway 24 communicates information about the device 26 to the server system 12, the device 26 may be managed within a user interface. That is, with continued reference to FIG. 1 and additional reference to FIG. 6, representations, such as, for example, graphical and/or textual representations, of the device 26 may be displayed on a user interface 1500 of one of the user computer devices 16, as shown for example in FIG. 15. Additionally, when a user 42, particularly an organizational administrator, logs into their account, all sites, or site systems 14, associated with the user 42 may be visible through the user interface as shown in FIG. 20.

Figure 21A:
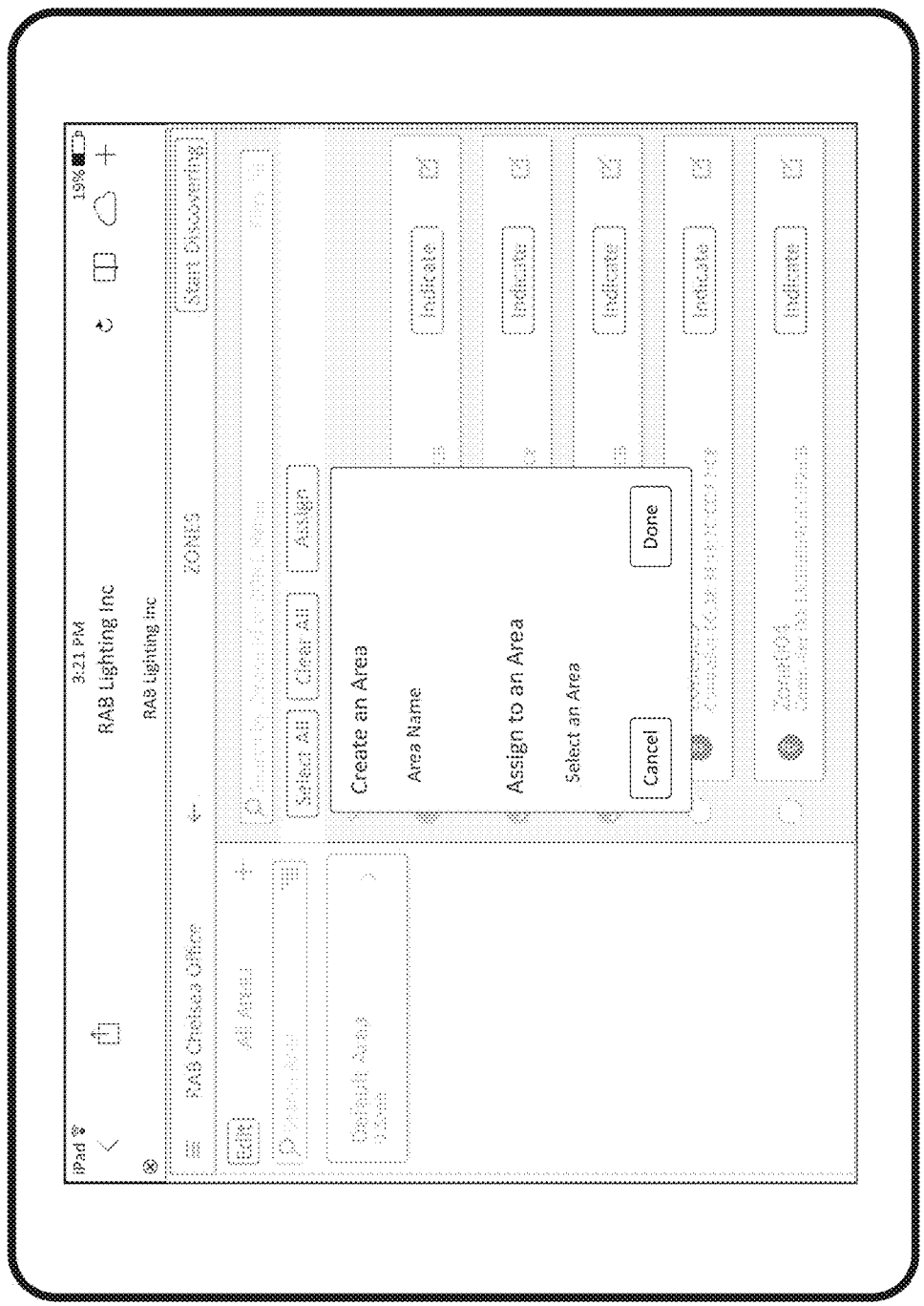
FIG. 21A is an exemplary screen capture illustrating creating an area from a front-end user interface application according to the present disclosure.
Figure 21B:
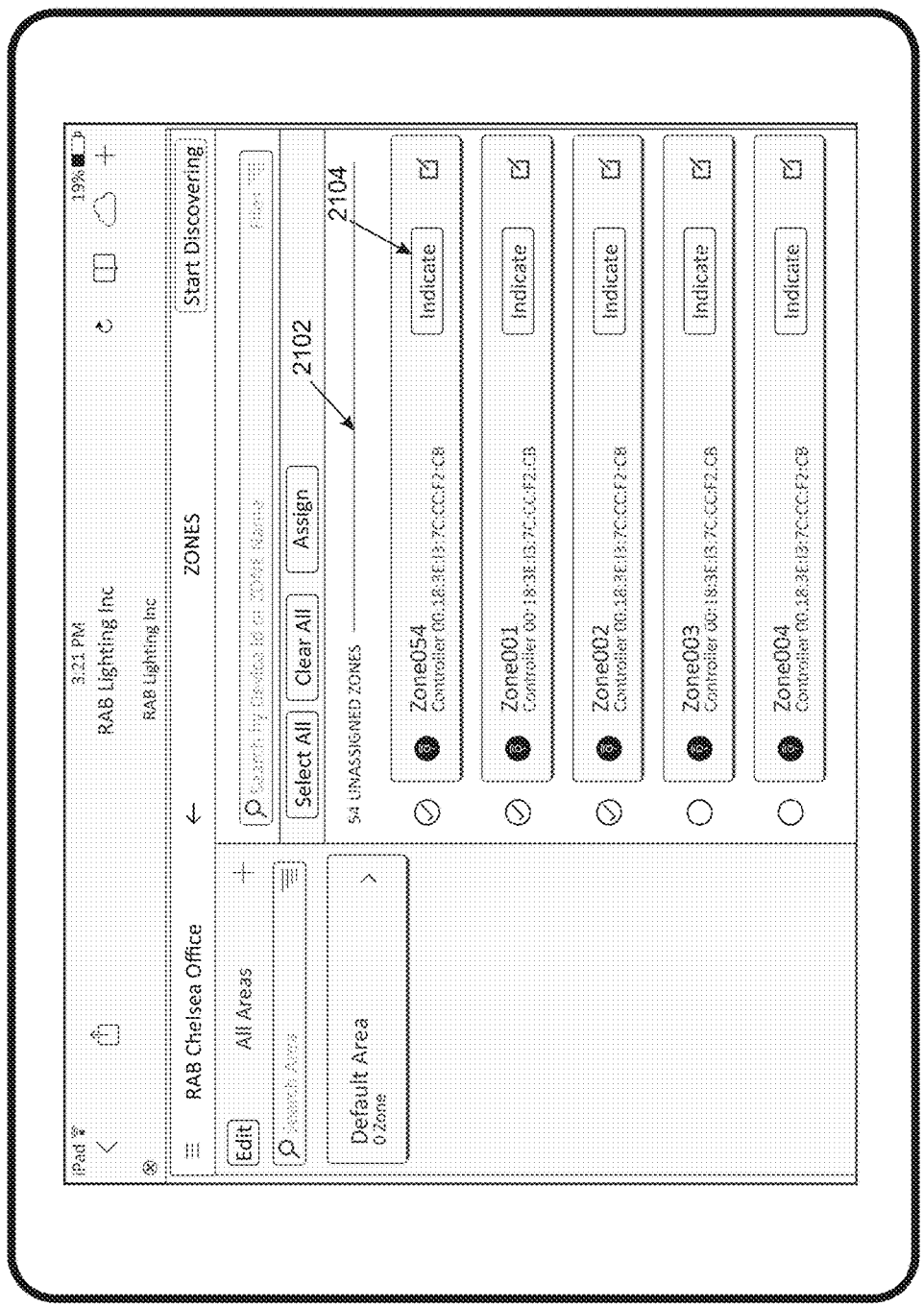
FIG. 21B is an exemplary screen capture illustrating selecting zones to be assigned to an area from a front-end user interface application according to the present disclosure.
Figure 21C:
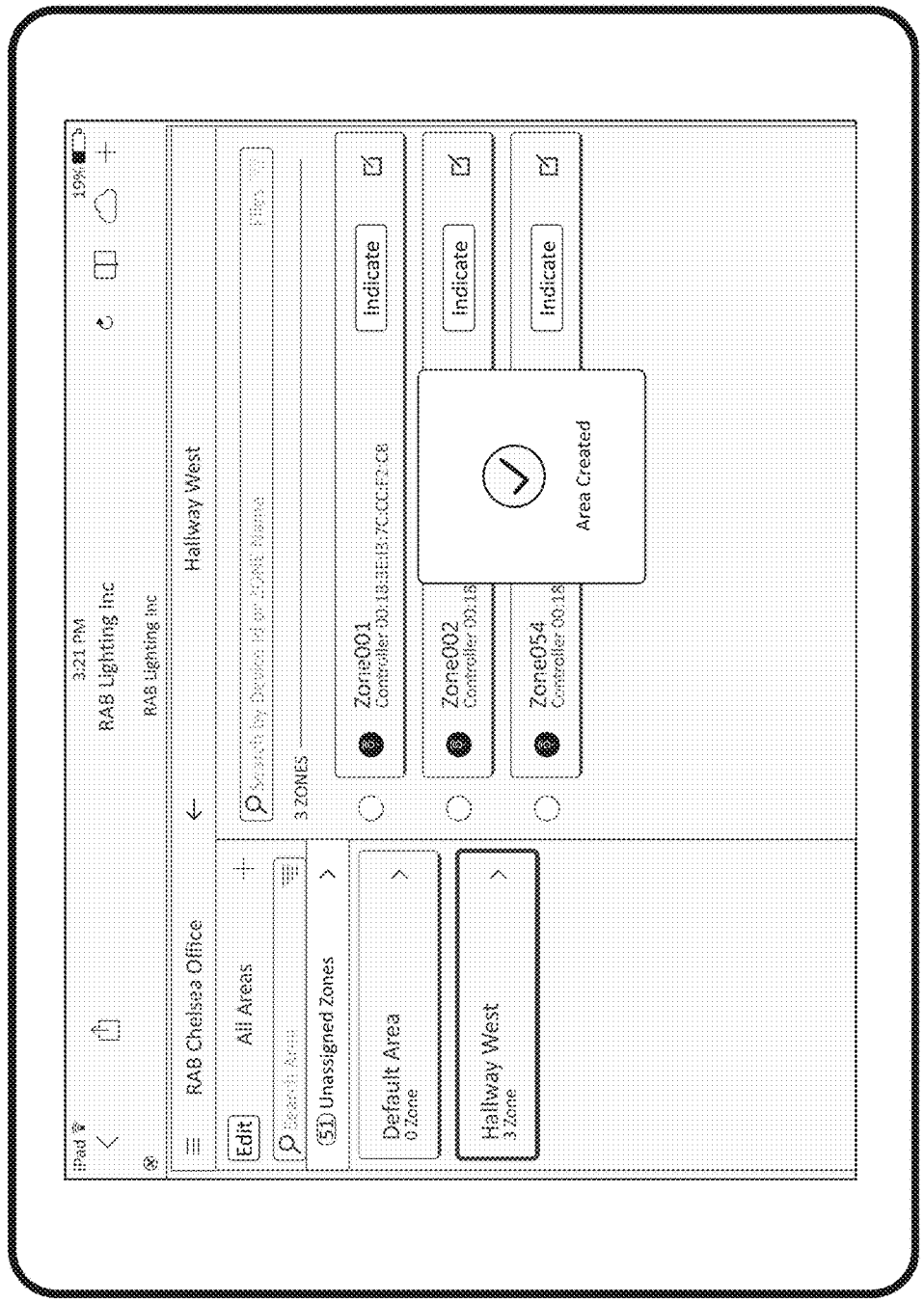
FIG. 21C is an exemplary screen capture illustrating assigning zones to an area from a front-end user interface application according to the present disclosure.

Referring again to FIG. 15, when the user 42 selects one of the sites, or site systems 14, entries representative of actual devices 26 are visible through the user interface and include information, such as unique device identifiers. The user 42 may enter additional information about each device 26, such as a device location, description, and zone, using the user interface 1900. To ascertain which entry in the user interface represents which physical device 26, a user input, such as an indicate selection button 2104 associated with a specific one of the entries 2102 displayed on the user interface may be actuated, as shown in FIG. 21B. As a result, an indicator on the physical device 26 represented by that entry 2102 may be modified in some predetermined way to assist the user 42 in matching each entry 2102 to the physical device 26 it represents. For example, an indicator may illuminate using a predetermined duration and/or pattern, or the load (light fixture) controlled by the device may be repeatedly switched on/off or dimmed/undimmed.

An additional and/or alternative device identification may include the user 42 actuating a physical switch 85 of one of the device 26. This actuation may generate a communication sent by communication module 34 and be received by the gateway 24 of the site system 14 and communicated, along with the unique device identifier of the selected device 26, to the server system 12. In addition, this actuation my change a state of a status indicator 92 on the device 26, for example, one or more LEDs may blink for a period of time or other condition satisfied subsequent to a physical switch 85 being actuated. In response, the device entries 2102 as shown in FIG. 21B, or other representation, in the user interface may be changed to identify which device entry 2102 corresponds to the selected device 26. For example, the particular device entry 2102 corresponding to the selected device 26 may be moved up to the top of the list, highlighted, or otherwise indicated, and may be pre-selected in preparation for the user 42 to continue the commissioning process. As such, the user 42 may be assisted in adding useful and accurate information about the device 26 via the user interface.

Figure 14:
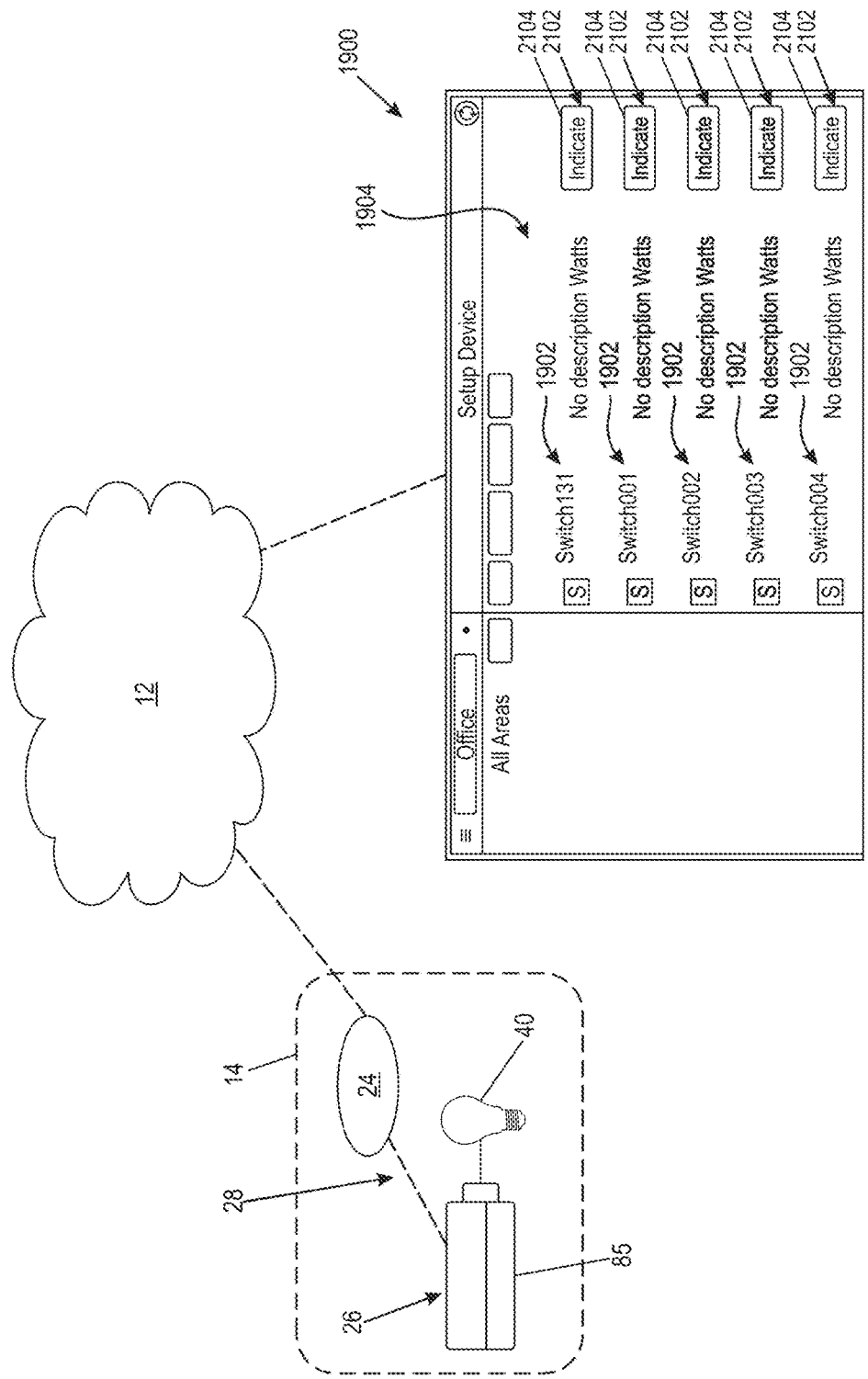
FIG. 14 is a schematic block diagram of a portion of the an exemplary wireless device control system illustrating the two-way indicate function.
Figure 19B:
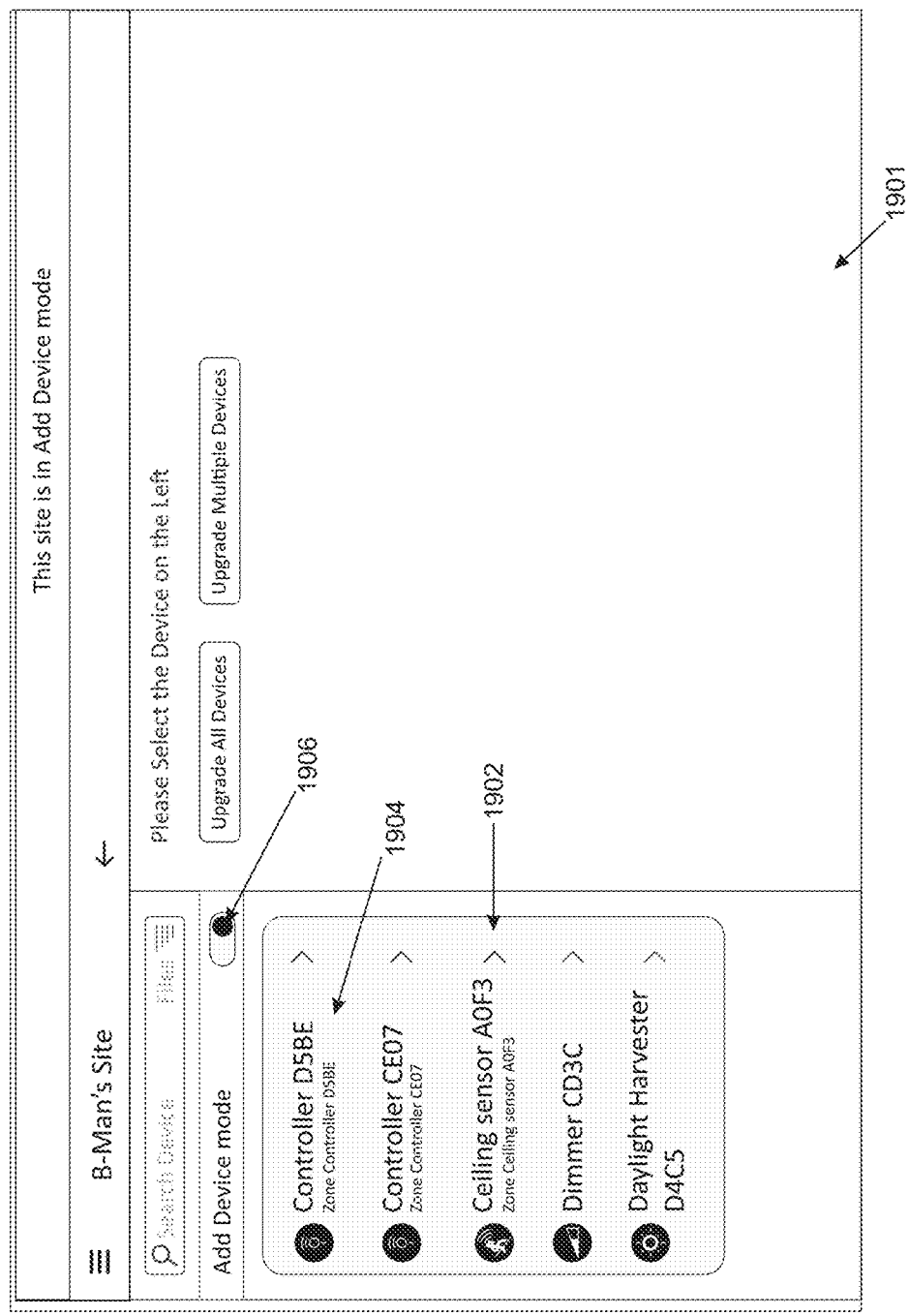
FIG. 19B is an exemplary screen capture illustrating device commissioning from a back-end user interface application according to the present disclosure.
Figure 19C:
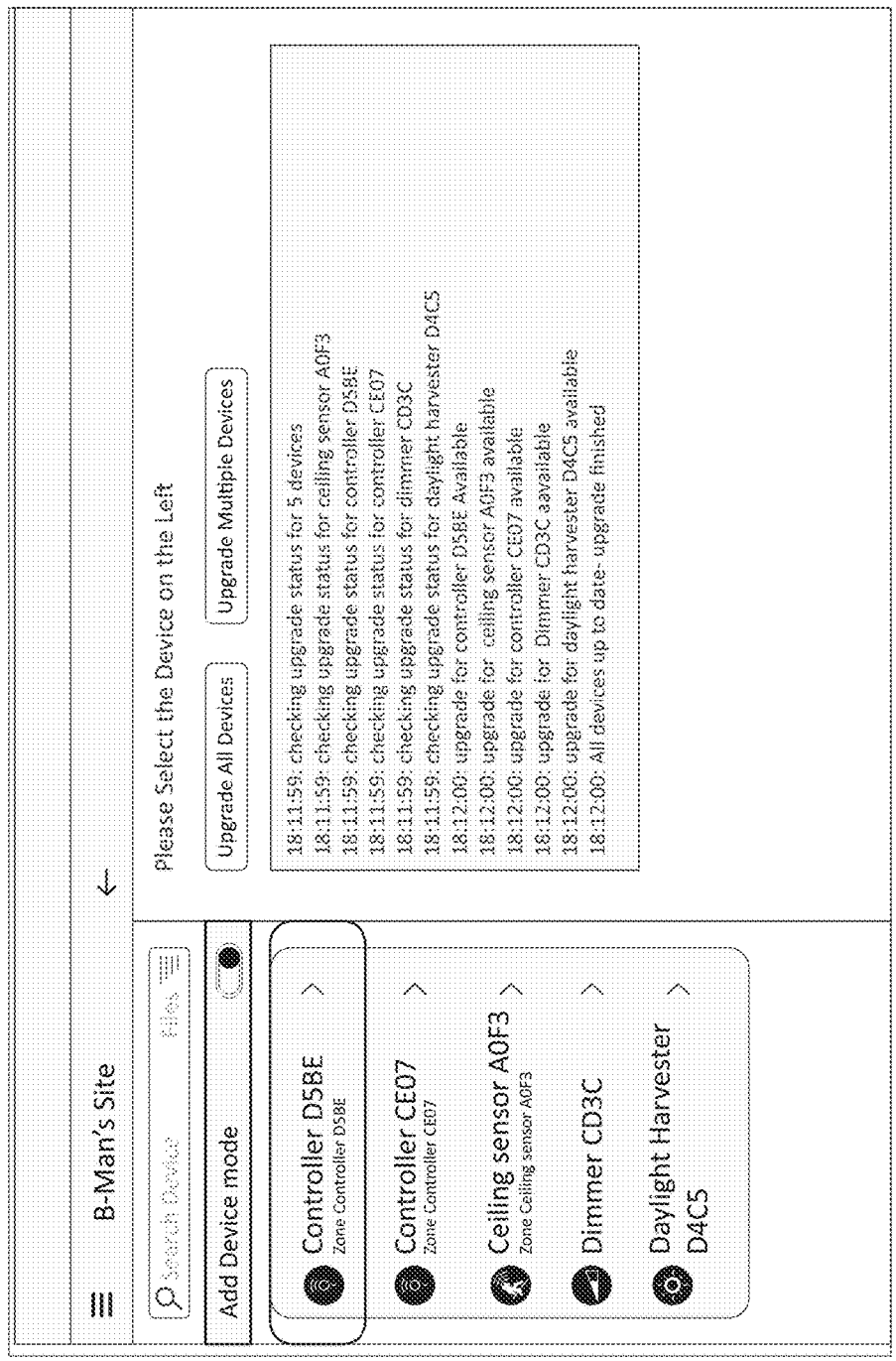
FIG. 19C is an exemplary screen capture illustrating the indicate function for a device from a back-end user interface application according to the present disclosure.

Once the site system 14 is planned and deployed, and the device 26 is properly commissioned, the user 42 may begin remotely managing and controlling the device 26. When a user 42 logs into their account, all sites, or site systems 14, associated with the user 42 may be visible through the application user interface. When the user 42 selects one of the sites, or site systems 14, entries representative of actual device 26 are visible through the user interface and include information, such as unique device identifiers. For example, as shown in FIGS. 14, 19A and 19B, a list of devices 1902. The user 42 may enter additional information about each device 26, such as a device location, description, and zone, using the user interface. To ascertain which entry in the user interface represents which device 26, a user input, such as a selection button, associated with a specific one of the entries displayed on the user interface may be actuated. As a result, an indicator on the device 26, such as, for example, the status indicator 92, may be modified in some predetermined way to assist the user 42 in matching each entry to the device 26 it represents. For example, an indicator, such as the status indicator 92, may illuminate using a predetermined color, duration and/or pattern.

The device 26 may be correlated with a specific virtual identifier associated with the device 26 in the server 18 application. A plurality of correlation methods may be optionally used during setup, commissioning and/or troubleshooting the wireless device control system 10.

A first correlation method may include a user actuating a physical switch 85 on the device 26, such as, for example, actuating physical switch 85 for at most 1 second, which results in device 26 transmitting single identity package to the gateway 24, the gateway 24 receiving the identity package, and notifying the server 18. In response the server 18 highlights virtual identifier for specific device 26 to allow administrators and users associated with gateway 24 through their user computer device 16, to easily identify the virtual identifier representing the device 26.

A second example correlation method can include a system administrator actuating an identification protocol for a virtual identifier, which is associated with a particular device 26, which may result in the device 26 commanding the hardware to perform certain functions, such as, for example, toggling a load on & off, and/or one or more status indicators 92 on the device 26 actuating, such as, for example, flashing.

A third example correlation method can be similar to Method 2, except that a user 42 actuates the identification protocol instead of a system administrator.

A fourth correlation method may include a user actuating a physical switch 85 on the device 26, such as, for example, actuating physical switch 85 twice within one second and holding the second actuation, which may result in the device 26 commanding the hardware to perform certain functions, such as, for example, ramping a load up & down which may cause the state of virtual identifier to change, and/or one or more status indicators 92 on the device 26 actuating such as, for example, flashing, and/or changing the state of the virtual identifier associated with the device 26.

A fifth correlation method may include a device 26 connected to an external switch, such as, for example, a typical wall light switch and using the external switch as a trigger for the device 26. The user may actuate the external switch and one or more status indicators 92 on the device 26 may actuate, such as, for example, changing state from on to off, or off to on, and/or changing the state of the virtual identifier associated with the device 26, and/or device 26 triggering a load, such as, for example, a light fixture according to established protocol, such as, turning a light fixture on/off.

The Wireless device control system 10 may accept user input to place user defined labels on each individual virtual identifier. This may be accomplished through a user computer device 16 or the server 18. This may permit users 42 or system administrator to assign plain language names to identify specific individual hardware in the wireless device control system 10. These plain language names may include location of and/or functioning of hardware.

Configuration and Use

With the site system 14 is deployed and the devices 26 are properly commissioned, the user 42 may begin remotely managing and controlling the devices 26, for example, by initiating manual actions through a user interface or creating automations and schedules to be carried out by the server system 12 and gateway 24 at step 164*f* of FIG. 7. As described above, users 42 may have various levels of access and control with regard to a particular site 14 and/or particular devices 26. After commissioning, the server system 12 communicates control instructions to the gateway 24 (and/or devices 26 via gateway 24), and the gateway 24 (and/or devices 26) may execute the instructions. Updates provided by the user 42 may be forwarded from the server system 12 to the gateway 24, and to devices 26. In addition, the gateway 24 may receive information from the devices 26, and may send, or relay, various updates to the server system 12. Ultimately, the method proceeds to an END, at step 164*g*.

As described above, the devices 26 may accomplish some function, such as detecting changes in the environment or causing changes in the environment. That is, for example, some devices 26 may switch power to a lighting fixture and/or control a dim level of the lighting fixture(s). According to some embodiments, a trim level, representing a maximum illumination level of the lighting fixture, may be set or modified through the application user interface. For example, as an energy savings feature, a user may set a trim level for a particular light by lowering the maximum illumination level for the light so that a user may not increase the illumination level/output beyond the newly selected maximum level. In addition to a maximum dim level, a minimum dim level may be set and/or adjusted through the application user interface. As another example, the device 26 (e.g., an occupancy sensor) can restrict the maximum illumination of the fixture when the sensor detects a person, e.g., when the light is turned on the light illuminates to only 80% of its maximum illumination. Although illumination can be less than 100% when using trim levels, the wall switch can be configured to indicate the fixture is at 100% illumination while the user interface (cell phone, iPad, etc.) can show the actual illumination level (e.g., 80%).

Figure 25:
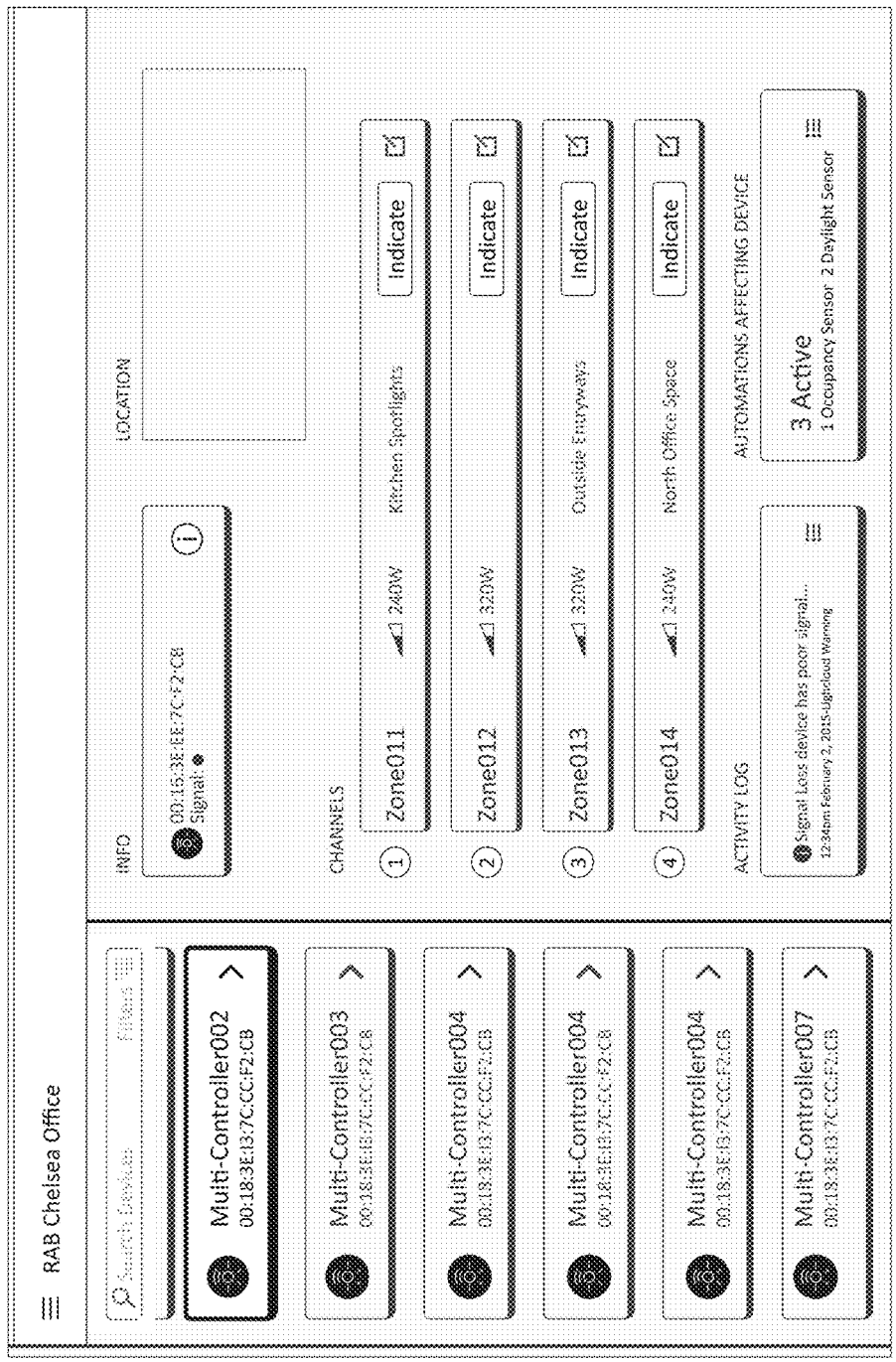
FIG. 25 is an exemplary screen capture illustrating a multi-controller device configuration view from a front-end user interface application according to the present disclosure.
Figure 26B:
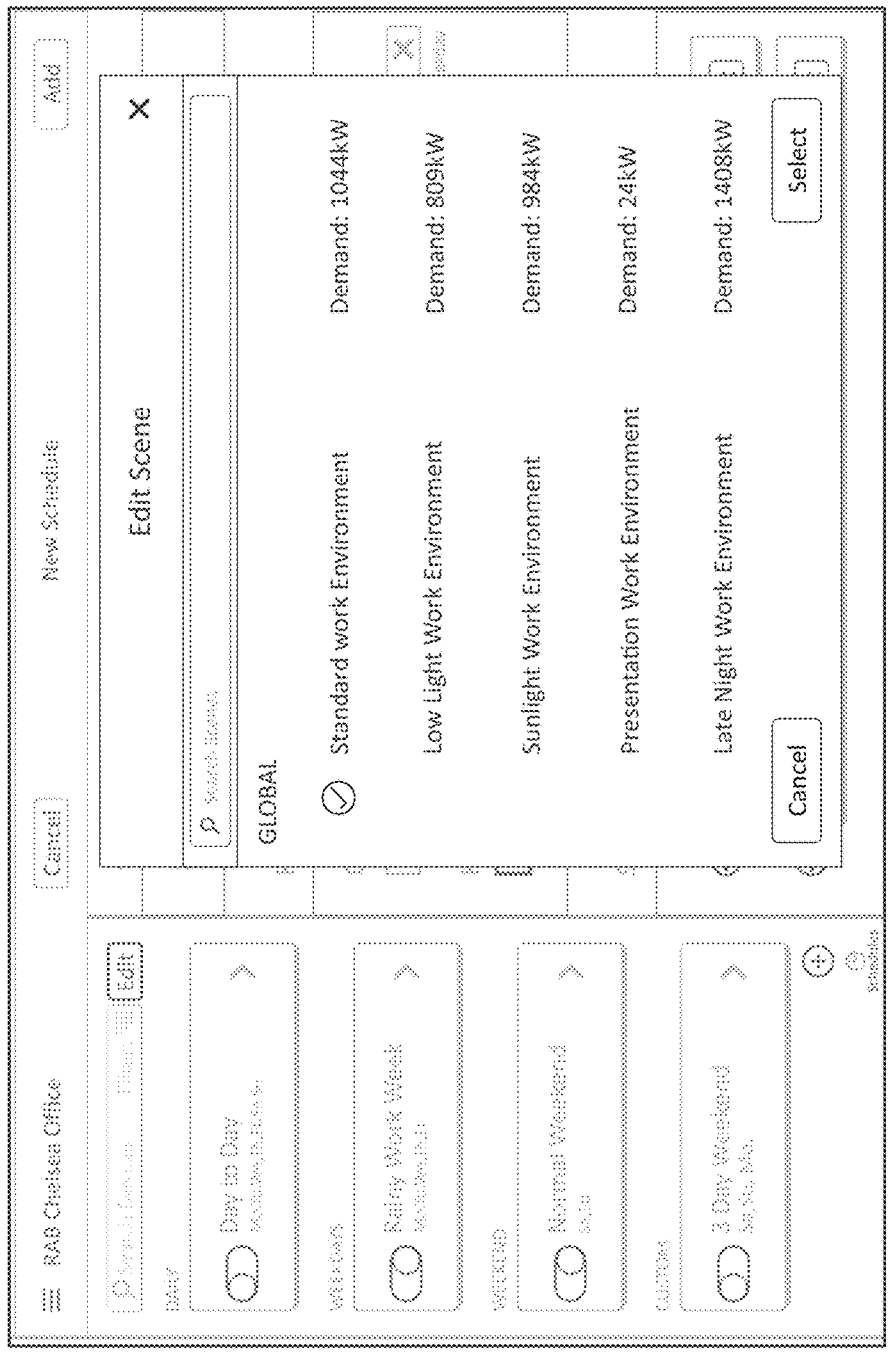
FIG. 26B is an exemplary screen capture illustrating selecting a scene for a global schedule from a front-end user interface application according to the present disclosure.
Figure 26C:
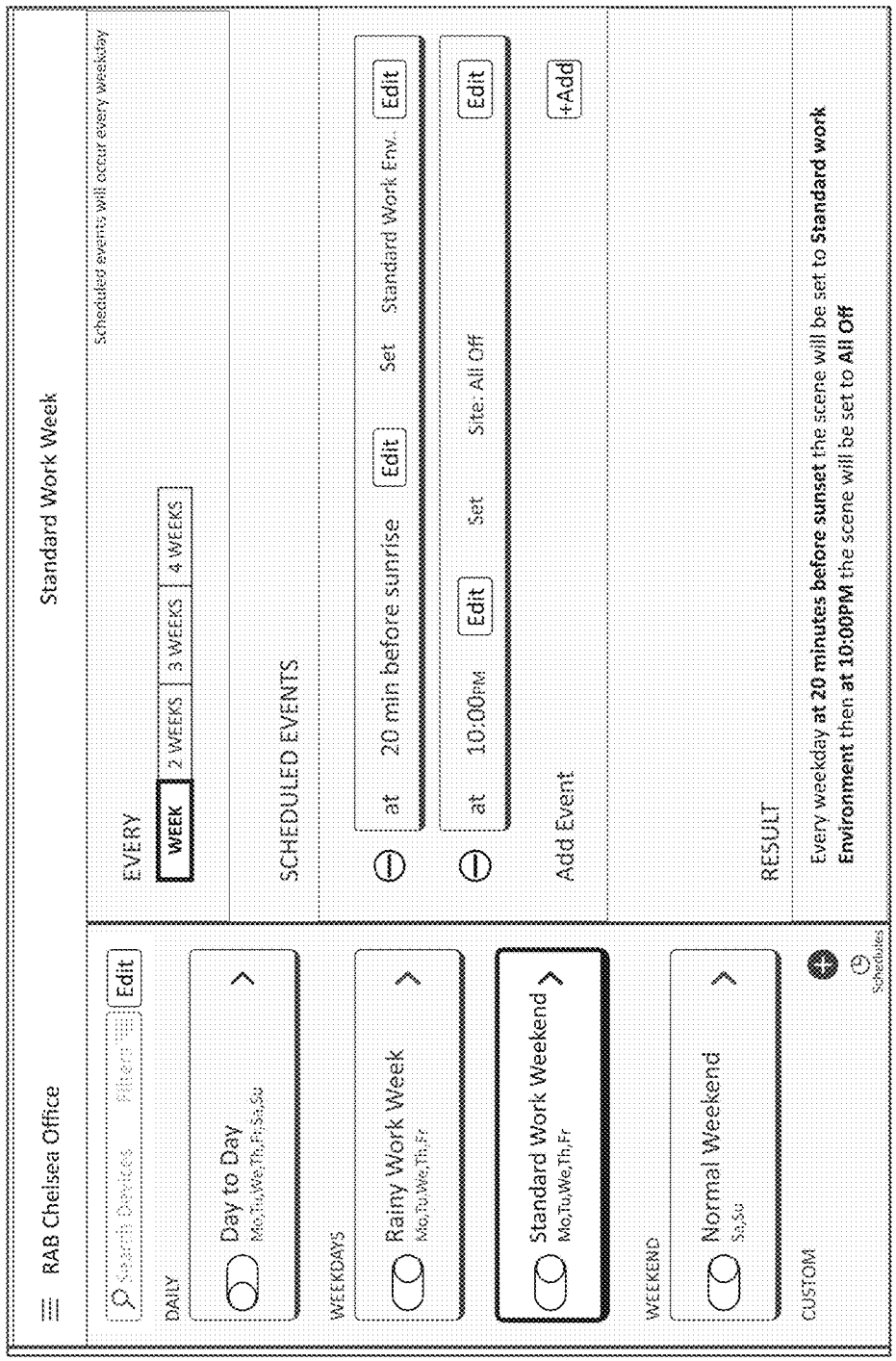
FIG. 26C is an exemplary screen capture illustrating activating the new global schedule from a front-end user interface application according to the present disclosure.
Figure 27A:
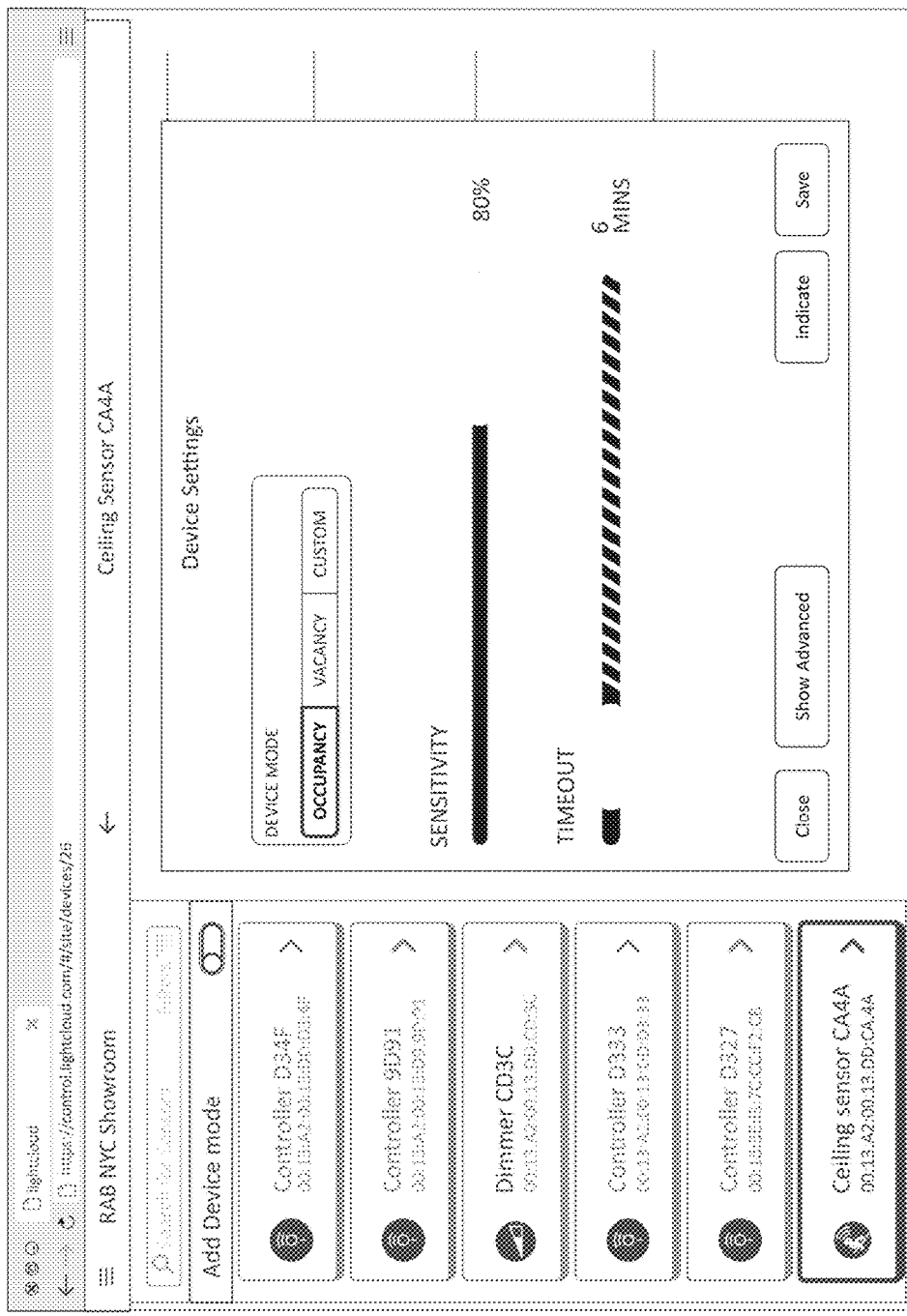
FIG. 27A is an exemplary screen capture illustrating occupancy mode settings for an occupancy sensor device from a front-end user interface application according to the present disclosure.
Figure 27B:
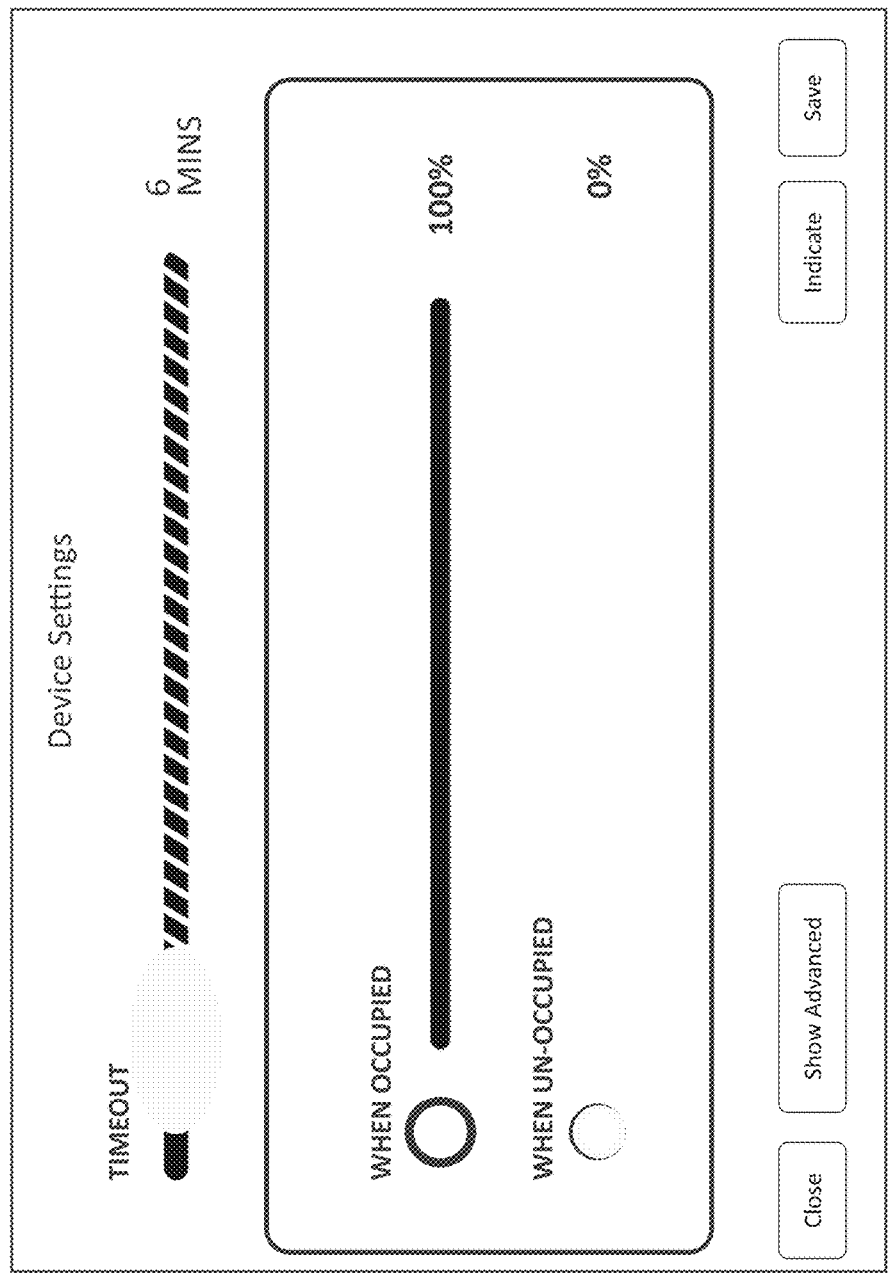
FIG. 27B is an exemplary screen capture illustrating further occupancy mode settings for an occupancy sensor device from a front-end user interface application according to the present disclosure.
Figure 27C:
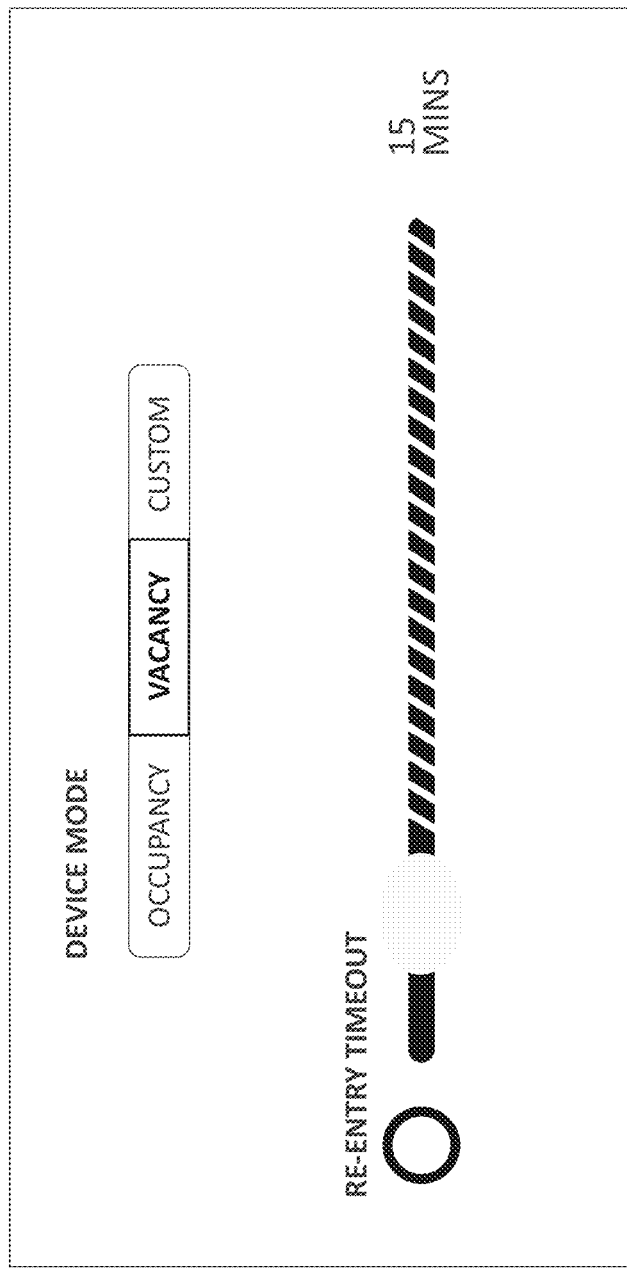
FIG. 27C is an exemplary screen capture illustrating vacancy mode settings for an occupancy sensor device from a front-end user interface application according to the present disclosure.
Figure 27D:
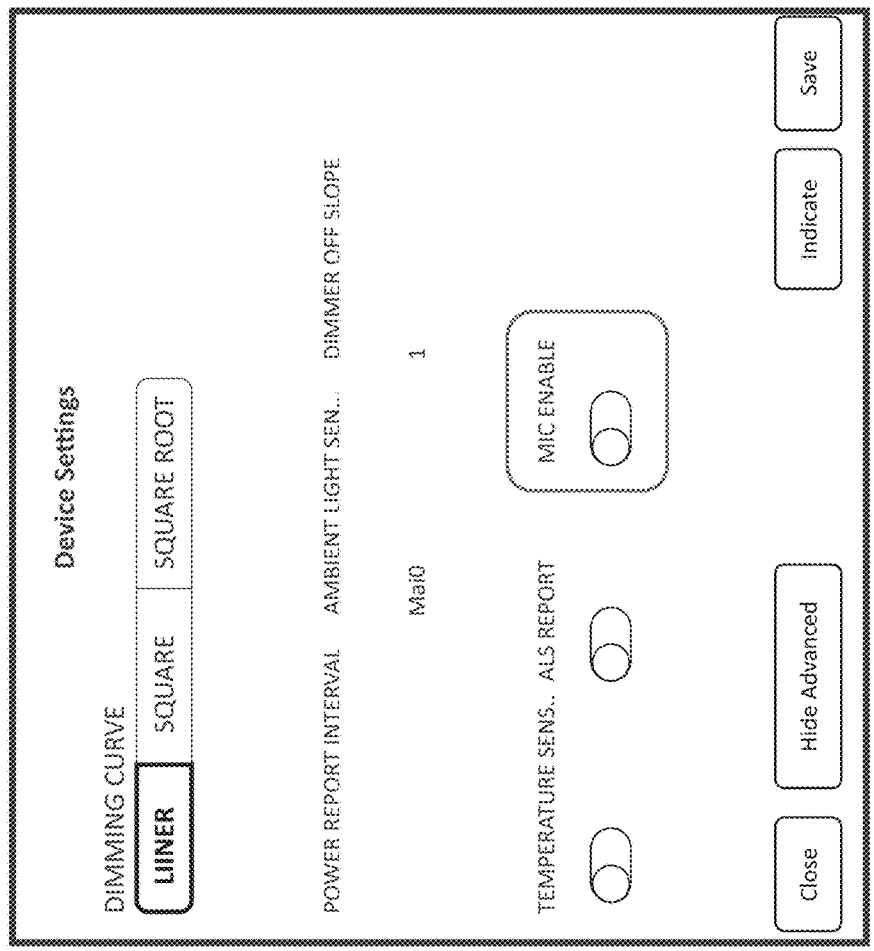
FIG. 27D is an exemplary screen capture illustrating further settings for an occupancy sensor device from a front-end user interface application according to the present disclosure.
Figure 28:
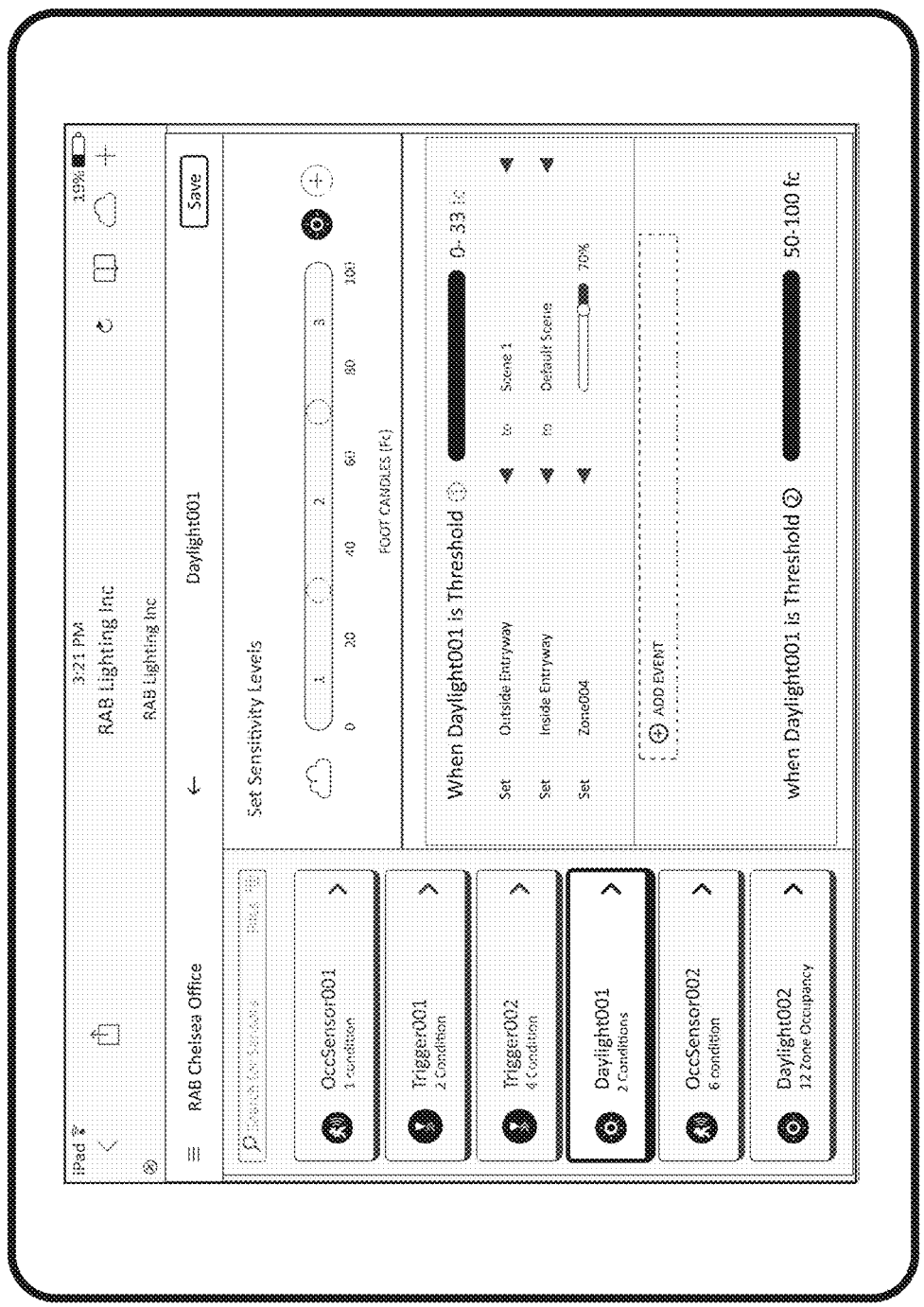
FIG. 28 is an exemplary screen capture illustrating a daylight harvester device configuration view from a front-end user interface application according to the present disclosure.
Figure 29:
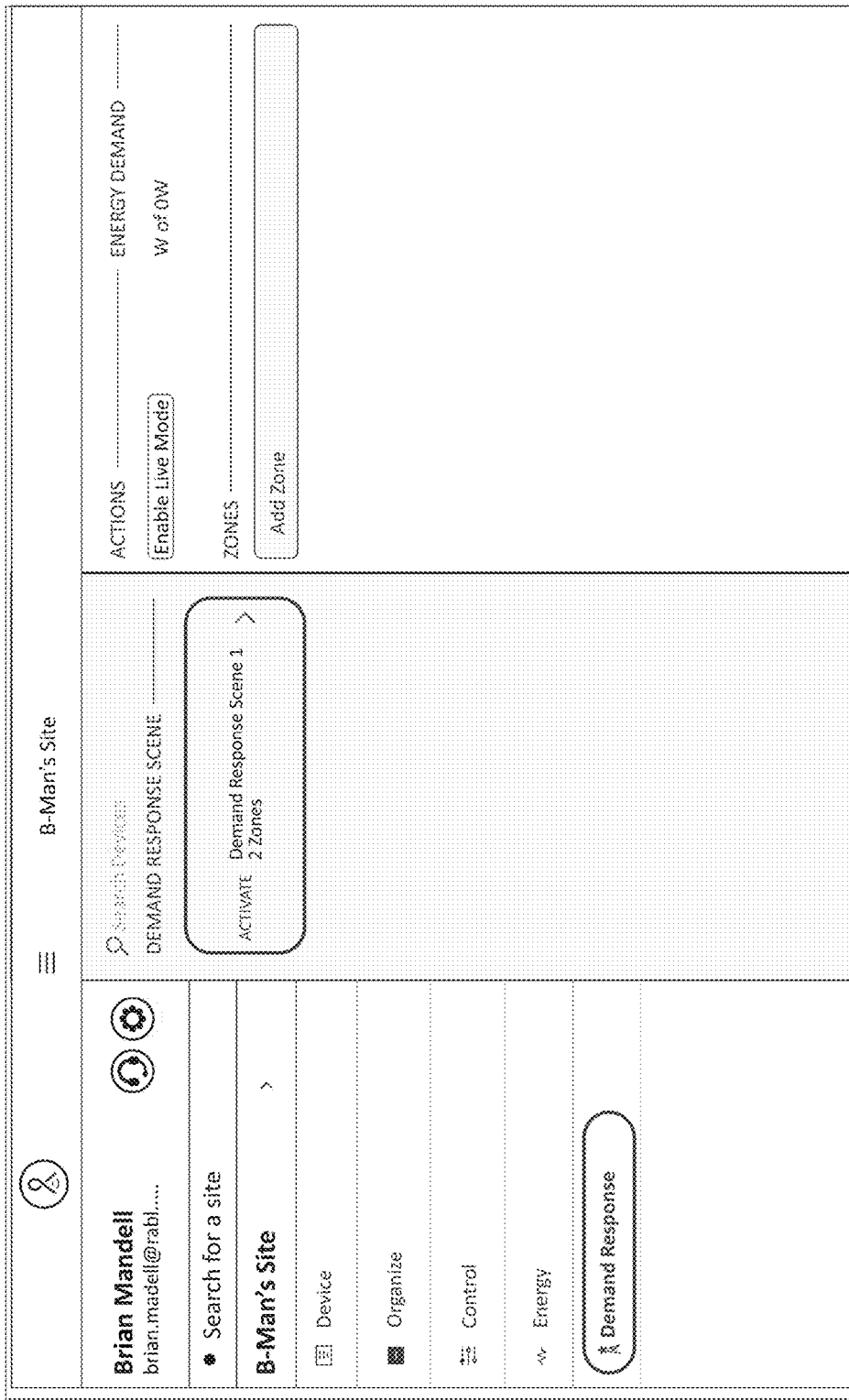
FIG. 29 is an exemplary screen capture illustrating a power demand response configuration view from a back-end user interface application according to the present disclosure.
Figure 30:
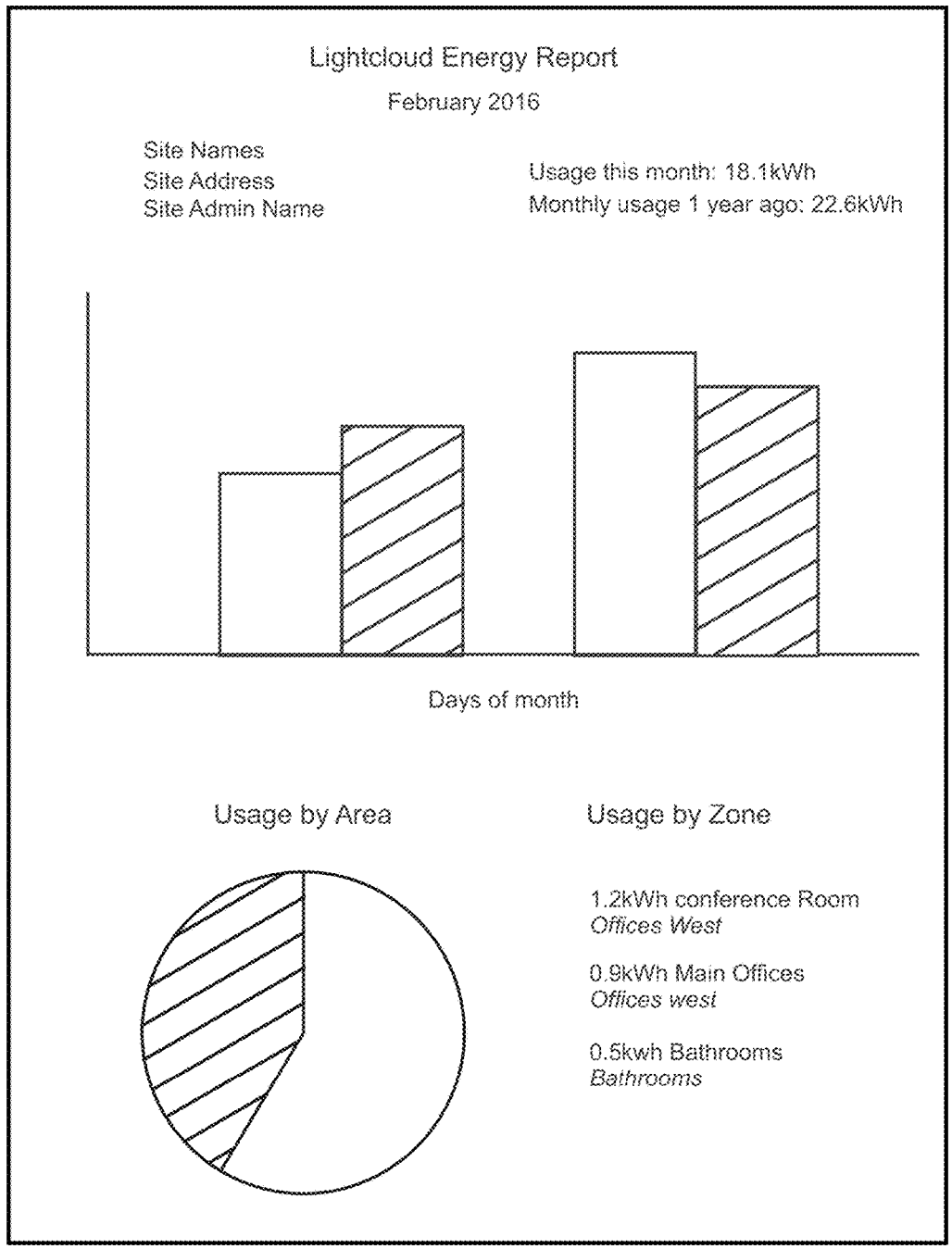
FIG. 30 is an exemplary document illustrating an energy report view according to the present disclosure.

During commissioning, or sometime thereafter, each of the devices 26 may be associated with or may correspond to a particular zone. For example, a zone may represent an electrical circuit having one or more lighting fixtures installed thereon. As shown in a screen capture 2500 in FIG. 25, a multichannel controller device 2502 (as represented through the user interface), such as multichannel controller 190, may be associated with, or control, multiple zones, as shown in a list of zones at 2504. Zones may be grouped into areas, which may represent, for example, rooms, locations, or other designated areas of the site 14. This organization may logically group circuits into common areas to facilitate appropriate monitoring and control. Turning to FIG. 21B, a screen capture depicts the creation of an area and selection of zones to group within the area via an exemplary user interface.

To improve lighting control relative to daylight hours, sunset and sunrise times are used by the system 12, for example, to control when different "scenes" are implemented; during commissioning of a gateway 24 or later during configuration, a user or administrator enters the zipcode where the site system 14, including the gateway 24, is located and the server system 12 uses the zipcode to determine an approximate latitude and longitude of the site system 14 for sunrise/sunset calculations. Determining the latitude and longitude based on only the zipcode and calculating and storing that information at the server system 12 adds an extra layer of security to assist in obscuring the precise physical location of the site system 14.

Mesh Network Security

Although other mesh networks can be used, the illustrative mesh network 28 uses ZigBee, an open global standard for low-power, low-cost, low-data-rate, wireless mesh networking based on the IEEE 802.15.4 standard. Through its mesh and routing capabilities, networks such as ZigBee allows the transmission of data over long distances by passing the data through a mesh network of intermediate nodes to reach more distant ones. It represents a network layer above the 802.15.4 layers to support advanced mesh routing capabilities. The ZigBee specification is developed by a growing consortium of companies that make up the ZigBee Alliance. ZigBee Smart Energy Standard, ZigBee Profile: 0x0109, Revision 19, Version 1.2a, Document 07-5356-19, incorporated by reference herein in its entirety, describes device high-level communication protocols used to create personal area networks with small, low-power digital radios, including the installation and use of security keys.

Each ZigBee network must be formed by one, and only one, coordinator, which is the gateway 24 in the illustrative embodiment of control system 10. The devices 26 of the wireless device control system 10 can be a router type or an end type device; however, for typical installations, most devices 26 will be a router. A router is a full-featured ZigBee node and perform various functions including join existing networks and send, receive, and route information (routing involves acting as a messenger for communications between other devices that are too far apart to convey information on their own). A network may have multiple router devices. An end device is essentially a reduced version of a router. The end device cannot act as messenger between any other devices.

ZigBee supports various levels of security that can be configured depending on the needs of the application. Security provisions include encryption, security keys that can be preconfigured, support for a coordinator trust center, and provisions to ensure message integrity, security, and authentication.

ZigBee security is applied to the Network and APS layers. Packets are encrypted with 128-bit AES encryption. A network key and link key can be used to encrypt data. Network and APS layer encryption can both be applied to data. Only devices with the same keys are able to communicate together in a network. The network key is used to encrypt the APS layer and application data. All data packets are encrypted with the network key. When a device receives a packet, it decrypts and authenticates the packet. If the device is not the destination, it then encrypts and authenticates the packet. Since network encryption is performed at each hop, packet latency is slightly longer in an encrypted.

APS layer security can be used to encrypt application data. APS security provides end-to-end security using an APS link key. A trust center link key is established between a device 26 and the trust center, the gateway 24. ZigBee defines a trust center device as responsible for authenticating devices that join the network. The trust center also manages link key distribution in the network The coordinator, gateway 24, is responsible for selecting a network encryption key. This key can be randomly selected. The trust center link key can be a preconfigured proprietary key stored in gateway 24 and devices 28 prior to installation. In an illustrative embodiment of the control system 10, the devices 28 that join the network must obtain the network key when they join. When a device joins a secure network, the network key can be sent to the joining device e encrypted by the link key. Otherwise, if the joining device is not preconfigured with the link key, the device could only join the network if the network key is sent unencrypted ("in the clear"), which exposes the mesh network 28 to nefarious intrusions.

If the joining device has the correct link key, the joining device will be able to decrypt the network key and join the network. The network key can be periodically rotated with a new randomly generated network key and distributed to all of the devices 28 joined to the mesh network 28.

A potential security weakness of a mesh network protocol in which devices have a pre-installed proprietary link key is that in some devices the proprietary link key may be discovered by close, expert examination of a device. If discovered, the proprietary key can be installed in and used with a "rogue" device. If this occurs, the rogue device can use the proprietary link key to decrypted the current network key and join the network. To address this security weakness, various specific actions are implemented for the mesh network 28 of an illustrative control system 10 that avoid exposes the system to rogue devices and require all rejoins of devices 26 to be done with secure, encrypted communication rather than in an open unencrypted and unsecure fashion.

First, devices 26 are only allowed to first join the wireless network during a specified period of time, preferably short, during which a site administrator expects new devices 26 to join the site system 24 and during which the administrator has authorized the gateway 24 to provide the network key encrypted using the pre-installed proprietary link key.

Second, upon joining during the specified short authorization period, devices 26 are immediately provided a new, randomly generated updated link key that can be used to rejoin the device 26 to the network if the device later loses communication and/or misses a periodic rotation/update to the network key.

Third, subsequent rejoins of any device that had previously joined the network are facilitated by the gateway 24 sending the current network key encrypted using the current randomly generated link key, rather than the proprietary link key, thereby preventing rogue devices only having the proprietary link key from joining.

Fourth, optionally, the randomly generated network key can be periodically updated.

Fifth, optionally, the randomly generated link key can be periodically updated.

Figure 12A:
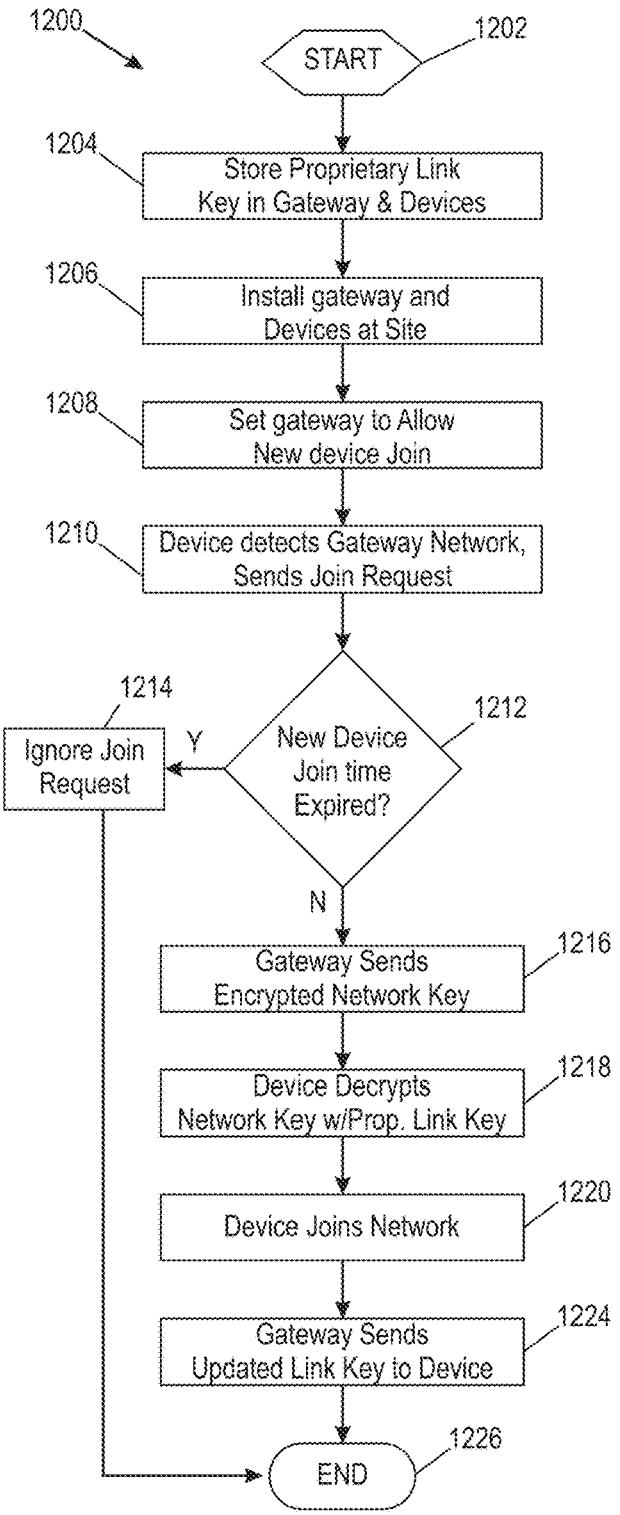
FIG. 12A is a flowchart representing an exemplary method for secure network join for a new device in the site system of the wireless device control system of the present disclosure.
Figure 12B:
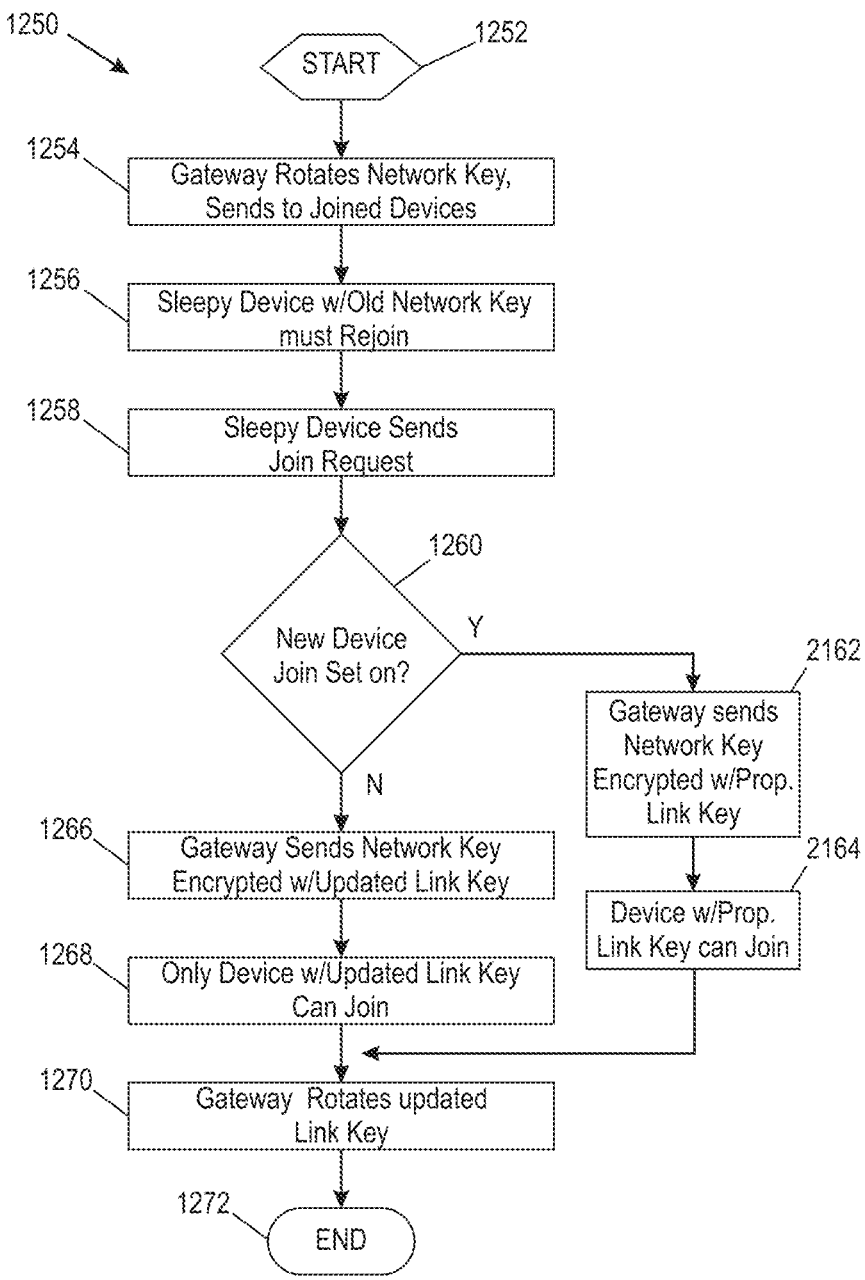
FIG. 12B is a flowchart representing an exemplary method for secure network rejoin for a previously joined device in the site system of the wireless device control system of the present disclosure.

Referring to FIG. 12A an illustrative method 1200 of securing joining a new device 26 to the mesh network 28 of a site system 14 is shown. Also referring to FIG. 1, the method 1200 and a companion method 1250, described below, are completed by various components of control system 10, including for example, server 18, gateway 24, device 26, and mesh network 28.

In step 1202 the method 1200 starts. In step 1204, proprietary link keys are stored in the trust center of gateway 24, for example the communications module 30, and in each device 26, for example, in the communications module 34. In step 1206, if not already completed, the gateway 24 and/or devices 26 are installed and powered at system site 14. In step 1208, the gateway 24 of the particular site system 14 is set to allow devices 26 to join the mesh network 28 using the proprietary link key. For example, as shown in the exemplary screen capture of a device commissioning setting of a back-end user interface application, an add devices mode can be selected. Additionally, the mode can be optionally selected to expire after a specified period of time.

In step 1210, the device 26 detects the mesh network 28 of gateway 24 and sends a join request in accordance with the mesh network protocol, e.g. Zigbee. In step 1212, if the new device join mode has expired, method 1200 continues at step 1214. In step 1214, the join request is ignored. If in step 1212 the device join mode has not expired, method 1200 continues to step 1216.

In step 1216, the gateway 24 sends the current network key encrypted using the proprietary link key. In step 1218, the device 26 receives the encrypted network key and decrypts it using the proprietary link key. In step 1220, the device 26 joins the mesh network 28 using the current network key and the gateway 24 registers the device 26. In step 1224, the gateway 24 sends an update link key to the device 26 encrypted using the current network key. The updated link key is stored in the trust center of gateway 24, for example communications module 30, and in the device 26, for example, communications module 34. In step 1226, method 1200 is completed.

Subsequent to a device 26 first joining the mesh network 28 of gateway 24, a device 26 may lose communication with the mesh network 28, for example, a "sleepy" device. In such an event, depending on the protocol configuration of the mesh network 28, the sleepy device 28 may rejoin if it still has the current network key; however, in the event the protocol configuration requires that a link key be used to rejoin the mesh network, or the sleepy device does not have the current network key, method 1250 allows a sleepy device 26 to rejoin the mesh network 28.

In step 1252, the method 1250 starts. In step 1254, optionally, the gateway 24 rotates from the current network key to a new network key, for example, by randomly generating a new network key and sending it encrypted by the current network key to all the joined devices 26 of the mesh network 28. In step 1256, a sleepy device 26 wakes up and/or regains communication with the mesh network 28 and seeks to rejoin. In step 1258, the sleepy device 26 sends a join request. In step 1260, if the gateway 24 is set to join new devices, method 1250 continues at step 1262. If the gateway 24 is not set to join new devices, method 1250 continues at step 1266.

In step 1262, the gateway 24 sends the network key encrypted using the proprietary link key. In step 1264, the sleepy device 26 can join the mesh network 1264, for example, as described in steps 1218-1226 in method 1200 above. After step 1264, the method 1250 continues at step 1270.

In step 1266, the gateway sends the current network key encrypted with the updated link key to the sleepy device 26. Since the sleepy device 26 had earlier joined the mesh network 28 and stored the updated link key, in step 1268, the sleep device 26 decrypts the current network key using the updated link key and joins the mesh network.

In step 1270, optionally, the gateway 24 rotates from the updated link key to a new link key, for example, by randomly generating a new link key and sending it encrypted by the current network key to all the joined devices 26 of the mesh network 28. Subsequent rejoins by devices 26 will use the new updated link key. In step 1272, the method 1250 is completed.

Automations

Automations, also referred to as behaviors, may represent sets of rules, or if/then conditions that bind input events into output events or actions. An action is a command that is enacted when a condition is fulfilled, for example, commanding a zone state or commanding a scene. An action can also by a system notification provided via a user interface.

For example, with regard to controllers 70, some input events satisfying a condition that triggers an automation may include power measurements, such as voltage or wattage, exceeding or falling below a predetermined threshold, and the detection that particular circuits have opened or closed, such as a controller's zone being switched on with a wall switch. With regard to occupancy sensors 130, some exemplary conditions may include motion detection and motion timeout expiration. Some conditions pertaining to daylight harvesters 150 may include detected light levels exceeding or falling below predetermined thresholds.

Figure 24A:
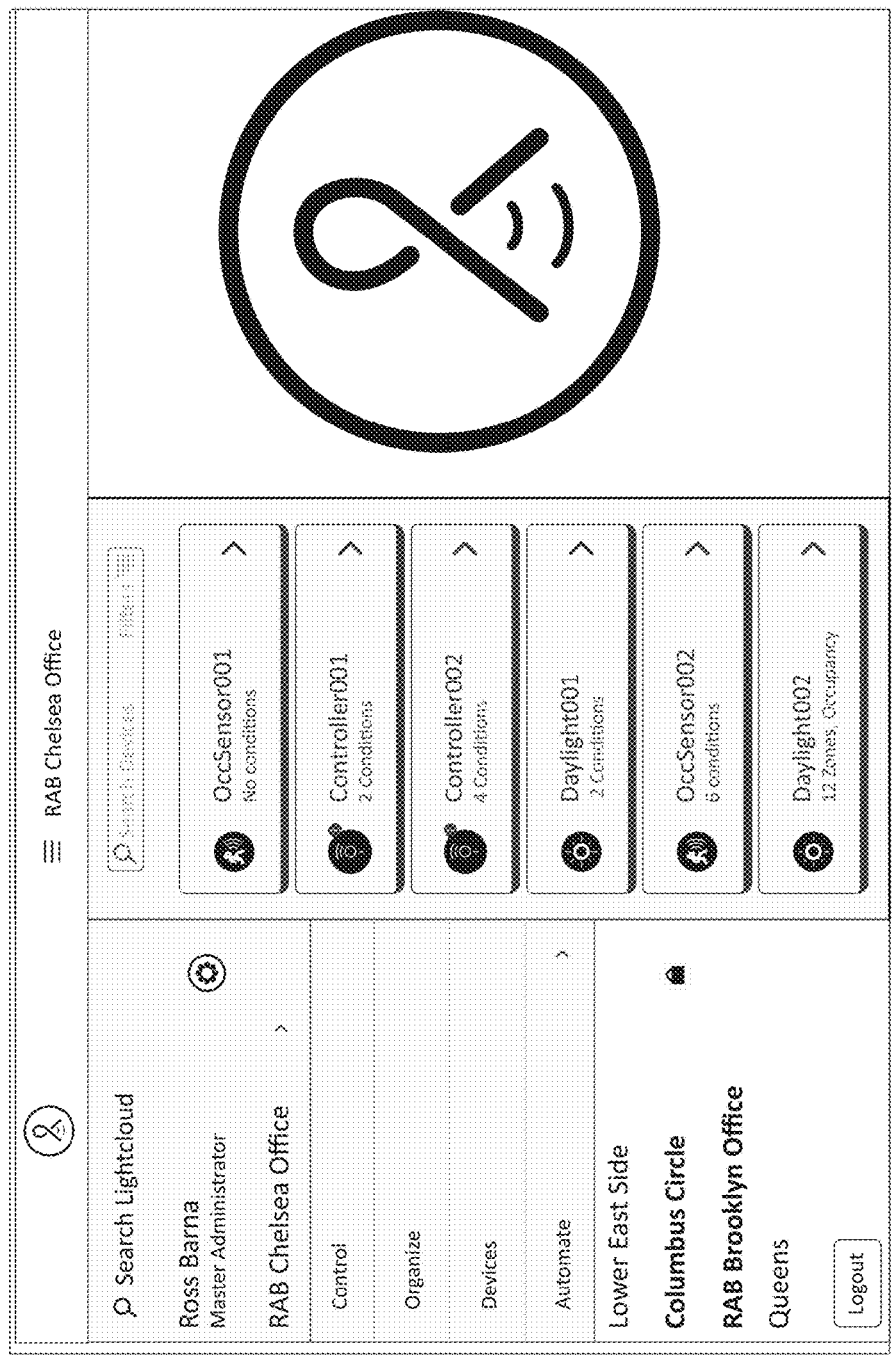
FIG. 24A is an exemplary screen capture illustrating a automation view from a front-end user interface application according to the present disclosure.
Figure 24B:
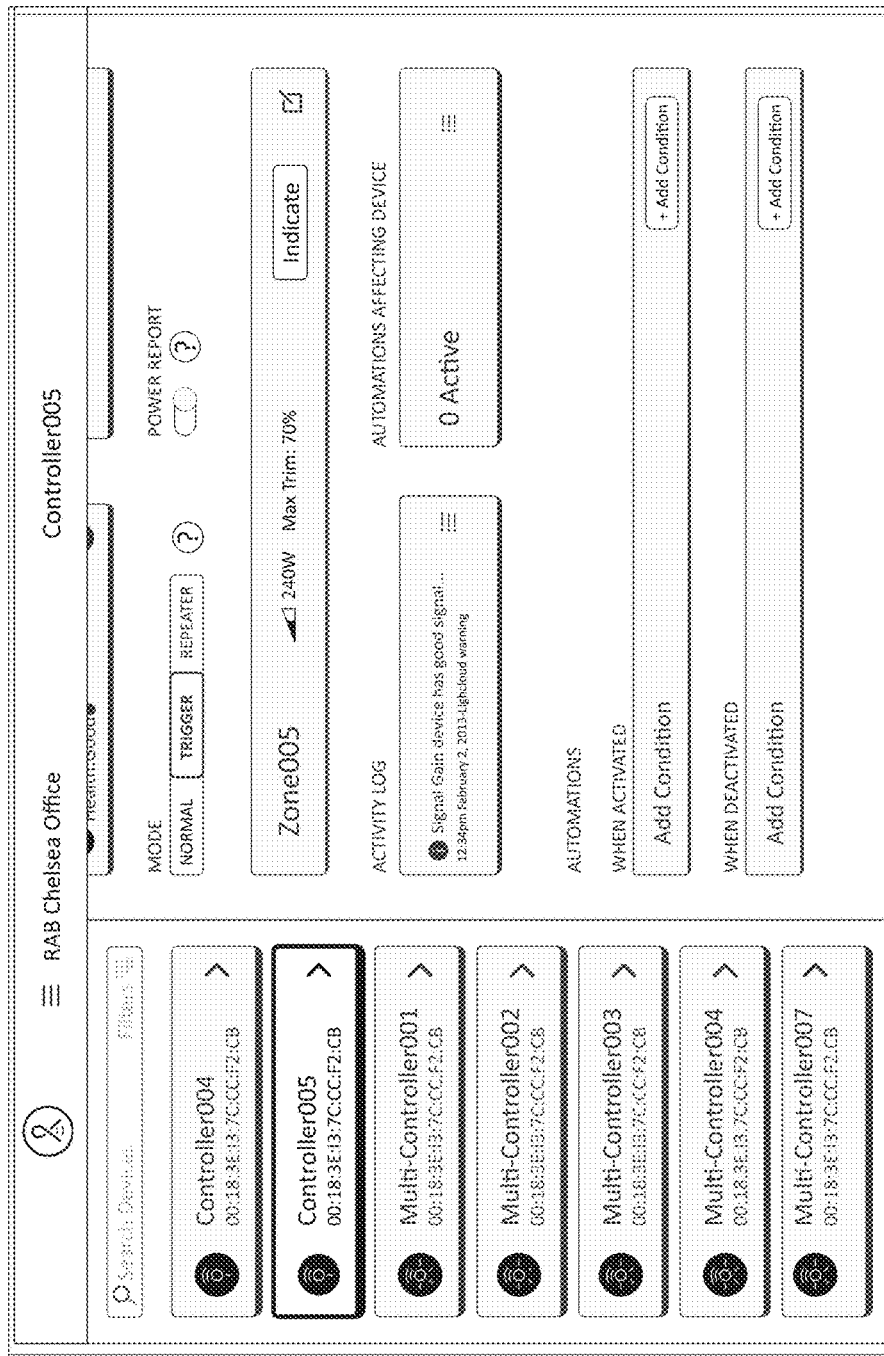
FIG. 24B is an exemplary screen capture illustrating a controller device trigger and automation configuration from a front-end user interface application according to the present disclosure.
Figure 24C:
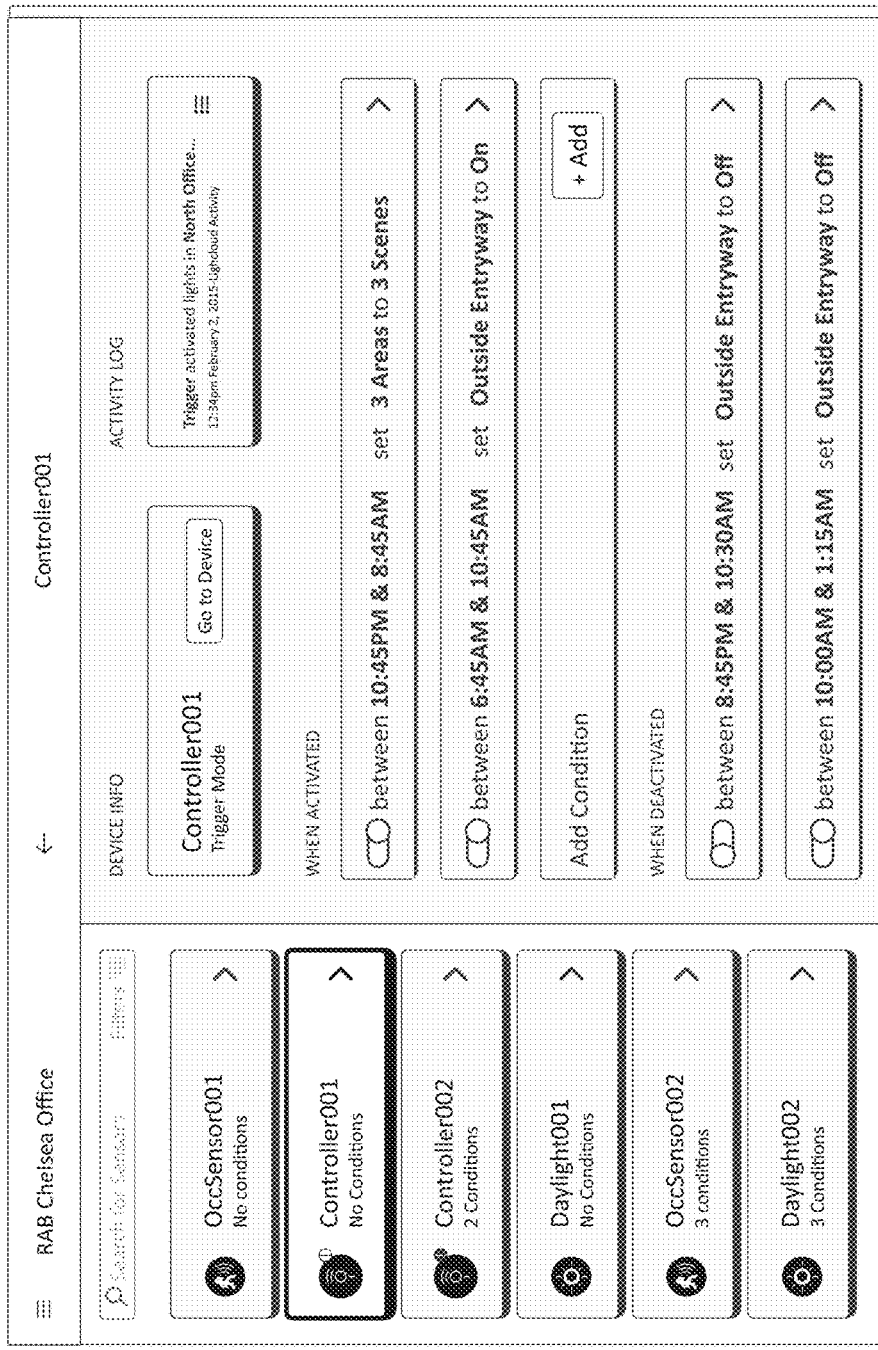
FIG. 24C is an exemplary screen capture illustrating adding conditions for a controller device trigger automation from a front-end user interface application according to the present disclosure.
Figure 24D:
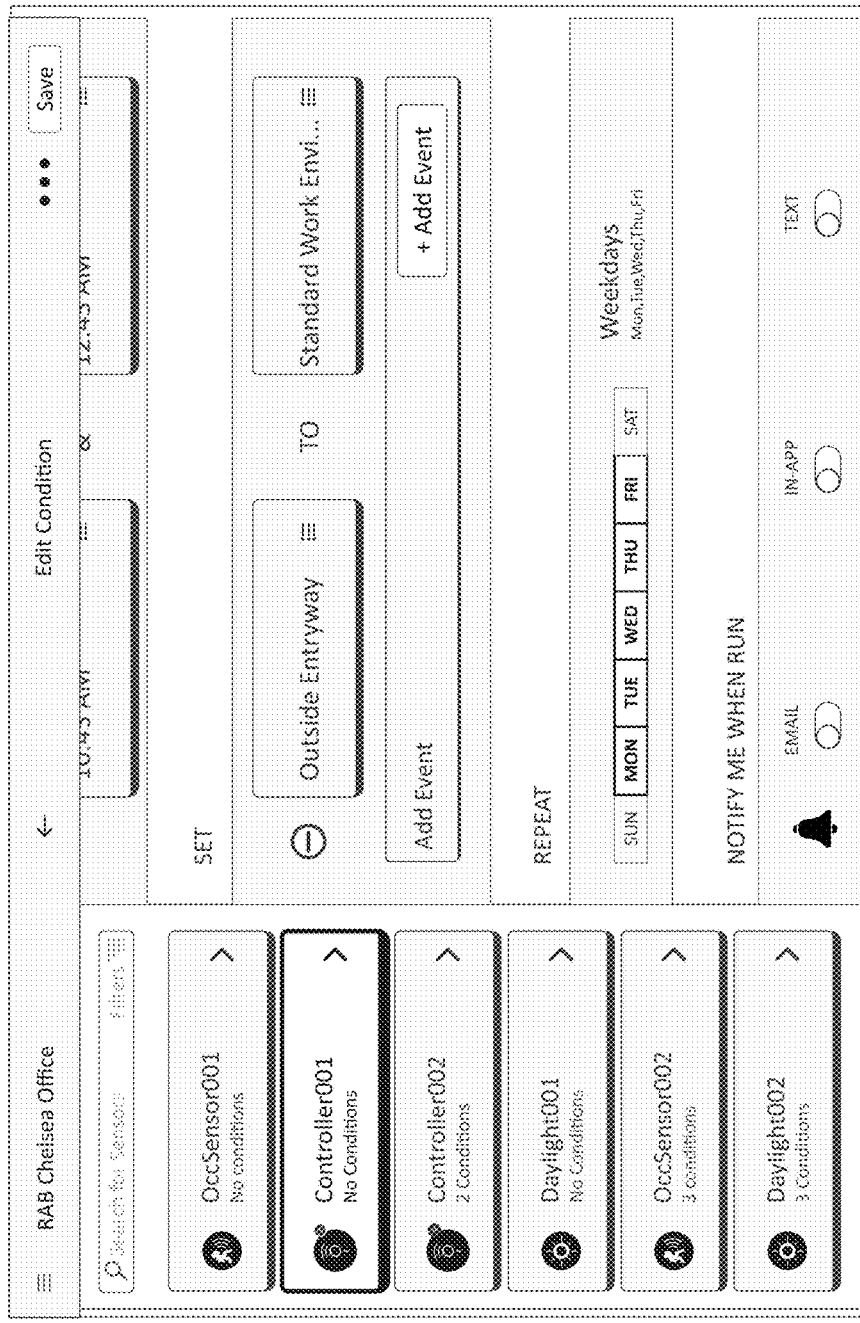
FIG. 24D is an exemplary screen capture illustrating selecting further settings for a controller device trigger automation from a front-end user interface application according to the present disclosure.

Exemplary actions responsive to those exemplary behaviors may include switching a device and/or zone on or off, setting or changing a dim level, and activating a particular scene, which will be described further below. Some actions may trigger upon the satisfaction of multiple conditions. For example, a certain condition may automatically occur if a particular sensor state change is detected AND it is within a certain time period of the day. Automations can save energy, for example, by switching off particular zones when the occupancy sensor 130 detects expiration of a motion timeout period, or dimming or switching off particular zones responsive to light levels detected by the daylight harvester 150. An automation configuration view of the user interface depicted in FIGS. 24A-24D, includes a list of devices having associated conditions. The addition of conditions to a device is shown in in FIG. 24C.

In some embodiments, control for the automations resides in the gateway, so loss of connection to the cellular network (and, therefore, the server system) does not affect use of these automations. As an example, a dimmer switch can have an on/off/dim as a primary function, but may also have automations such as (i) once the light is on, the light dims or goes off after a particular time, or (ii) after the light is turned off, the lights in the parking lot turn on for a particular time. In this example, items (i) and (ii) can be automations whose functionality resides at the gateway.

Scenes

Figure 22A:
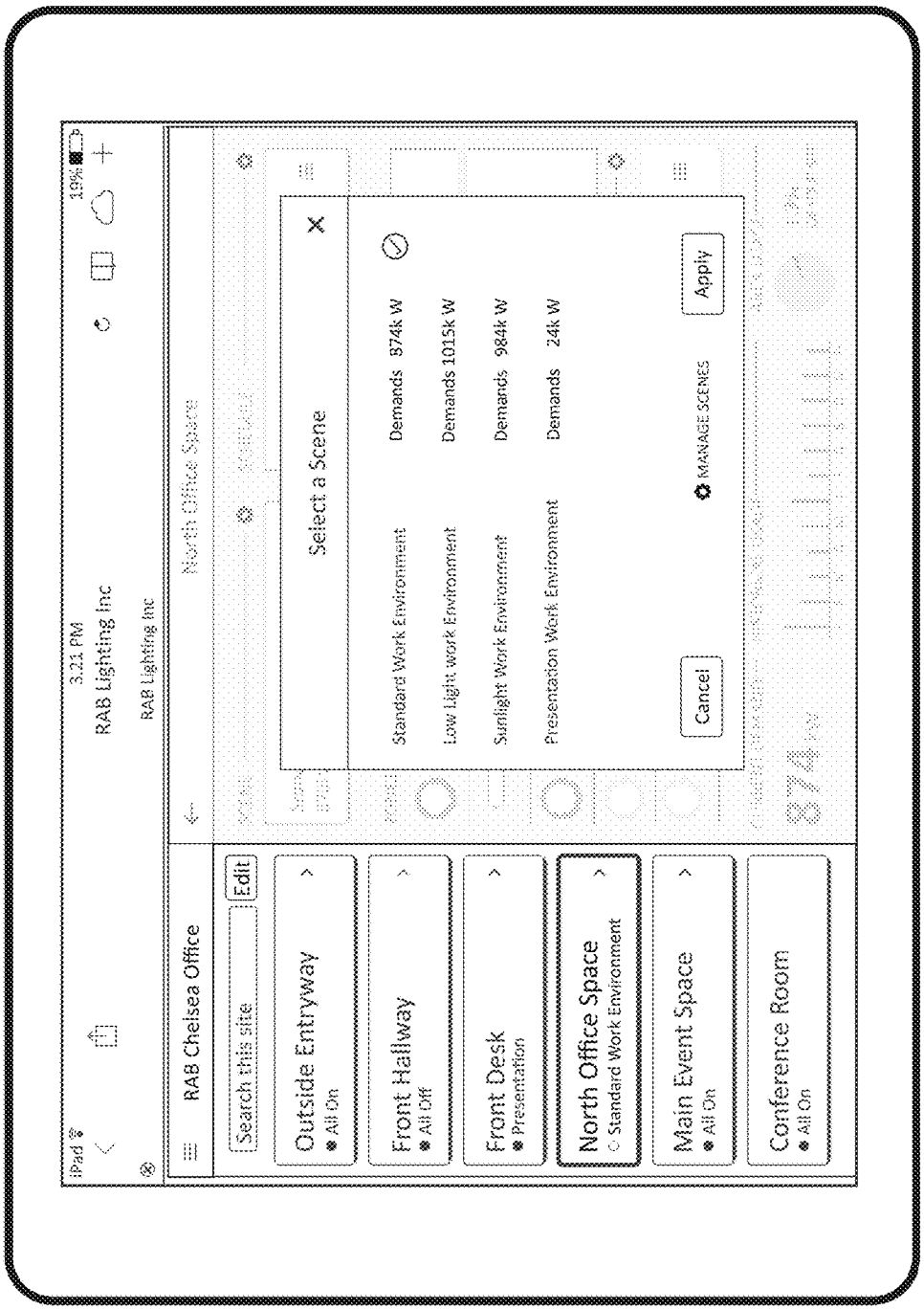
FIG. 22A is an exemplary screen capture illustrating selecting a scene for an area from a front-end user interface application according to the present disclosure.
Figure 22B:
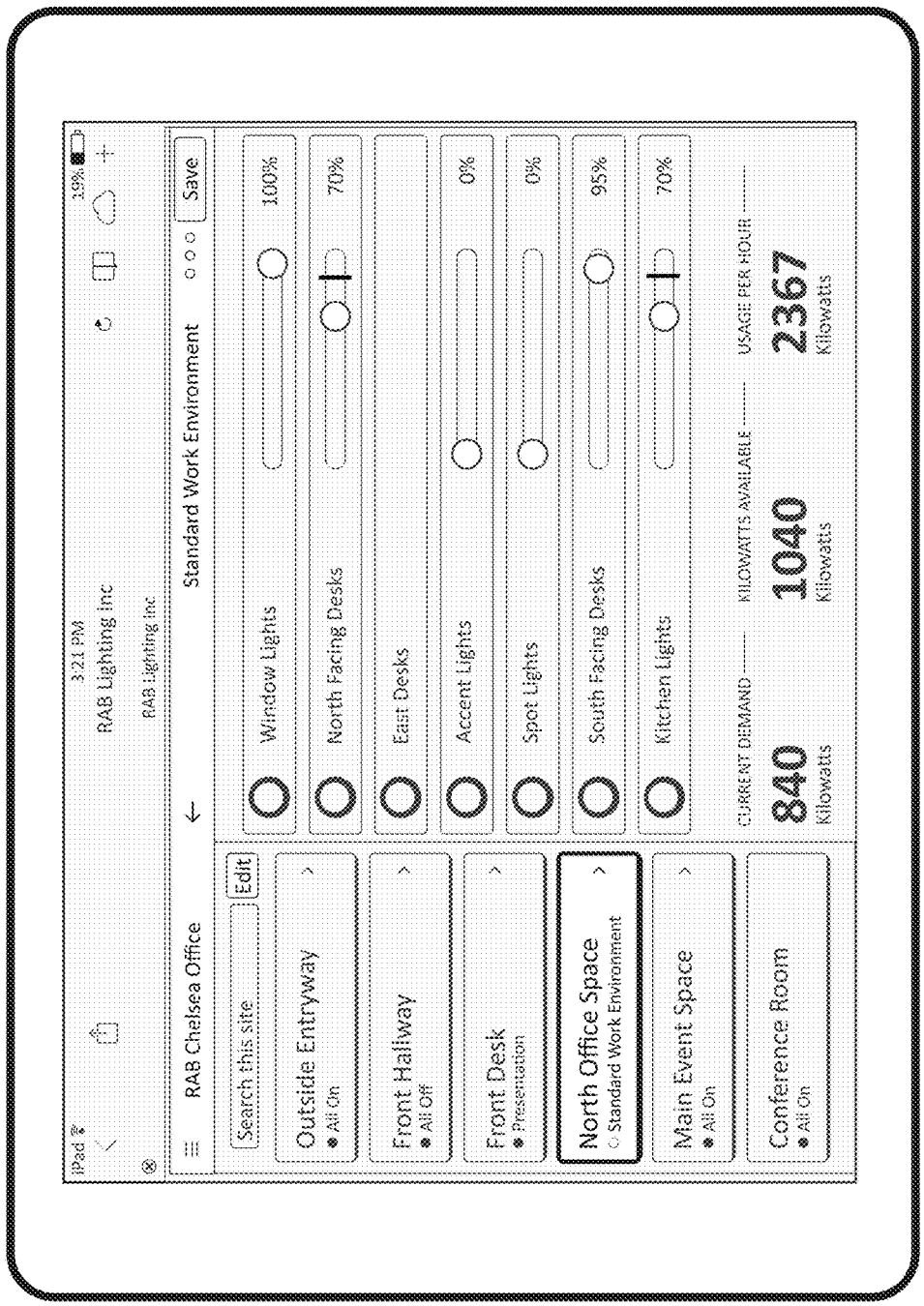
FIG. 22B is an exemplary screen capture illustrating editing the scene of FIG. 22A from a front-end user interface application according to the present disclosure.

Scenes describe a set of state change requests, such as an area or set of zones and each of their dimming level presets. Scenes, which are essentially a group of light settings, may be activated manually or at specific times defined in a schedule. For example, a "presentation mode" may have some lights on, some lights off, and some lights dimmed to 50%. A scene configuration view of the user interface of FIGS. 24A-24D depict a list of scenes associated with an area. Details of the "Standard Work Environment Scene" are shown in a screen capture in FIG. 22B.

Schedules

Figure 22C:
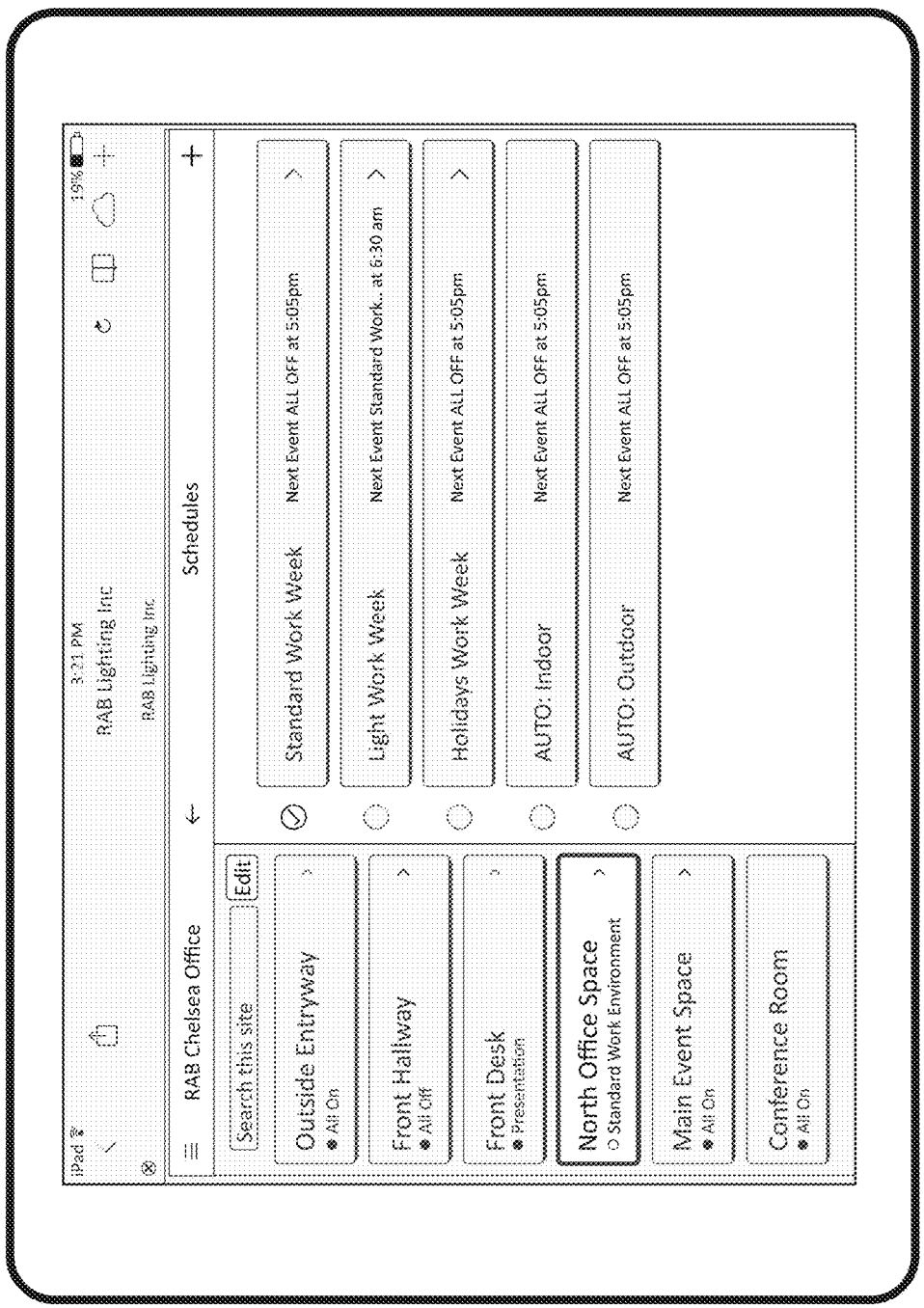
FIG. 22C is an exemplary screen capture illustrating selecting a schedule for an area from a front-end user interface application according to the present disclosure.
Figure 22D:
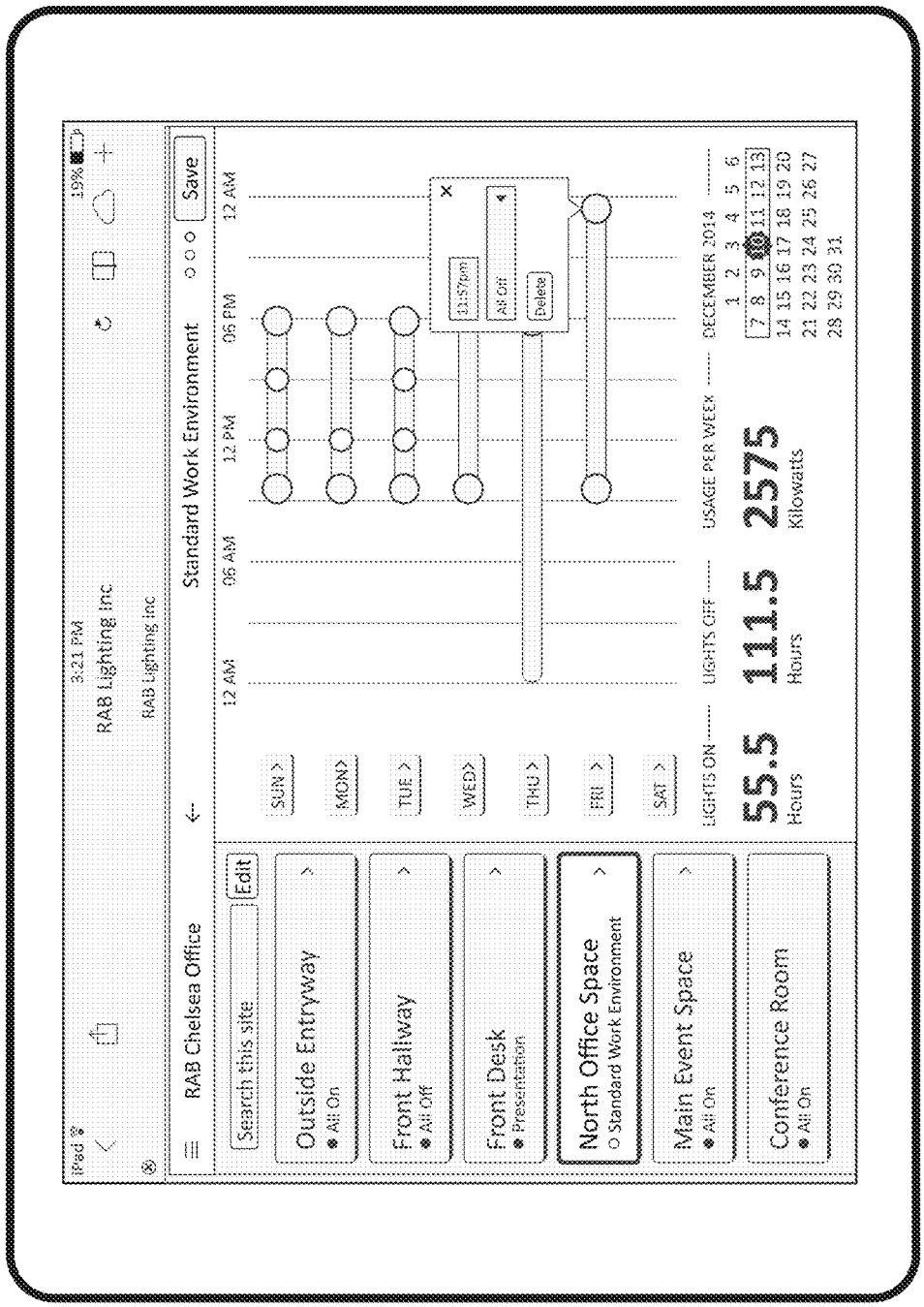
FIG. 22D is an exemplary screen capture illustrating changing the schedule of FIG. 22C from a front-end user interface application according to the present disclosure.
Figure 22E:
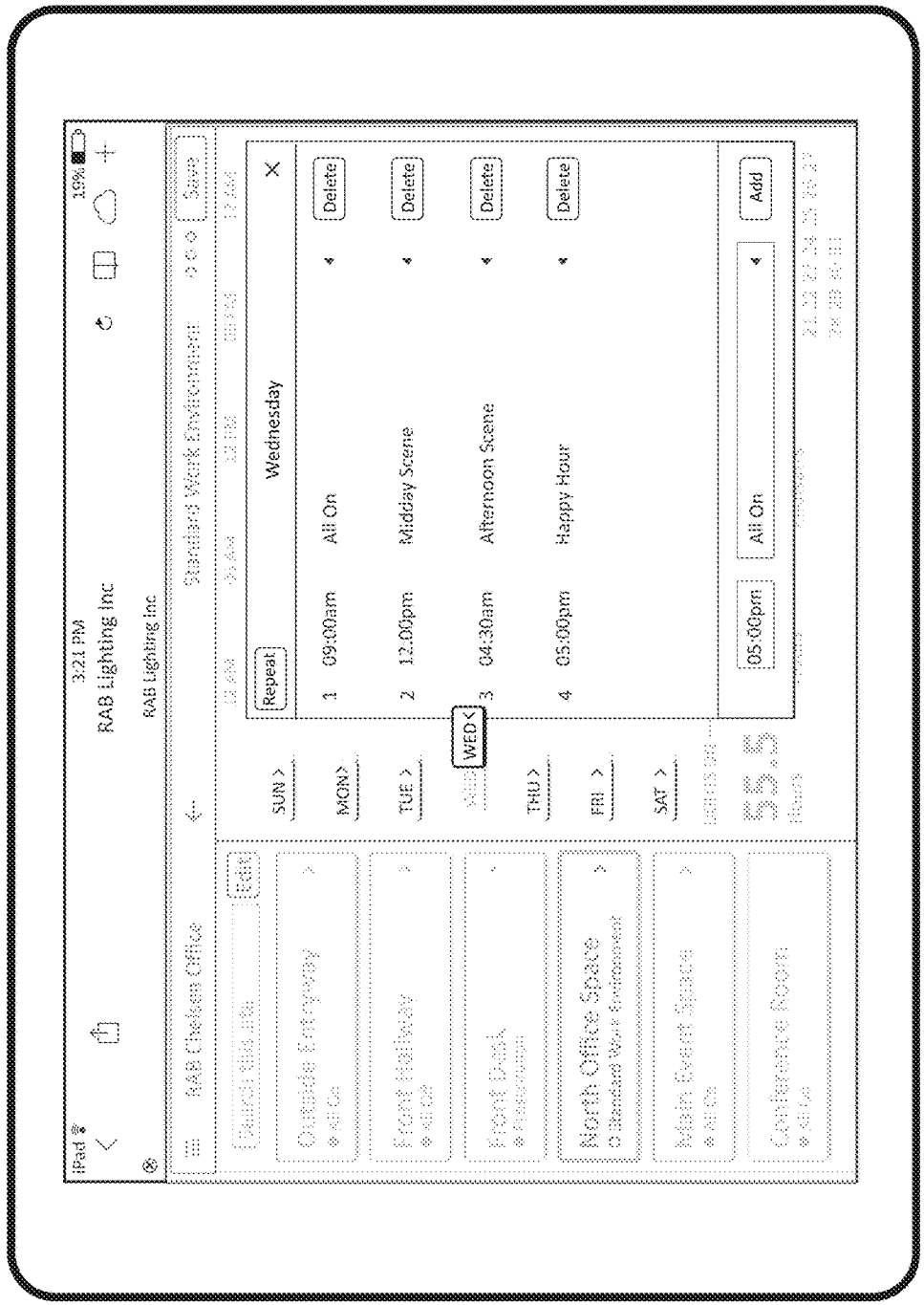
FIG. 22E is an exemplary screen capture illustrating further changing the schedule of FIG. 22C from a front-end user interface application according to the present disclosure.

Schedules allow you to set the lights to come on and off at specific times with optional repetition. For example, a schedule can define a week's worth of events. Schedules, an example of which is shown in FIG. 22C-22E, can apply to one or more devices, zones or areas. An event could be a scene selection. As shown in n FIG. 22E, time segments throughout the day may be associated with different scenes.

Figure 15:
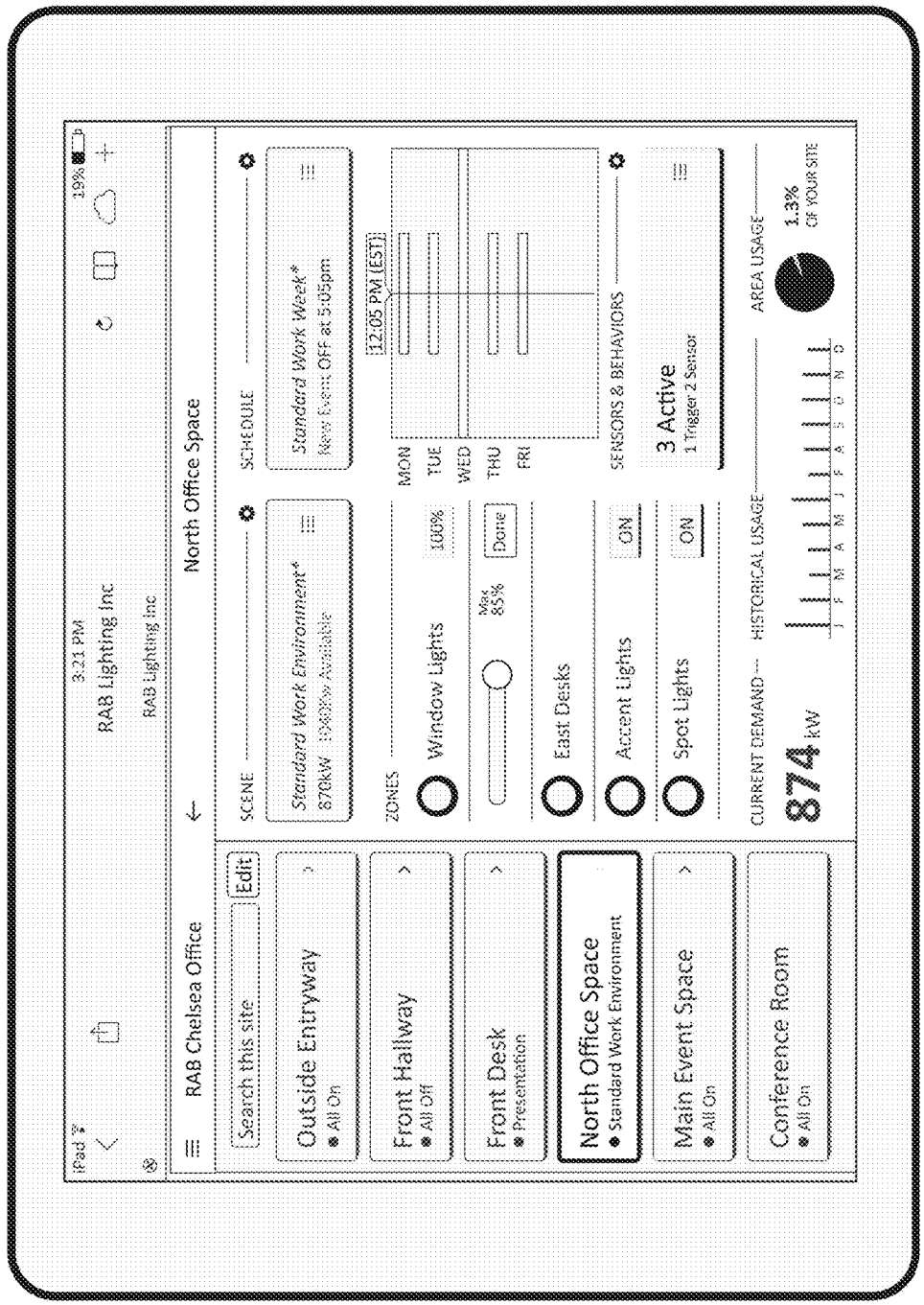
FIG. 15 is an exemplary screen capture illustrating an area overview from a front-end user interface application according to the present disclosure.
Figure 16:
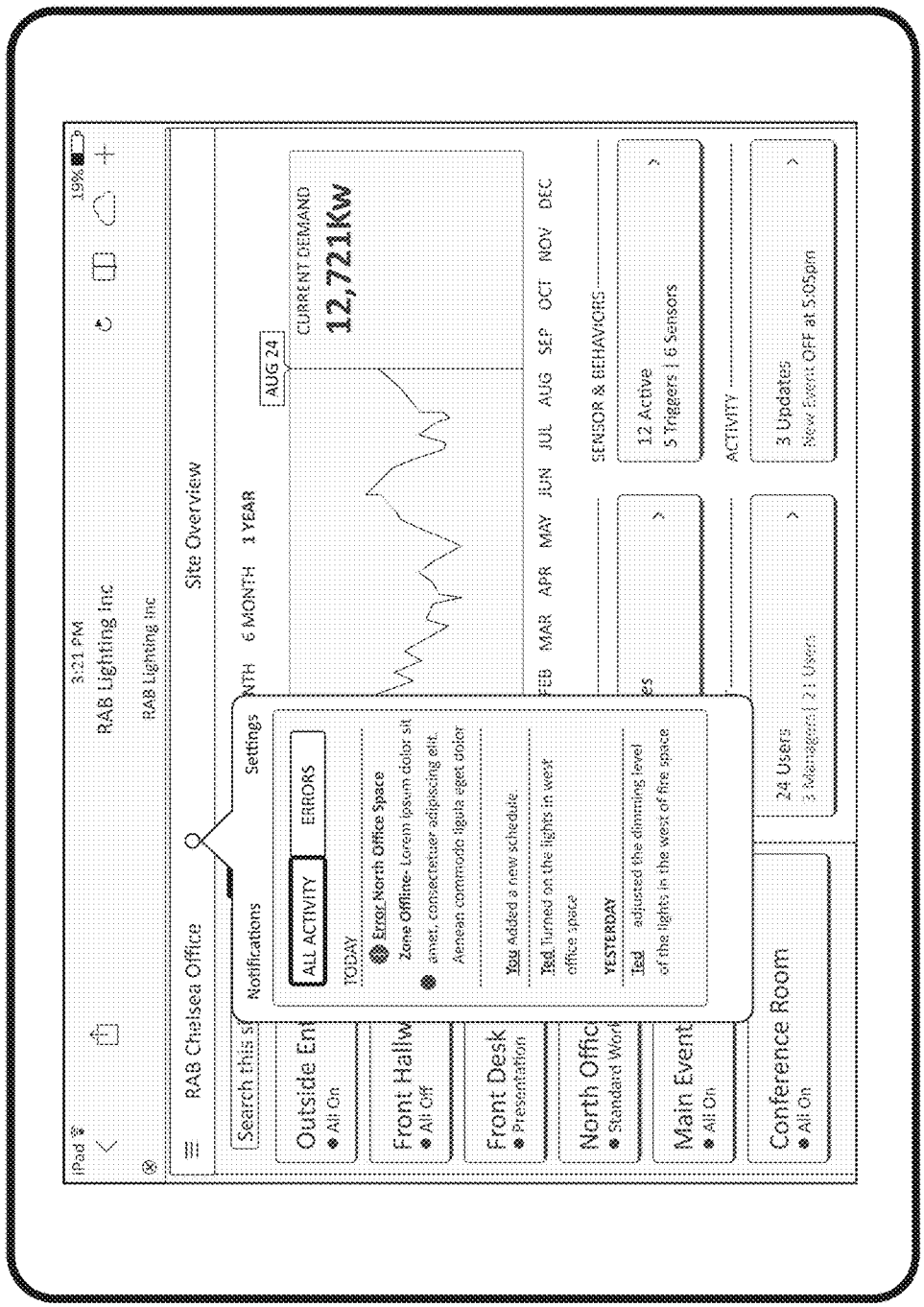
FIG. 16 is an exemplary screen capture illustrating a site overview with notification activities from a front-end user interface application according to the present disclosure.

An overview of an exemplary area at a site is shown in FIG. 15. As shown, the area may have various zones, with the zones being controlled by a system device. Scenes, schedules, and sensors for the area are also shown in the overview, along with electrical energy usage for the area. The system may also include a site overview screen, as shown in FIG. 16.

Touchscreen Control Device

Figure 13:
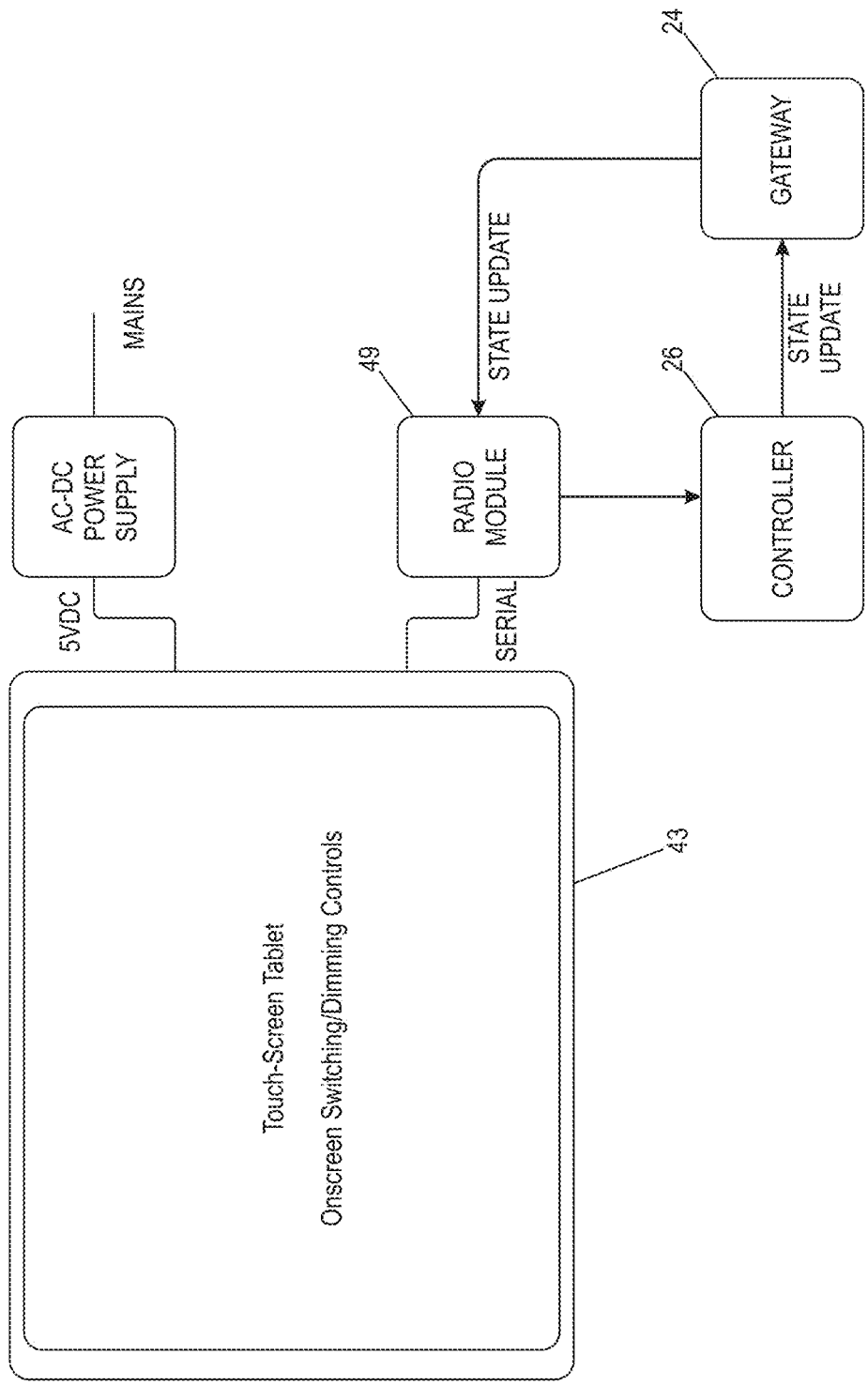
FIG. 13 is a block diagram of an exemplary embodiment of a touchscreen user site device for use with the wireless device control system of FIG. 1.
Figure 18A:
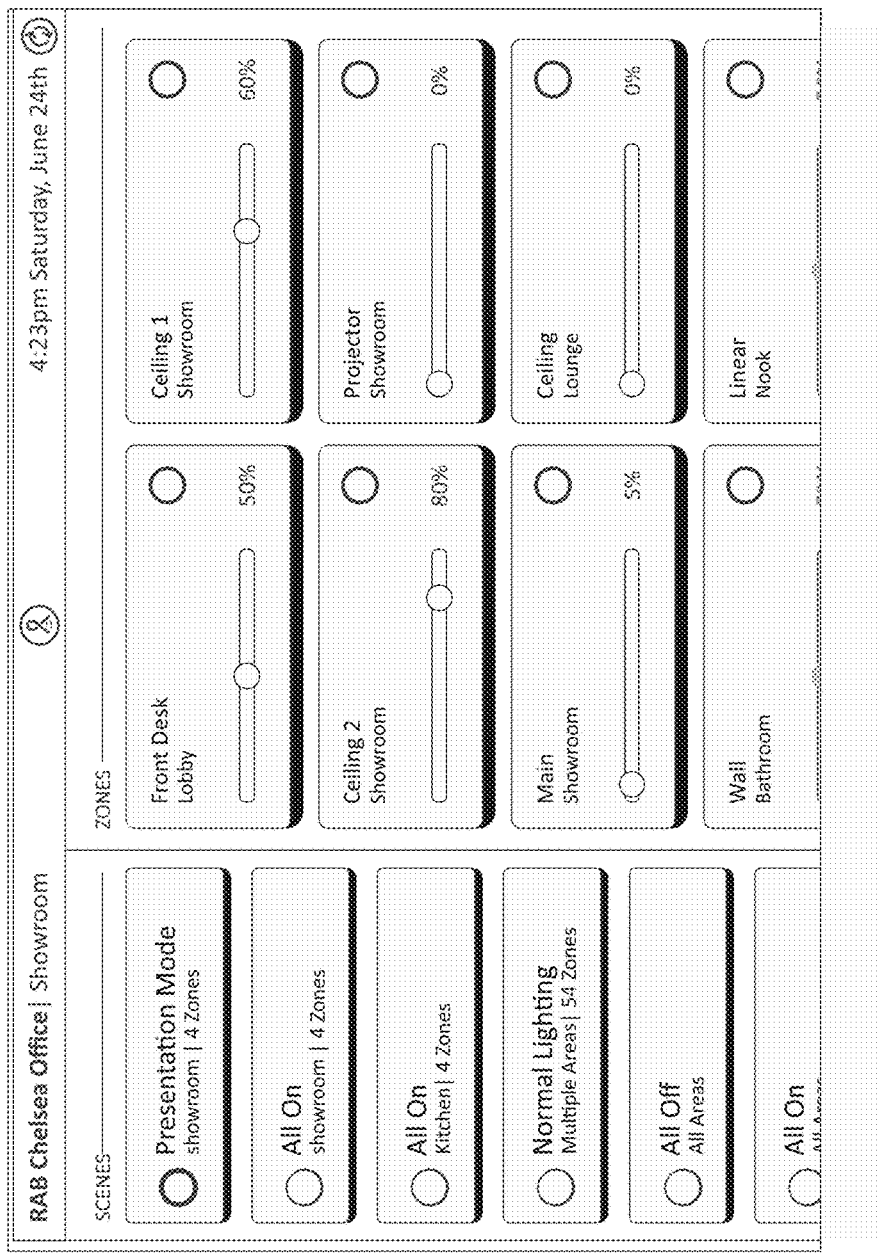
FIG. 18A is an exemplary screen capture illustrating a site overview from a user site device front-end user interface application according to the present disclosure.
Figure 18B:
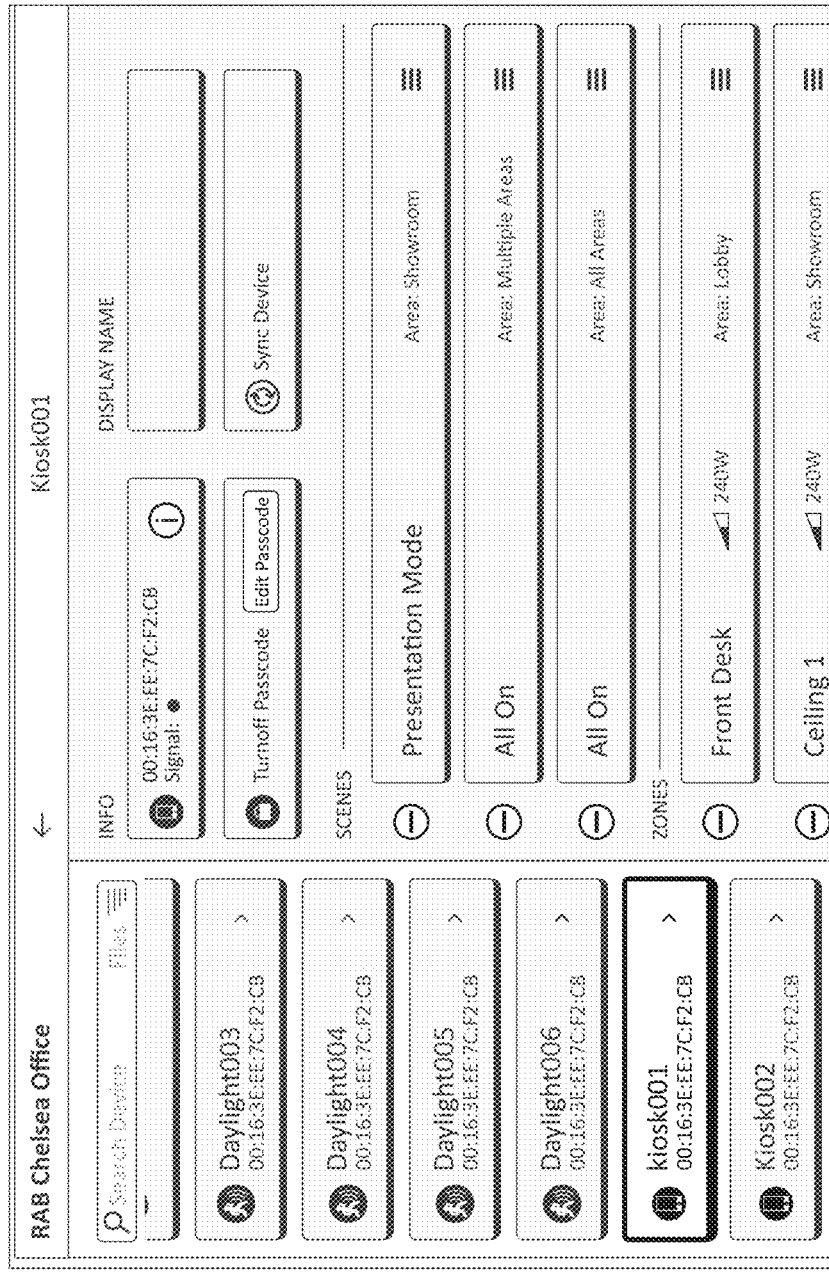
FIG. 18B is an exemplary screen capture illustrating user site device configuration from a user site device front-end user interface application according to the present disclosure.
Figure 18C:
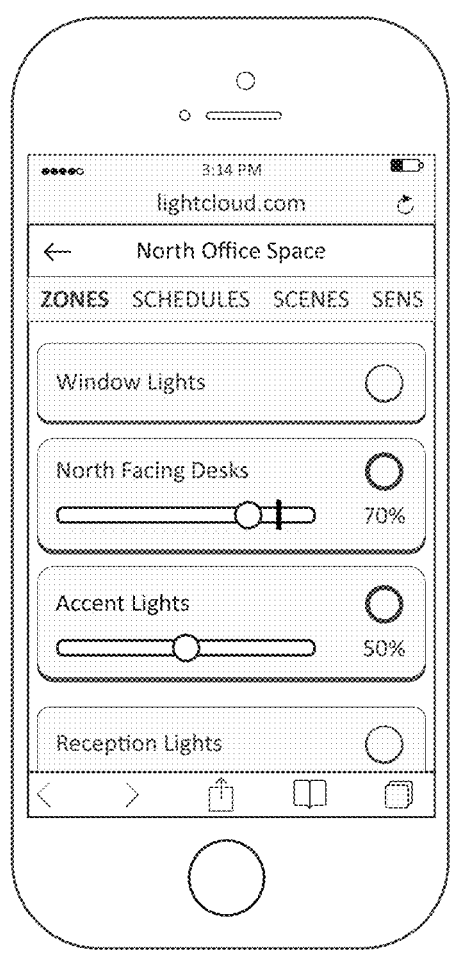
FIG. 18C is an exemplary screen capture illustrating a zone control view from a user computer device front-end user interface application according to the present disclosure.

The wireless device control system 10 may additionally include a user site device 43 as shown in FIG. 13, including, for example, a touchscreen control device, such as a tablet computing device, that functions like one of the user computer devices 16, having a user interface application or software installed directly thereon, facilitating the system configuring, monitoring and controlling as described herein, for example, the exemplary user site device interface screens as shown in FIGS. 18A-18C. However, the user site device resides at the site 14, for example, mounted to or recessed within a wall at a convenient location for the areas and zones controlled by the device, Additionally, the user site device 43 communicates directly with the devices 26 of the site system 14 via the mesh network 28, rather than communicating exclusively through the gateway 24. Directly communicating with the mesh network 28 and addressing the devices 26 will reduce latency that might otherwise occur if the user 42 is accessing the devices 26 through the WAN 20 or 22 and through gateway 24, as described above. As such, the user site device 43 may additionally include a radio module 49, such as an XBee® radio module for communicating using the ZigBee® protocol, as described above. The user site device 43 may include an integrated radio module 49, or may include an external radio module 49 as shown in FIG. 13. If configuration or control of one or more devices 26 is affected from the user site device 43, the gateway 24 and ultimately server system 12 may be updated accordingly, either by the user site device 43 or by the devices 24 themselves.

The user site device 43 may include other radio modules, as tablet computing devices typically do, that are disabled to limit communication to the mesh network radio module 49, which increases security of the wireless device control system 10. Since the mesh network 28 is the only wireless communications available to the user site device 43, a problem arises in how to install and updating software for the device, and, in particular, the user interface application. Advantageously, user interface application can be deployed to the user site device 43 via server 12, WAN 20 or 22, gateway 24, and mesh network 28.

Reference systems that may be used herein can refer generally to various directions (e.g., upper, lower, forward and rearward), which are merely offered to assist the reader in understanding the various embodiments of the disclosure and are not to be interpreted as limiting. Other reference systems may be used to describe various embodiments, such as referring to the direction of projectile movement as it exits the firearm as being up, down, rearward or any other direction.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

What is claimed is:

1. A device for a wireless device control system, the device powered by an AC supply, the device comprising:
   a zero-cross detection circuit coupled to the AC supply, the zero-cross detection circuit including a timer having a preset time, the timer reset by a zero-cross detection, and the zero-cross detection circuit detecting a loss of power of the AC supply upon the timer reaching the preset time without resetting;
   a first voltage regulator including a rectifier and having an input coupled to the AC supply and an output providing a first DC supply;
   a diode having a cathode and an anode, the anode coupled to the output of the first voltage regulator;
   a wireless transmitter having a power input, the wireless transmitter for communicating with at least one other component of the wireless device control system; and
   at least one first capacitor coupled to the cathode of the diode and to the power input of the wireless transmitter; and
   wherein the at least one first capacitor provides energy storage sufficient to power the wireless transmitter for a duration long enough to transmit one message upon detecting the loss of power of the AC supply.

2. The device of claim 1, comprising a second voltage regulator having an input coupled to the cathode of the diode and an output providing a second DC supply, the output coupled to the at least one capacitor and to the power input of the wireless transmitter.

3. The device of claim 2, comprising a second capacitor coupled to the anode of the diode, and wherein detection of a decrease in voltage across the second capacitor detects a loss of the first DC supply and confirms the loss of power of the AC supply.

4. The device of claim 3, wherein the zero-cross detection circuit includes an A-to-D converter and a controller, the A-to-D converter providing an AC voltage level to a controller, the controller capable of detecting zero-crossings of the AC voltage level, and the controller coupled to the wireless transmitter and providing a power loss message to the wireless transmitter upon the timer reaching the preset time.

5. The device of claim 4, wherein the controller includes a port coupled to the second capacitor to detect a decrease in voltage of the output of the first DC supply upon the loss of power of the AC supply.

6. The device of claim 5, wherein the port is configurable as an input or output mode port and detection of a decrease in voltage of the output of the first DC supply includes the steps of:
   setting the port to output mode;
   pushing the port to a low output state;
   setting the port to input mode; and
   detecting whether the voltage at the port remains at a low state, indicating loss of the AC supply; and
   wherein pushing the port to a low output state provides a faster detection of the loss of power of the AC supply than the time required for the port to change states from high to low upon a discharge of the second capacitor from the loss of power of the AC supply.

* * * * *